United States Patent
Valentine

(10) Patent No.: US 10,935,814 B2
(45) Date of Patent: Mar. 2, 2021

(54) OPTICAL DEVICE FOR ENHANCING HUMAN COLOR VISION WITH IMPROVED COSMETIC APPEARANCE

(71) Applicant: HUE.AI, LLC, Jupiter, FL (US)

(72) Inventor: Keenan Valentine, Vienna, VA (US)

(73) Assignee: HUE.AI, LLC, Jupiter, FL (US)

(*) Notice: Subject to any disclaimer, the term of this patent is extended or adjusted under 35 U.S.C. 154(b) by 50 days.

(21) Appl. No.: 16/212,413

(22) Filed: Dec. 6, 2018

(65) Prior Publication Data
US 2019/0187489 A1 Jun. 20, 2019

Related U.S. Application Data

(60) Provisional application No. 62/595,516, filed on Dec. 6, 2017, provisional application No. 62/670,180, filed on May 11, 2018, provisional application No. 62/699,032, filed on Jul. 17, 2018.

(51) Int. Cl.
*G02C 7/10* (2006.01)
*G02B 5/28* (2006.01)
*G02C 7/04* (2006.01)

(52) U.S. Cl.
CPC ............ *G02C 7/104* (2013.01); *G02B 5/285* (2013.01); *G02C 7/04* (2013.01); *G02C 7/108* (2013.01); *G02C 2202/10* (2013.01)

(58) Field of Classification Search
CPC ................................ G02C 7/104; G02B 5/285
USPC ...................................................... 351/159.24
See application file for complete search history.

(56) References Cited

U.S. PATENT DOCUMENTS

| | | |
|---|---|---|
| 3,586,423 A | 6/1971 | Zeltzer |
| 3,701,590 A | 10/1972 | Zeltzer |
| 4,824,246 A | 4/1989 | Thornton, Jr. |
| 4,826,286 A | 5/1989 | Thornton, Jr. |
| 4,998,817 A | 3/1991 | Zallen |
| 6,089,712 A | 7/2000 | Harris |
| 7,372,640 B2 | 5/2008 | Fung |
| 7,474,402 B2 | 1/2009 | Shannon et al. |
| 7,597,441 B1 | 10/2009 | Farwig |
| 8,210,678 B1 | 7/2012 | Farwig |
| 8,414,127 B2 | 4/2013 | Harris |

(Continued)

FOREIGN PATENT DOCUMENTS

| | | |
|---|---|---|
| WO | 1992012451 A1 | 7/1992 |
| WO | 2016148984 A1 | 9/2016 |

OTHER PUBLICATIONS

Fairchild, Mark, "Color Appearance Models", 3rd Ed., 2013, pp. 201-212. Wiley.

*Primary Examiner* — James R Greece

(74) *Attorney, Agent, or Firm* — Volpe Koenig

(57) ABSTRACT

A system, method for creating an optical device, and a device to enhance human color vision are disclosed. The system, method for creating the optical device, and device include a substrate, a plurality of thin film layers provided on the substrate, the plurality of thin film layers including materials creating thin film-specific reflectance spectra based on selected pluralities of materials each having their on respective refractive index, and/or a plurality of colorant layers applied to the plurality of thin film layers, the plurality of colorant layers including at least one colorant, the colorant created based on colorant-specific absorption spectra as defined by selected concentrations.

25 Claims, 49 Drawing Sheets

(56) References Cited

U.S. PATENT DOCUMENTS

| | | |
|---|---|---|
| 8,733,929 B2 | 5/2014 | Chiou et al. |
| 8,770,749 B2 | 7/2014 | McCabe et al. |
| 8,820,923 B2 | 9/2014 | Harding et al. |
| 8,845,095 B2 | 9/2014 | Harding et al. |
| 8,939,576 B2 | 1/2015 | Harding et al. |
| 8,963,104 B2 | 2/2015 | Harding et al. |
| 9,022,562 B2 | 5/2015 | Harding et al. |
| 9,134,547 B2 | 9/2015 | McCabe et al. |
| 9,383,594 B2 | 7/2016 | McCabe et al. |
| 9,574,067 B2 | 2/2017 | Harding et al. |
| 9,575,335 B1 | 2/2017 | McCabe et al. |
| 9,671,622 B1 | 6/2017 | Vetrini et al. |
| 9,740,028 B1 | 8/2017 | Larson |
| 9,746,696 B2 | 8/2017 | Lingelbach |
| 9,776,908 B2 | 10/2017 | Yamamoto et al. |
| 9,885,883 B2 | 2/2018 | Harding et al. |
| 9,891,448 B2 | 2/2018 | Carlson et al. |
| 9,910,297 B1* | 3/2018 | McCabe ............... G02C 7/104 |
| 9,933,636 B2 | 4/2018 | Sharp |
| 10,338,286 B2* | 7/2019 | Schmeder .............. G02B 5/285 |
| 10,606,101 B2* | 3/2020 | Schmeder .............. G02B 5/223 |
| 2010/0232003 A1 | 9/2010 | Baldy et al. |
| 2014/0233105 A1* | 8/2014 | Schmeder ............... G02C 7/12 |
| | | 359/590 |
| 2017/0068113 A1 | 3/2017 | McCabe et al. |
| 2017/0075143 A1* | 3/2017 | Saylor ............. B29D 11/00413 |
| 2017/0146804 A1* | 5/2017 | Nackerud ............. G02C 7/104 |
| 2018/0095202 A1 | 4/2018 | Schmeder et al. |
| 2018/0164608 A1* | 6/2018 | Schmeder ............. G02C 7/024 |
| 2018/0173015 A1 | 6/2018 | Carlson et al. |
| 2018/0196284 A1* | 7/2018 | Schmeder ............. G02C 7/108 |
| 2018/0203171 A1 | 7/2018 | McPherson |
| 2019/0258087 A1* | 8/2019 | Valentine ................ B32B 3/06 |

* cited by examiner

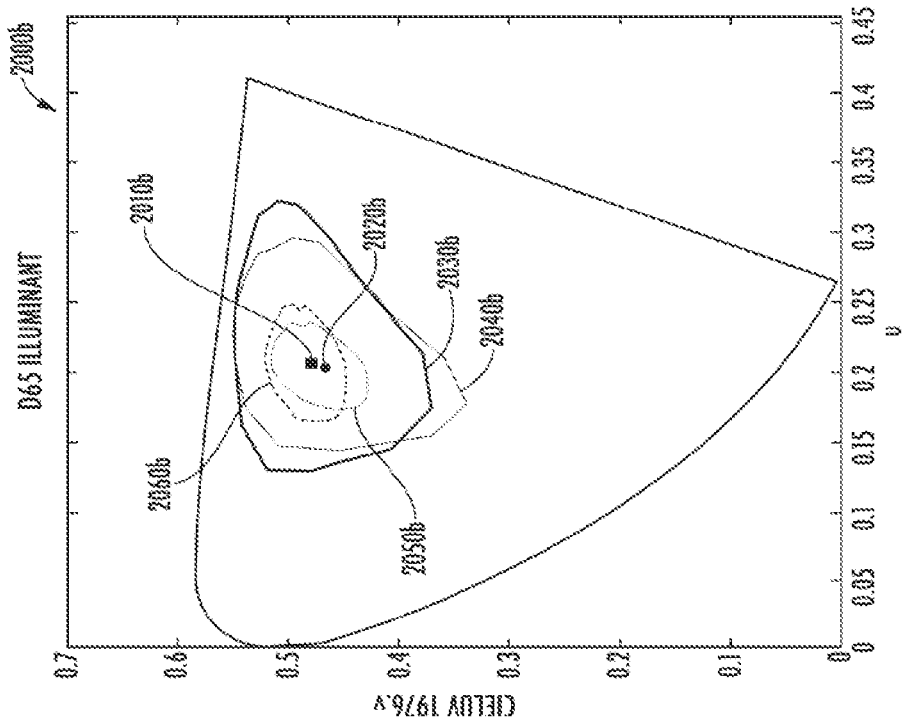
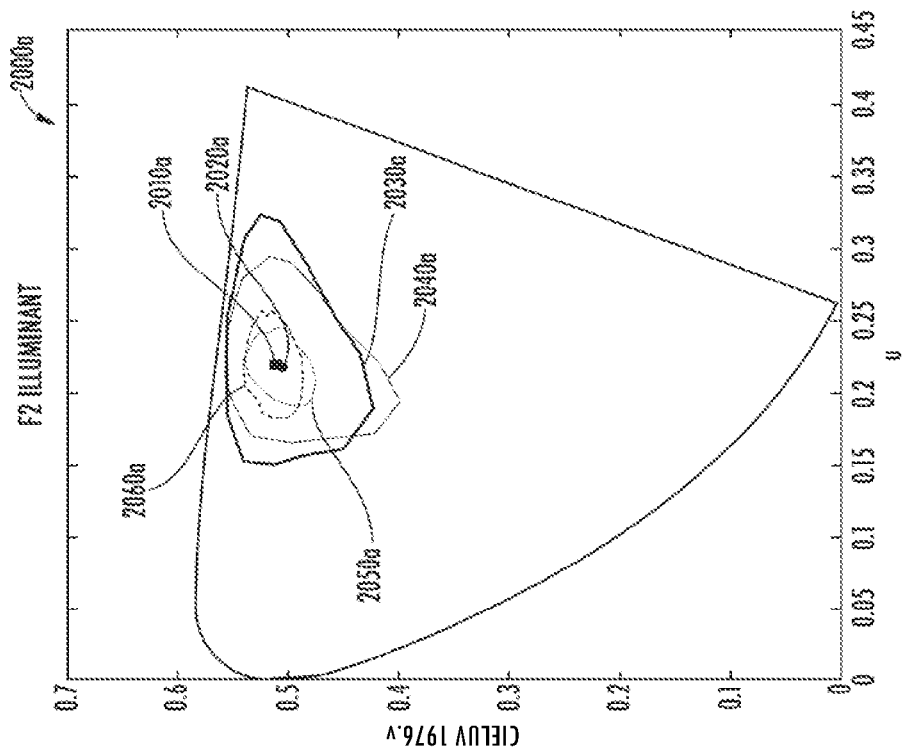
FIG. 20B
FIG. 20A

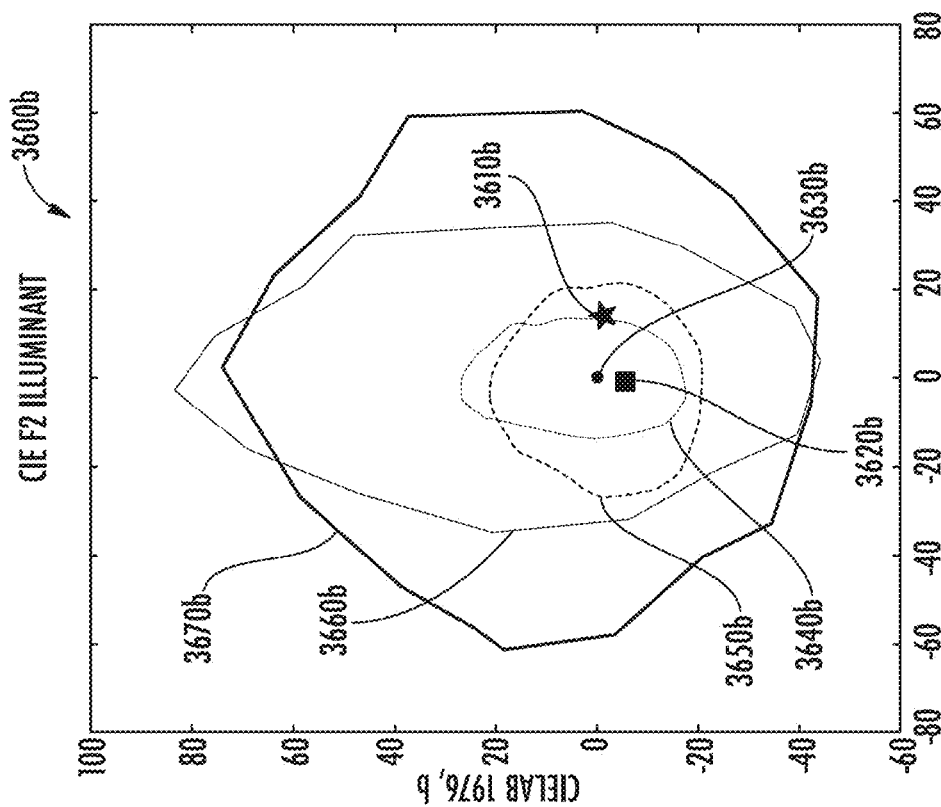
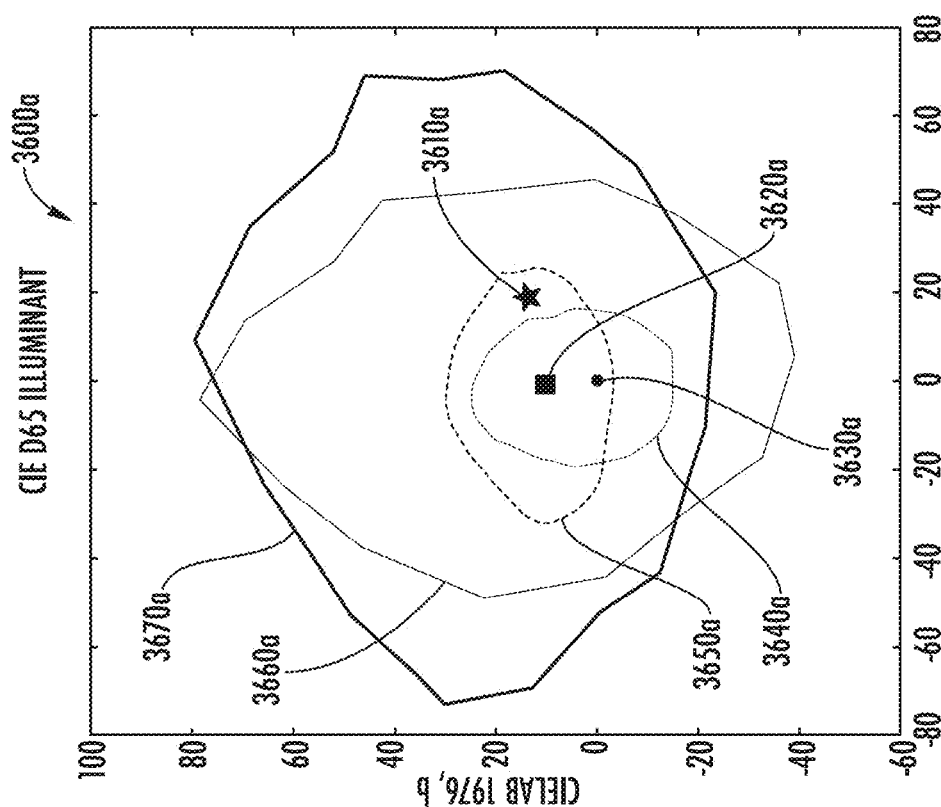
FIG. 36A
FIG. 36B

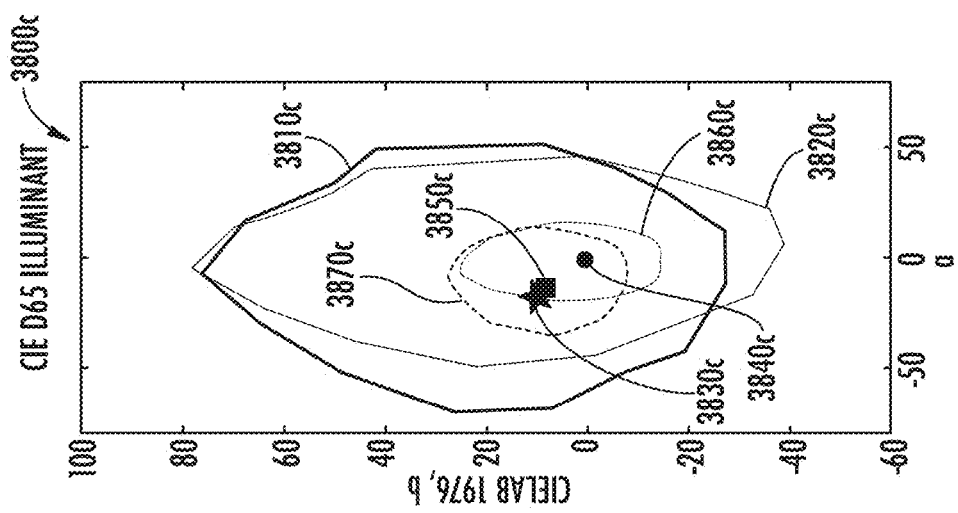
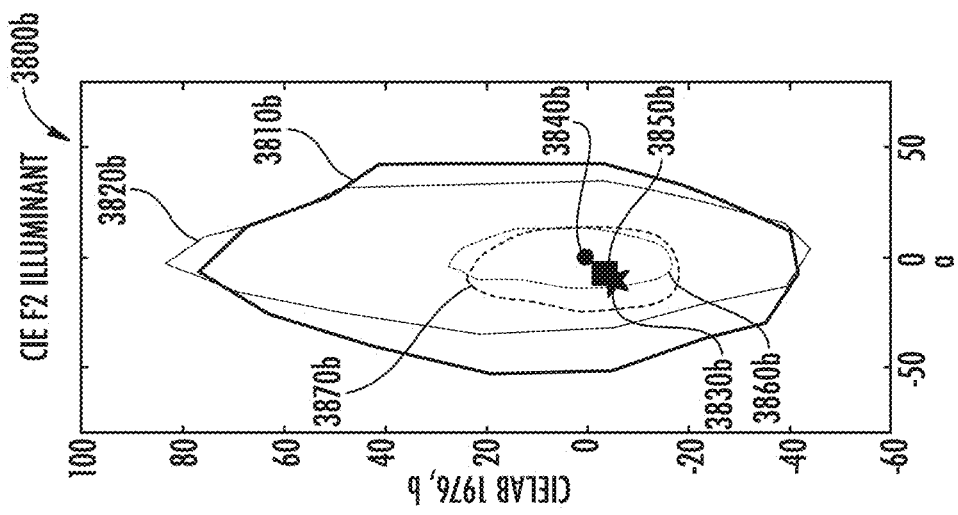
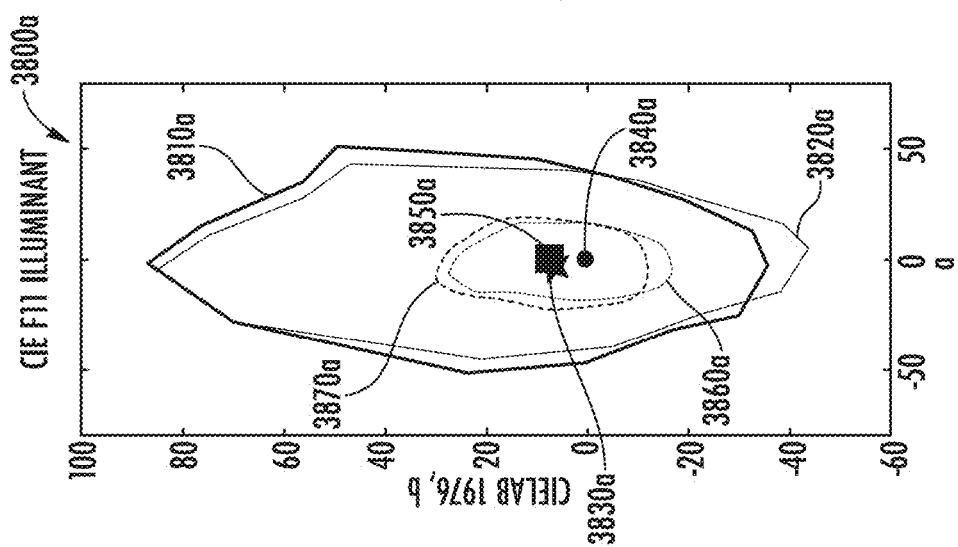

OPTICAL DEVICE FOR ENHANCING HUMAN COLOR VISION WITH IMPROVED COSMETIC APPEARANCE

CROSS REFERENCE TO RELATED APPLICATIONS

This application claims the benefit of U.S. Provisional Patent Application No. 62/699,032, filed Jul. 17, 2018; U.S. Provisional Patent Application No. 62/670,180, filed May 11, 2018; and U.S. Provisional Patent Application No. 62/595,516, filed Dec. 6, 2017, which are incorporated by reference as if fully set forth.

FIELD OF INVENTION

The present invention is directed to optical devices for enhancing human color vision, and more specifically provides a system, method for creating an optical device, and a device to enhance human color vision.

BACKGROUND

Optical devices that enhance normal human color vision and color vision deficiency (CVD), such as red-green CVD, and yellow color vision (YCV), do not sufficiently address the ability for people to discern color differences via lightness differences, and lightness-independent color differences. Moreover, the cosmetic aesthetics of the optical device needs improvement, due to (1) unappealing residual cosmetic tints, (2) color inconstancy of those cosmetic tints under different lighting conditions, and (3) low lightness or apparent transparency of the optical devices caused by the attempts at normal human color vision and CVD.

Therefore, a need exists for better quality solutions to these and other vision issues.

SUMMARY

A system, method for creating an optical device, and a device to enhance human color vision are disclosed. The system, method for creating the optical device, and device include one or more of: (1) a substrate, a plurality of thin film layers provided on the substrate, the plurality of thin film layers including materials creating thin film-specific reflectance spectra based on selected pluralities of materials each having their on respective refractive index, and/or (2) a plurality of colorant layers applied to the plurality of thin film layers, the plurality of colorant layers including at least one colorant, the colorant created based on colorant-specific absorption spectra as defined by selected concentrations.

The method of creating the optical device includes one or more of: (1) creating colorant-specific absorption spectra by selecting colorants, creating concentrations of the selected colorants, and creating one or more layers to contain the colorant, and/or (2) creating thin film-specific reflectance spectra by selecting a plurality of materials each having their own respective refractive index, selecting the number of layers in the thin film, creating each film layer. Constructing an optical device includes one or more of: (1) the created one or more layers containing the colorant, and/or (2) created film layers.

In this invention, the phrase "at least one of" should be interpreted in the disjunctive. That is one or more of the listed criterion is required.

BRIEF DESCRIPTION OF THE DRAWINGS

A more detailed understanding may be had from the following description, given by way of example in conjunction with the accompanying drawings and tables wherein:

FIG. 20A shows the colorimetric effects of the photochromic optical device shown in FIG. 17 under F2 illuminant and with another deuteranomalous observer;

FIG. 20B shows the colorimetric effects of the photochromic optical device shown in FIG. 17 under D65 illuminant and with the same deuteranomalous observer;

FIG. 36A illustrating a plot and FIG. 36B illustrating a plot that collectively illustrates the colorimetric effects of the OD with the transmission spectrum of FIG. 35 with D65 or F2 as illuminants, in CIE LAB color space.

FIG. 38A illustrates a plot, FIG. 38B illustrates a plot, and FIG. 38C illustrates a plot, that collectively illustrate the colorimetric effects of the OD with the transmission spectrum of FIG. 37, with D65, F2 and F11 as illuminants, in CIE LAB color space.

DETAILED DESCRIPTION

Figure 1:
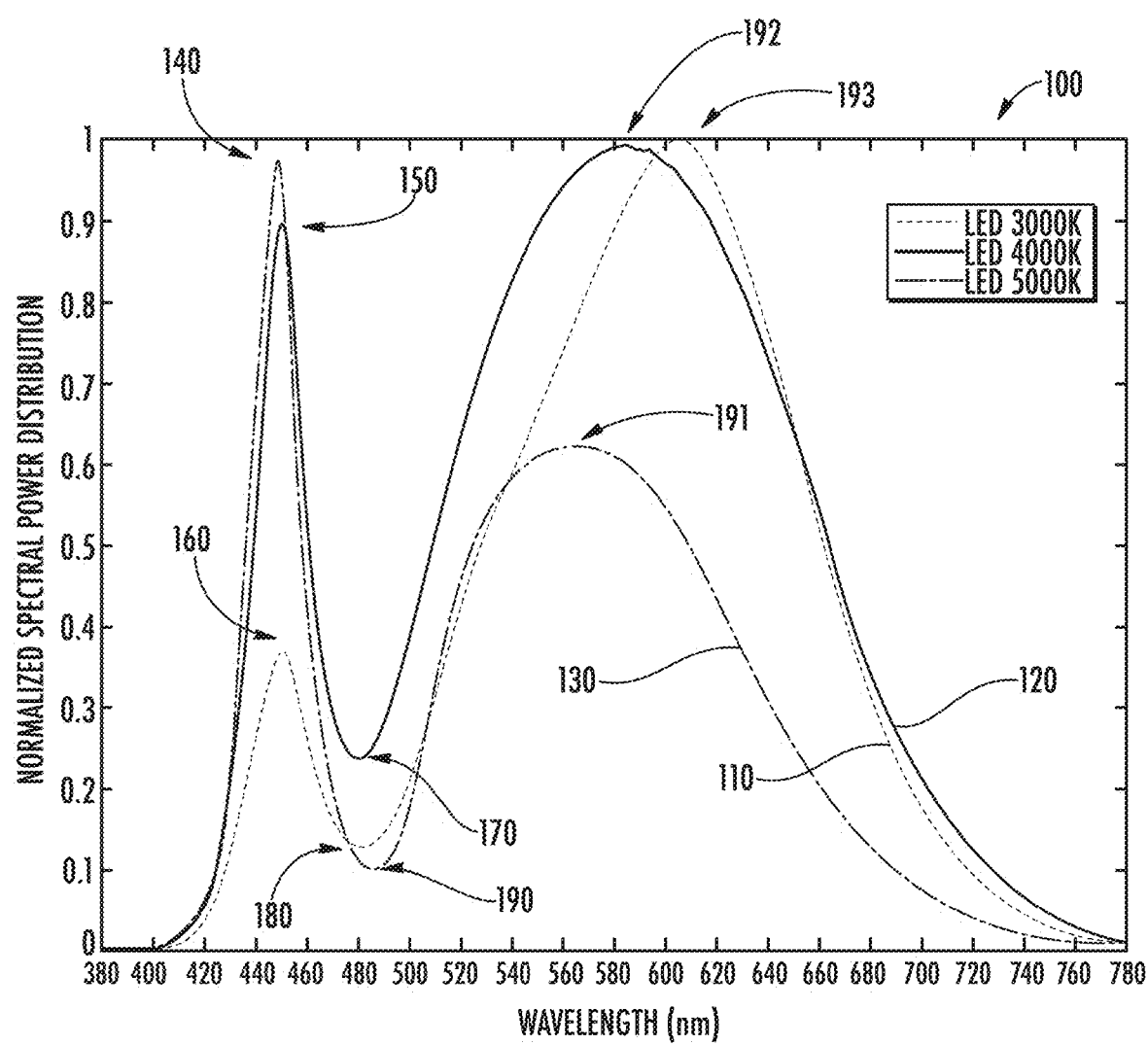
FIG. 1 shows the normalized spectral power distributions of LED-3000K, LED-4000K, and LED-5000K lights, as warm-, neutral-, and cool-colored light sources.

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some structures, components, materials, dimensions, processing steps, and techniques that are known in the art may have been combined together for presentation and for illustration purposes and in some instances may have not been described in detail. In other instances, some structures, components, materials, dimensions, processing steps and techniques that are known in the art may not be described at all. It should be understood that the following description is rather focused on the distinctive features or elements of various embodiments described herein.

The described systems and methods provide the designs and constructions of devices with the desired transmission spectra and desired performance on Colorimetric Performance Metrics (CPMs) to enhance the color perception of normal people and those with Color Vision Deficiency (CVD). This systems and methods disclose devices that modify the transmission spectra of visible light between 380 nm and 780 nm, such that it enhances or alters color perception in order to correct or enhance the color vision of normal people and those with CVD. The nomenclature of a device that modifies the transmission spectra of visible light between 380 nm and 780 nm is "an optical device" or the equivalent "an optical system" includes multiple devices with the same effective visible spectrum and/or the same effective performance on CPMs. The diction of a device, an optical device, an optical system and/or a lens is used interchangeably in the present description.

An optical device is comprised of lenses, sunglass and ophthalmic, glass, contact lens, optical filters, displays, windshields, intraocular lens (IOLs), human crystalline lens (HCL), windows, plastics and any other device or part of a device or system of devices capable of transmitting, absorbing or reflecting electromagnetic radiation, including ultraviolet (UV), visible (VIS) and infrared radiation. The optical device may have any optical power, curvature or other suitable characteristics, including geometric shapes, refractive indices and thicknesses. Absorptive colorants and reflective thin films are used separately or in combination, and applied to a substrate in order to design and construct an optical device or system of optical devices with the desired transmission spectra or effective transmission spectra. Colorants include dyes and pigments that are applied on the surface of or infused into the substrate. Reflective thin films include film layers with high and low refractive indices stacked in alternating patterns or with other stacking patterns, and applied on the surface of or coated within a substrate. Reflective thin films include rugate filters with variable indices of refraction and applied on the surface of or coated within a substrate. Substrates may include glass, plastics (such as acrylic, polycarbonate, Trivex, CR39), crystals, quartz and other transparent or semi-transparent material. Color appearance models (CAMs) may be used to quantitatively model color perception. Standard CAMs include those established by the Commission internationale de l'Eclairage (CIE), such as the CIE 1931 XYZ, CIE 1931 xyY, and CIE 1976 LUV. Adhering to the CIE 1976 LUV CAM definitions, color in this invention is defined by its three (3) components of hue, chroma and lightness.

The system and methods disclose colorimetric parameters or values in 1976 LUV CAM format, unless specifically disclosed otherwise. The use of 1976 LUV as the default CAM does not limit the present description to that specific CAM. In fact, any CAM with color space coordinates can be comparable to the default, including CIE LAB. The default CAM is only one example model to illustrate the described systems and methods. The default color space coordinates are $\langle L,u,v \rangle$.

Reference white (RW) is used in the 1976 CIE LAB color appearance model to determine the CPMs of optical devices via their transmittance and reflectance spectra.

RW is used in calculating the perception of an optical device's cosmetic color tint, via single-pass and double-pass, illuminated by one or more light sources, against a reference perceptual environment (RPE). A RPE is comprised of an adjacent, background and/or ambient environment used to contrast or reference perceived colors. Examples of such environment include air, white paper and other white, colored or mirror surfaces to which perceived colors, such as those of an object are contrasted and compared against.

RW is used in calculating the perception of colors through an optical device, illuminated by one or more light sources, against a RPE as viewed through the optical device. Examples of such RPE include air, white paper and other white, colored or mirror surfaces as seen through the optical device.

Under the same illuminant or same combination of illuminants, an optical device's single-pass cosmetic tint and double-pass cosmetic tint have the same RW, provided both tints have the same RPE. Similarly, two different optical devices with different transmission or reflection spectra have the same RW, provided both optical devices have the same RPE. Such RW is described by the tristimulus values, $X_{RW,t}$, $Y_{RW,t}$ and $Z_{RW,t}$, where $\{X,Y,Z\}$ denote tristimulus values in general, and t denotes application to optical device's cosmetic tints (both single-pass tint and double-pass tint in this case).

RW can be the perceived white point (WP) of the normalized spectral power distribution (SPD) of a CIE standard illuminant, any other single light source or any combination of light sources, within 380 nm to 780 nm.

Equation 1 describes the formulas for calculating the tristimulus values of RW used in evaluating the perception of an optical device's cosmetic color tint, for both single-pass and double-pass tints, against an ambient RPE, illuminated by one or more light sources or illuminants.

$$RW_t = \begin{cases} X_{RW,t} = \sum_{\lambda=380\,nm}^{\lambda=780\,nm} [\text{Illuminant}(\lambda)\bar{x}(\lambda)] \\ Y_{RW,t} = \sum_{\lambda=380\,nm}^{\lambda=780\,nm} [\text{Illuminant}(\lambda)\bar{y}(\lambda)] \\ Z_{RW,t} = \sum_{\lambda=380\,nm}^{\lambda=780\,nm} [\text{Illuminant}(\lambda)\bar{z}(\lambda)] \end{cases} \quad \text{Equation 1}$$

where Illuminant($\lambda$) denotes a CIE standard illuminant, any other single light source or any combination of light sources, and $\{\bar{x}(\lambda), \bar{y}(\lambda), \bar{z}(\lambda)\}$ is the set of color matching functions, such as from the 1931 CIE 2-Degree Standard Observer.

The cosmetic color tint of the color enhancing or color correcting optical device perceived by the wearer or receiver (i.e., "single-pass") can be different than that perceived by an external viewer (i.e., "double-pass"). The cosmetic tint of the optical device (OD) as perceived by the OD wearer or receiver is due to incoming or external light source being filtered once by the OD. In this configuration, the OD is acting as a single-pass filter to the wearer of the OD. The term of "single-pass" is used in this invention in this regard.

The cosmetic tint of the OD as perceived by an external viewer is due to a reflective light path which is filtered twice by the OD. More generally, reflective light path describes the process of external light being filtered once by the OD as it travels through the OD, contacts a backstop surface, e.g., wearer's skin in the case of an external OD, iris or sclera of the wearer's eyes in the case of a contact lens, is reflected or partially reflected back through the OD and being filtered a second time by the OD, until the light rays reach the external viewer. In this manner, the OD is acting as a double-pass filter to an external viewer. The backstop surface may selectively absorb, partially or completely, certain wavelengths of the visible light spectrum and reflect other wavelengths. This double filtering process by the OD can be included in designing the overall cosmetic tint of the OD as perceived by an external viewer. The term of "double-pass" is used in this invention in this regard.

In single-pass and/or double-pass light filtration, certain wavelengths between 380 nm and 780 nm can be partially, completely or not reflected by the OD's interface with air, tears, cornea or another medium before reaching the OD's user (i.e. or internal receiver) and/or external viewer or external receiver (e.g., another person looking at the OD).

Light sources are comprised of natural lighting, such as daylight, overcast, and artificial lighting, such as fluorescent lights, incandescent lights and LEDs (light-emitting diodes). CIE standard illuminants are comprised of D65 for natural daylight, a set of {F2, F7, F11} for representative fluorescent lights, and A for incandescent light. LED 3000K, LED 4000K and LED 5000K are LEDs with corresponding color temperatures producing warm-, neutral- and cool-colored light, respectively.

FIG. 1 illustrates representative normalized SPDs 100 for LED 3000K 110, LED 4000K 120 and LED 5000K 130. Photometrically, the three SPDs (LED 3000K 110, LED 4000K 120 and LED 5000K 130) represent LED SPDs with the following characteristics: (1) at least one local peak light emission between 420 nm and 480 nm (illustrated as peak 140 for LED 130, peak 150 for LED 120, peak 160 for LED 110), which may be, more specifically, between 440 nm and 460 nm (referred to as a blue peak), (2) at least one local valley (low) light emission between 460 nm and 520 nm (illustrated as valley 170 for LED 120, valley 180 for LED 110, valley 190 for LED 130), which may be, more specifically, between 470 nm and 500 nm (referred to as a blue valley), and (3) at least one local peak light emission between 520 nm and 640 nm (illustrated as peak 191 for LED 130, peak 192 for LED 120, peak 193 for LED 110, referred to as a yellow peak). Tuning the relative emission of the blue and yellow peaks result in the desired LED color temperatures. Specifically, for LED 110 (a warm-colored LED), yellow peak 193 may be substantially higher than blue peak 160, such as by at least 0.25 (25%) in normalized SPD. For LED 120 (a neutral-colored LED), yellow peak 192 may be substantially the same as blue peak 150, such with a difference within about 0.249 (24.9%) in normalized SPD. For LED 130 (a cool-colored LED), yellow peak 191 may be substantially lower than blue peak 140, such as by at least 0.25 (25%) in normalized SPD.

Equation 2 describes the formulas for evaluating the tristimulus values of RW used in calculating the perception of colors (e.g., Munsell colors, Ishihara colors) through an optical device, against an ambient RPE as viewed through the optical device, illuminated by the same light source(s) as that (those) which illuminated the cosmetic tints of the optical device (described by Equation 1).

$$RW_{OD} = \begin{cases} X_{RW,OD} = X_{RW,t} * \left(\frac{Y_{OD}}{Y_{RW,t}}\right) \\ Y_{RW,OD} = Y_{OD} \\ Z_{RW,OD} = Z_{RW,t} * \left(\frac{Y_{OD}}{Y_{RW,t}}\right) \end{cases} \quad \text{Equation 2}$$

$$Y_{OD} = \sum_{\lambda=380\,nm}^{\lambda=780\,nm} [\text{Illuminant}(\lambda)T(\lambda)\bar{y}(\lambda)],$$

where $Y_{OD}$ is the Y component of the tristimulus values of the optical device's WP in single-pass transmission, calculated using the optical device's transmission spectrum, $T(\lambda)$.

Figure 2:
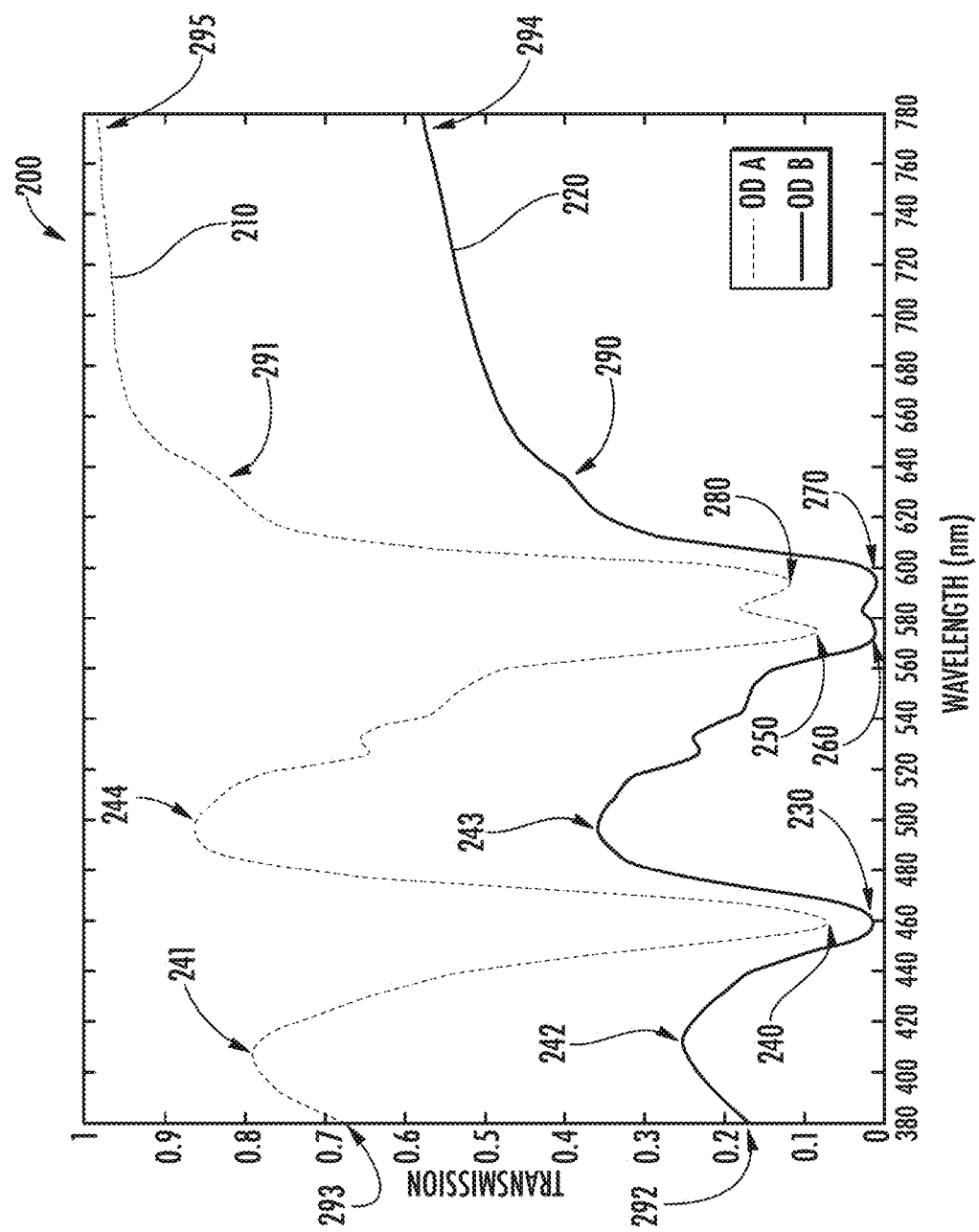
FIG. 2 shows the modified transmission spectra of 2 optical devices.

FIG. 2 illustrates the transmission spectra 200 of two optical devices. Both optical devices have transmission spectra 210 for OD A, 220 for OD B illustrated in FIG. 2. The optical devices (A, B) may have dyes compounded into polycarbonate and molded into plano-optical lenses of thickness 3 mm and a diameter of 72 mm. OD A is intended as a general-use ophthalmic lens, suitable for both indoor and outdoor use. OD B is intended as a sunglass lens. Four lightfast and thermally-stable dyes are used to produce both optical devices with their illustrated transmission spectra. The dyes create individual absorption peaks in the optical devices at 459 nm (illustrated as absorption peak 230 in spectra 220 and as absorption peak 240 in spectra 210), 575 nm (illustrated as absorption peak 250 in spectra 210 and as absorption peak 260 in spectra 220), 595 nm (illustrated as absorption peak 270 in spectra 220 and as absorption peak 280 in spectra 210), and 636 nm (illustrated as absorption peak 290 in spectra 220 and as absorption peak 291 in spectra 210). Such dyes may include rhodamine and cyanine group of dyes. The dyes only differ in their concentration loading in the plastic matrix. Dyes with wavelength-dependent absorption peaks can create corresponding local peak absorptions 230, 240, 250, 260, 270, 280, 290, 291 in the respective OD's transmission spectrum.

An absorbance peak, also referred to as stop-band or transmission valley, is any spectral absorbance centered within 380 nm and 780 nm such that the local peak absorbance creates a local low point in the transmission spectrum, and the resultant local lowest transmission value is at least 3% lower than the transmission value of two immediately-neighboring local transmission peaks with the peaks including one at a shorter wavelength and one at a longer wavelength. Stop-band centered (i.e., with peak absorbance wavelength) at 380 nm (illustrated as absorption peak 292 in spectra 220 and as absorption peak 293 in spectra 210) have one immediately-neighboring local transmission peak at a longer wavelength. Stop-band centered at 780 nm (illustrated as absorption peak 294 in spectra 220 and as absorption peak 295 in spectra 210) have one immediately-neighboring local transmission peak at a shorter wavelength. For example, FIG. 2 has stop-bands substantially centered at 380 nm (absorption peak 292, absorption peak 293), 459 nm (absorption peak 230, absorption peak 240), 575 nm (absorption peak 250, absorption peak 260), 595 nm (absorption peak 270, absorption peak 280) and 780 nm (absorption peak 294, absorption peak 295). It is equivalent to state that the stop-bands are centered, peaked or have absorbance peaks at identified wavelengths.

A transmission peak, also referred to as a pass-band or absorbance valley, is any spectral transmission within 380 nm and 780 nm such that the local peak transmission creates a local high point in the transmission spectrum, and the resultant local highest transmission value is at least 3% higher than the transmission value of two immediately-neighboring transmission valleys-one at a shorter wavelength and one at a longer wavelength. Pass-band centered (i.e., with peak transmission wavelength) at 380 nm need only one immediately-neighboring local transmission valley at a longer wavelength. Pass-band centered at 780 nm need only one immediately-neighboring local transmission valley at a shorter wavelength. For example, FIG. 2 has pass-bands substantially centered at 410 nm (transmission peak 241, transmission peak 242), 500 nm (transmission peak 243, transmission peak 244) and 780 nm (transmission peak 294, transmission peak 295). It is equivalent to state that the pass-bands are centered, peaked or have transmission peaks at identified wavelengths.

An OD's transmission spectrum has at least one stop-band centered between 400 nm and 520 nm (absorption peak 230, absorption peak 240), and at least another stop-band centered between 540 nm and 620 nm (absorption peak 250, absorption peak 260, absorption peak 270, absorption peak 280).

For OD A, 20 mg to 30 mg of "459-dye", 15 mg to 30 mg of "574-dye", 15 mg to 35 mg of "594-dye", and 1 mg to 10 mg of "636-dye" were compounded into 3 lbs. of polycarbonate resin, and molded into lens form.

For OD B, 20 mg to 40 mg of "459-dye", 30 mg to 60 mg of "574-dye", 35 mg to 75 mg of "594-dye", and 1 mg to 10 mg of "636-dye" were compounded into 3 lbs. of polycarbonate resin, and molded into lens form.

In general, dyes can be added into or onto contact lenses and IOLs. These dyes can be co-polymerized with hydrogel, silicone hydrogel, acrylic, ionic or non-ionic polymers or other suitable materials. Co-polymerization requires chromophores to be functionalized with suitable chemical groups, such as acrylate, styrene, or reactive double bond(s). Imbibing the dyes into device substrate is also possible. Suspending or encasing dyes in the device substrate matrix without dye co-polymerization is also possible.

Table 1 discloses the RW tristimulus values, (1) for both OD A and OD B, (2) under 8 different lighting conditions of D65, F2, F7, F11, A, LED-3000K, LED-4000K and LED-5000K, and (3) applied to 2 RPEs of (a) perception of the optical devices' single-pass and double-pass cosmetic tints in an ambient environment, (b) color perception through the optical devices as a device wearer or receiver of optical devices' transmittance. Colors perceived through the optical devices include any conceivable color, such as Munsell colors, colors from Ishihara color vision deficiency (CVD) test plates, natural colors and man-made colors.

most sensitive to short wavelength visible light. In CAMs, trichromatic human color vision is quantified using three color matching functions (CMFs), each duplicating the sensitivity of each color cone in the set of L-cone, M-cone and S-cone in a CAM. Two types of CMFs are available through CIE, the 1931 2° Standard Observer (1931 SO) and the 1964 10° Standard Observer (1964 SO). For the 1931 SO and 1964 SO, $\bar{x}$, $\bar{y}$, $\bar{z}$ separately denote the CMFs for L-cone, M-cone and S-cone, respectively. CMF sensitivities may vary as wavelengths change, i.e. CMFs are functions of wavelengths, $\lambda$.

Figure 3:
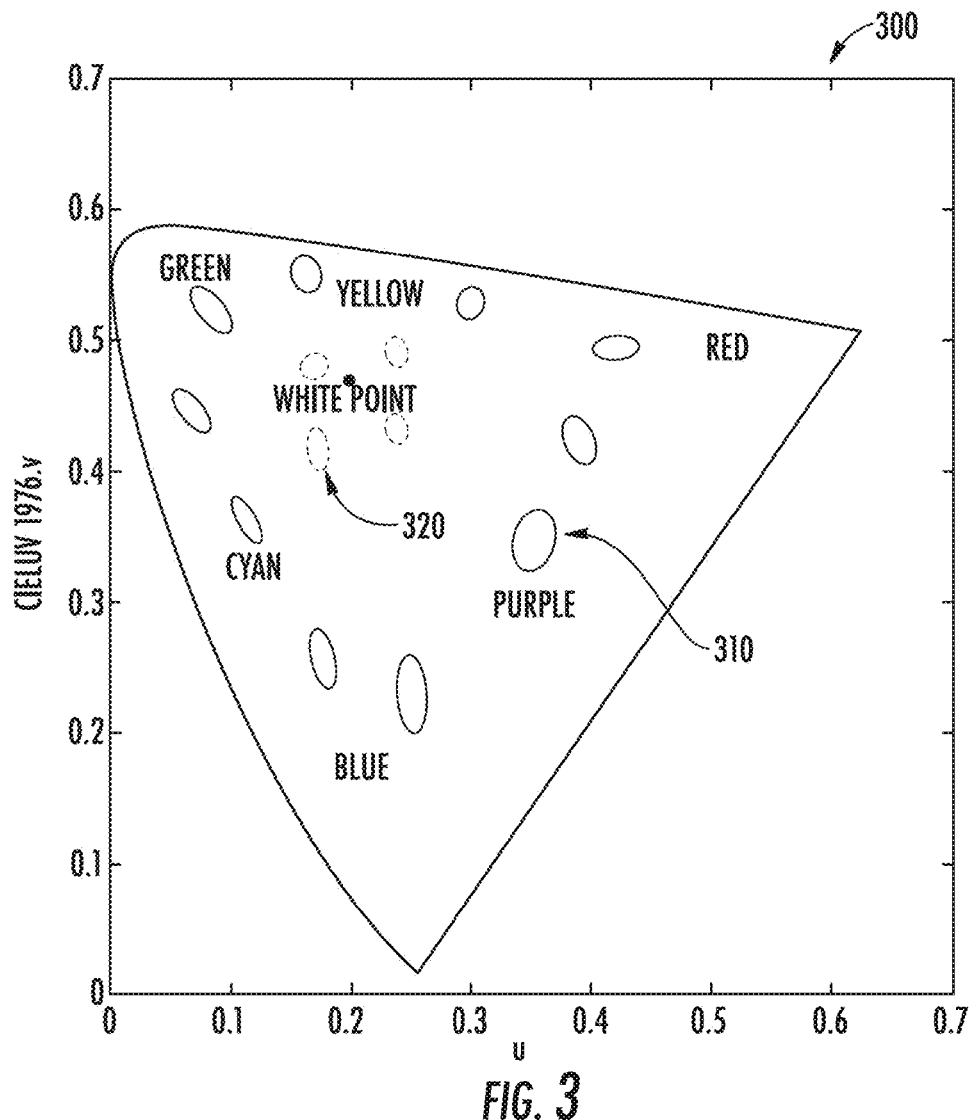
FIG. 3 shows the CIE 1976 LUV color space for a person with normal color vision, and examples of MacAdam Ellipses.

FIG. 3 illustrates the CIE 1976 LUV color gamut 300 for a person with normal color vision, and the associated example MacAdam Ellipses, which are example gamut regions that contain perceptually indistinguishable colors. Pastel colors 320 are closer to the White Point (WP) and have smaller MacAdam Ellipses, and saturated colors 310 are farther away from the WP and typically have larger MacAdam Ellipses. CAMs may model color perception of people with color vision deficiency (CVD) such as anomalous trichromacy or dichromacy. In anomalous trichromacy, deuteranomaly (deutan person, green color weak) and protanomaly (protan person, red color weak) are dominant forms. In dichromacy, deuteranopia (deutan person, green color blind) and protanopia (protan person, red color blind) are dominant types. Collectively, protanomaly, protanopia, deuteranomaly and deuteranopia are called Red-Green color blindness or color vision deficiency (CVD). Typically, people with Red-Green CVD cannot effectively distinguish red, green, and derivative colors, such as brown, yellow, orange (i.e., colors that are mixtures of reds and greens). Red-Green CVD may not effectively distinguish colors that blend red and/or green with "cool-toned" colors such as blue. For example, people with Red-Green CVD may confuse between cyan, blue, purple and/or pink colors.

TABLE 1

THE REFERENCE WHITE TRISTIMULUS VALUES OF THE TWO OPTICAL DEVICES
UNDER DAYLIGHT, FLUORESCENT LIGHTS, INCANDESCENT LIGHT AND LED LIGHTS

| REFERENCE PERCEPTUAL ENVIRONMENT | REFERENCE WHITE TRI-STIMULUS VALUES | CIE ILLUMINANT | | | | | | | |
|---|---|---|---|---|---|---|---|---|---|
| | | D65 | F2 | F7 | F11 | A | LED-3000K | LED-4000K | LED-5000K |
| AMBIENT, FOR SINGLE-& DOUBLE-PASS COSMETIC TINTS OF OD A & B | $X_{RW,t}$ | 85.25 | 57.40 | 39.32 | 26.14 | 45.31 | 78.59 | 87.26 | 52.94 |
| | $Y_{RW,t}$ | 89.69 | 58.51 | 41.80 | 24.90 | 41.24 | 72.83 | 87.40 | 54.48 |
| | $Z_{RW,t}$ | 97.64 | 36.19 | 43.33 | 17.00 | 14.68 | 22.46 | 46.30 | 43.85 |
| WEARER/RECEIVER PERCEPTION THROUGH OD A | $X_{RW,OD\,A}$ | 43.37 | 23.94 | 19.41 | 13.72 | 22.04 | 35.07 | 39.98 | 23.94 |
| | $Y_{RW,OD\,A}$ | 45.63 | 24.41 | 20.64 | 13.07 | 20.07 | 32.50 | 40.04 | 24.64 |
| | $Z_{RW,OD\,A}$ | 49.67 | 15.09 | 21.40 | 8.92 | 7.14 | 10.02 | 21.21 | 19.83 |
| WEARER/RECEIVER PERCEPTION THROUGH OD 8 | $X_{RW,OD\,B}$ | 15.39 | 7.80 | 6.77 | 4.72 | 7.94 | 12.04 | 13.69 | 8.03 |
| | $Y_{RW,OD\,B}$ | 1619 | 795 | 720 | 449 | 723 | 11.16 | 13.71 | 8.27 |
| | $Z_{RW,OD\,B}$ | 17.62 | 4.92 | 7.46 | 3.07 | 2.57 | 3.44 | 7.26 | 6.65 |

Table 1 represents the application of Equations 1 and 2 to ODs A and B as examples. RWs comprise of values in Table 1. Those RW tristimulus values for OD A and B are also the single-pass and double-pass cosmetic tints of any OD in ambient RPE, under the illuminants of CIE D65, CIE F2, CIE F7, CIE F11, CIE A, or specified LED sources of LED 3000K, LED 4000K or LED 5000K.

Figure 4:
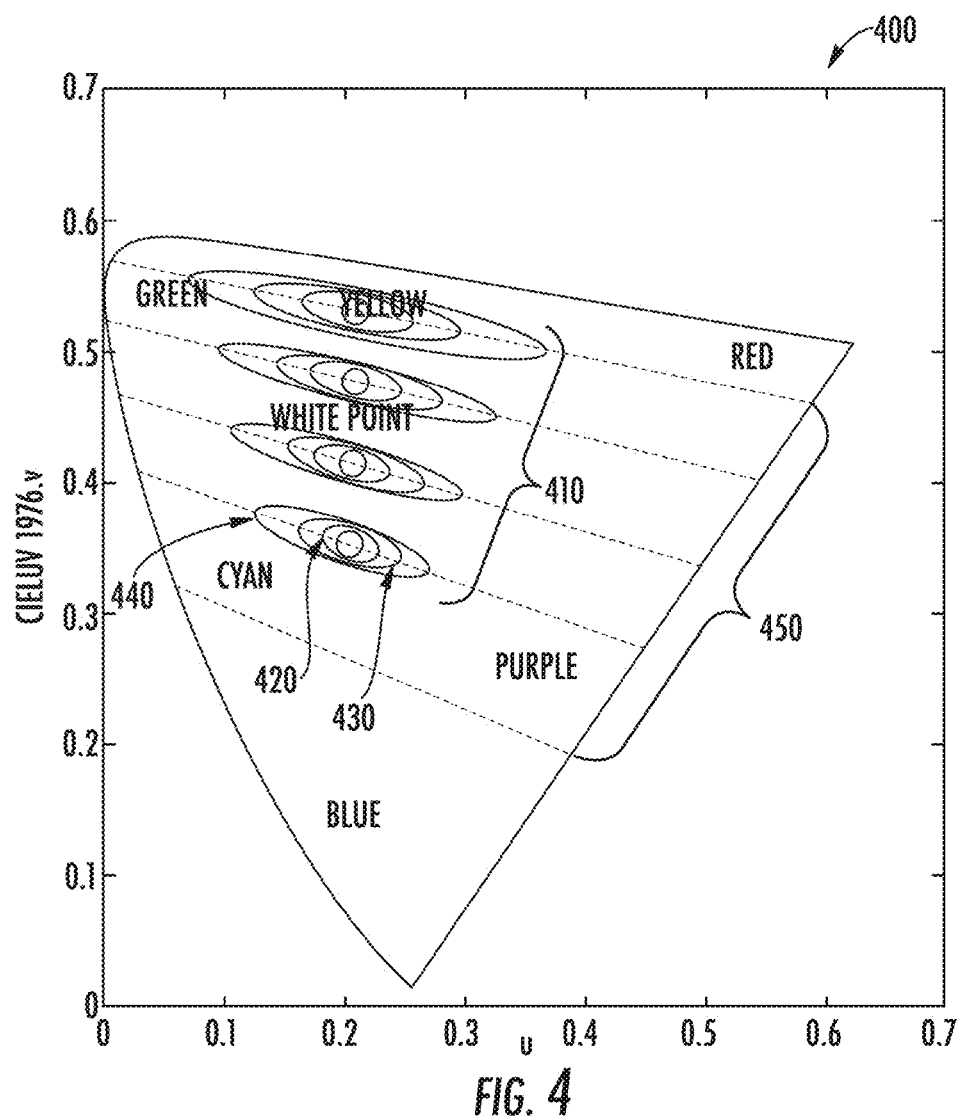
FIG. 4 shows the CIE 1976 LUV color gamut for a person with deuteranomalous and deuteranopic color vision and illustrates the color confusion lines for the deuteranopic.

The CIE 1976 CAM and indeed other CAMs can accurately model normal human color vision or trichromacy. Normal trichromacy is the perception of color based on three color sensors in the eye, called color cones. L-cone is most sensitive to long wavelength visible light, M-cone is most sensitive to medium wavelength visible light, and S-cone is FIG. 4 illustrates the CIE 1976 LUV color gamut 400 for a person with deuteranomalous and deuteranopic color vision. The associated samples of MacAdam Ellipses for deuteranomaly 410 are drawn, which are the example gamut regions that contain "confused" colors. Those with mild, moderate or strong deuteranomaly have smaller size MacAdams Ellipses 420, medium size MacAdams Ellipses 430 or larger size MacAdams Ellipses 440. FIG. 4 also illustrates the color confusion lines 450 for the deuteranopic. Colors along and close to those lines are all confusing colors to the deuteranopic, whose CVD is more severe than the deuteranomalous. However, colors on different color confusion lines are differentiable by the deuteranopic.

Figure 5:
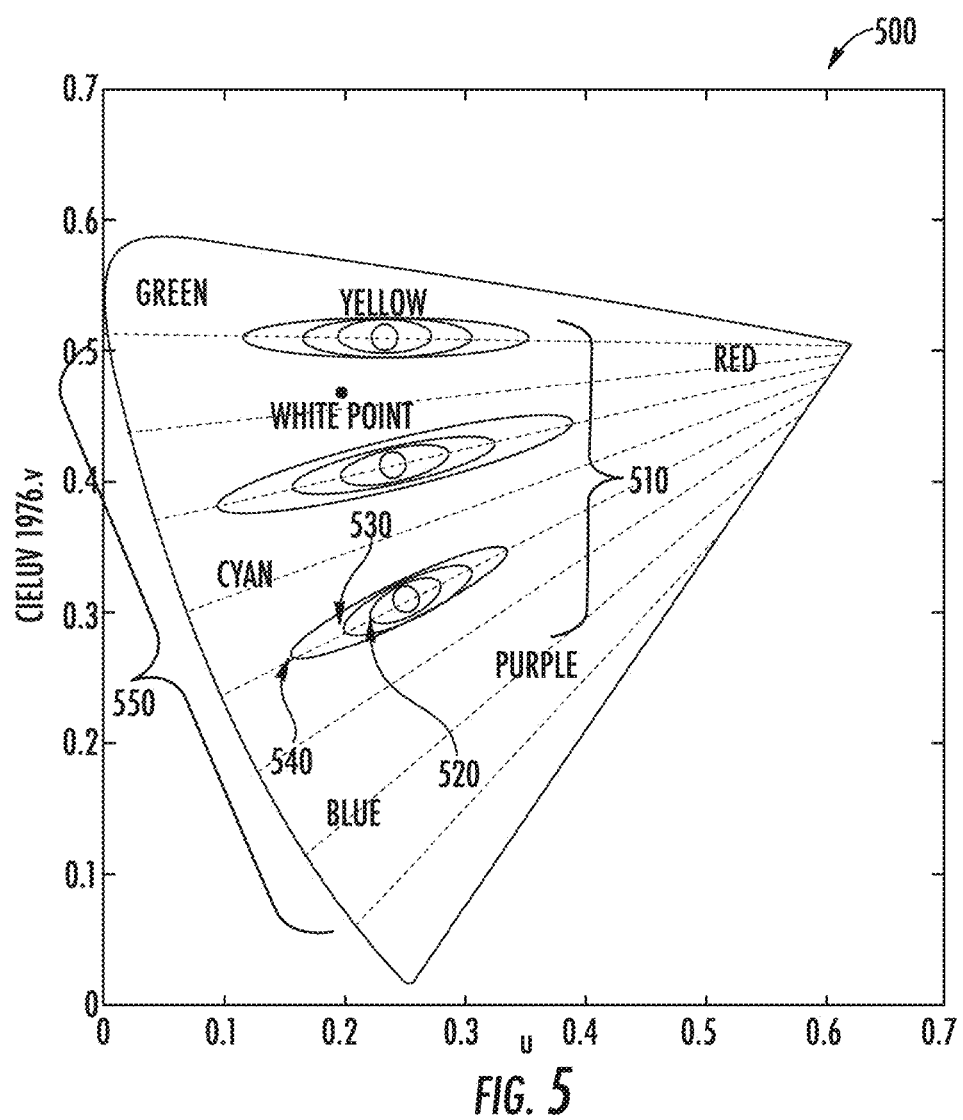
FIG. 5 shows the CIE 1976 LUV color gamut for a person with protanomalous and protanopic color vision and illustrates the color confusion lines for the protanopic.

FIG. 5 shows the CIE 1976 LUV color gamut 500 for a person with protanomalous and protanopic color vision. The associated examples of MacAdam Ellipses for protanomaly 510 are drawn and include the example gamut regions that contain "confused" colors. Those with mild, moderate or strong protanomaly have smaller size MacAdam Ellipses 520, medium size MacAdam Ellipses 530 or larger size MacAdam Ellipses 540. FIG. 5 also illustrates the color confusion lines 550 for the protanopic. Colors along and close to those lines are all confusing colors to the protanopic, whose CVD is more severe than the protanomalous. Similar to the deuteranopic, colors on different color confusion lines are differentiable by the protanopic.

In terms of variations in CMFs between those with normal color visions and those with Red Green CVD, for the 1931 SO (CIE Standard Observer) the CMF's peak sensitivities are located at 599 nm, 555 nm and 446 nm, respectively. For a protanomalous person, the peak sensitivity of the L-cone may be located at a wavelength different than 599 nm, e.g., at 598 nm or less or 600 nm or more, and additionally or independently may have a peak sensitivity value of less than 100% of that for the L-cone CMF of the normal person. For a deuteranomalous person, the peak sensitivity of the M-cone may be located at a wavelength different than 555 nm, e.g., at 554 nm or less or 556 nm or more, and additionally or independently may have a peak sensitivity value of less than 100% of that for the M-cone CMF of the normal person.

Moreover, for the 1964 SO, the CMF's peak sensitivities are located at 595 nm, 557 nm and 445 nm, respectively. For a protanomalous person, the peak sensitivity of the L-cone may be located at a wavelength different than 595 nm, e.g., at 594 nm or less or 596 nm or more, and additionally or independently may have a peak sensitivity value of less than 100% of that for the L-cone CMF of the normal person. For a deuteranomalous person, the peak sensitivity of the M-cone may be located at a wavelength different than 557 nm, e.g., at 556 nm or less or 558 nm or more, and additionally or independently may have a peak sensitivity value of less than 100% of that for the M-cone CMF of the normal person.

For both the 1931 SO and 1964 SO, a person with protanopia is missing or otherwise does not have the use of the L-cone. Therefore, the L-cone CMF, $\bar{x}$, is not used in the design of an optical device that corrects or enhances such protan's color vision. The values and wavelength positions of the peak sensitivities of the M-cone and S-cone CMFs may also be different than that for the normal color vision person.

For both the 1931 SO and 1964 SO, a person with deuteranopia is missing or otherwise does not have the use of the M-cone. Therefore, the M-cone CMF, $\bar{y}$, is not used in the design of an optical device that corrects or enhances such deutan's color vision. The values and wavelength positions of the peak sensitivities of the L-cone and S-cone CMFs may also be different than that for the normal color vision person.

Yellow Color Vision (YCV) or blue-yellow color confusion is another form of CVD addressed in this disclosure, besides red-green CVD. YCV occurs in the color vision of mammals, including humans, when the white point (WP) of color vision shifts to from neutral or white (including near neutral) to yellow, yellow-orange, brown or yellow-green. Among a number of causes, YCV can be due to the yellowing of natural crystalline lenses (NCLs) in the eye or yellow artificial lens, such as the intraocular lenses (IOLs). Often, though not exclusively, YCV is age-related, and people in their early forties can start to develop YCV, and on average, YCV worsens as they age. YCV is predominately an acquired CVD, unlike dominant forms of red-green CVD, which are generally hereditary. The yellowing of NCLs or IOLs can be attributed to the increased absorption of blue, cyan, and/or green wavelengths, i.e. between 380 nm and 580 nm, by those optical media. Some absorption between 580 nm and 780 nm may also occur by NCLs or IOLs, and at a lower absorption level. This type of unbalanced absorption creates YCV through yellowing of optical media.

In the systems and method described herein, representative sets of colors, spanning reds, greens, blues, yellows, and derivative colors, such as cyans and magentas, are used to characterize the color vision of normal people, and of those who are deuteranomalous, deuteranopic, protanomalous and protanopic. One such representative color set to use is the 1296 Munsell Colors. Well-known CVD tests, such as the Munsell 100-Hue Test and Farnsworth D-15 Test, use Munsell Colors to determine colorblindness. A subset of Munsell Color's reflectance spectra for red, green, blue and yellow colors, as well as derivative colors may be used. Reflectance spectra set for red Munsell colors is comprised of one or more of the following Munsell designations: 2.5YR 5/4, 7.5R 5/4, 2.5R 5/4, 5RP 5/4, 10P 5/4, 10YR 5/4, 10R 5/4, 10RP 5/4. Reflectance spectra set for green Munsell colors is comprised of one or more of the following Munsell designations: 5BG 5/4, 10G 5/4, 5G 5/4, 10GY 5/4, 5GY 5/4, 10BG 5/4. Reflectance spectra set for blue Munsell colors is comprised of one or more of the following Munsell designations: 5B 5/4, 10BG 5/4, 5BG 5/4, 5P 5/4, 10B 5/4, 10P 5/4, 10PB 5/4. Reflectance spectra set for yellow Munsell colors is comprised of one or more of the following Munsell designations: 10GY 5/4, 5GY 5/4, 5Y 5/4, 10YR 5/4, 2.5YR 5/4, 10Y 5/4, 10YR 5/4. Additional reflectance spectra for red, green, blue, yellow and derivative colors come from reflectance scans of natural colors, such as leafs, flowers and woods.

Figure 6:
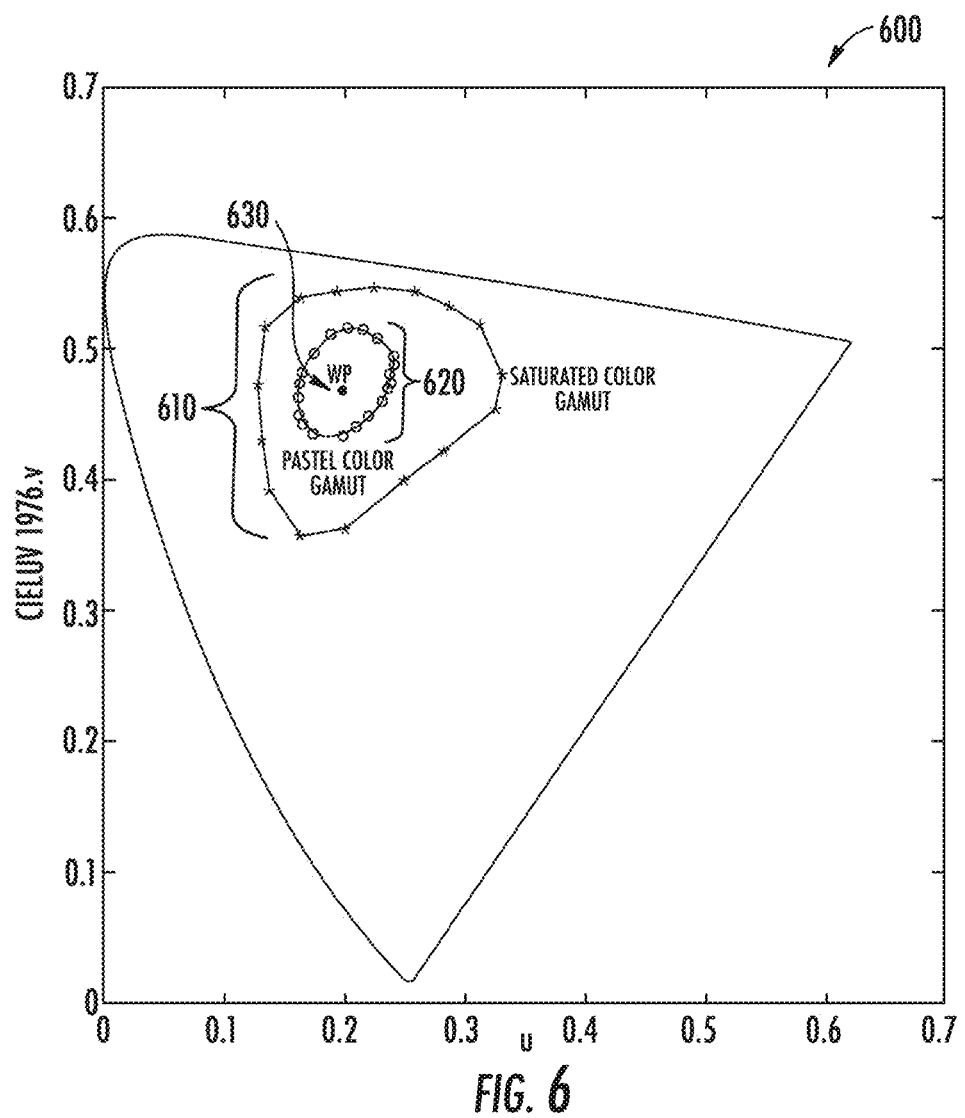
FIG. 6 illustrates sample Munsell Colors used to characterize color vision for normal people and those with Red-Green CVD and yellow color vision (YCV)

FIG. 6 illustrates sample Munsell Colors 600 used to characterize color vision for normal people and those with CVD. The outer gamut 610 is encircled by saturated Munsell Colors. The inner gamut 620 is encircled by pastel Munsell Colors. The centroidal point 630 is the WP of CIE D65 illuminant. The data of FIG. 6 results from the illumination by CIE D65 daylight as an example illuminant. Many other illuminants are possible, and are readily available via CIE standards or spectral spectroscopy.

In evaluation of all CPMs, including color difference and lightness difference evaluations, (1) the green Munsell color set used includes the following Munsell designations: 5G 5/4, 10GY 5/4, 5GY 5/4, (2) the red Munsell color set used includes the following Munsell designations: 2.5YR 5/4, 7.5R 5/4, 10RP 5/4, (3) the blue Munsell color set includes the following Munsell designations: 10B 5/4, 5B 5/4, 10PB 5/4, and (4) the yellow Munsell color set includes the following Munsell designations: 10Y 5/4, 10YR 5/4, 5Y 5/4.

The set of pastel Munsell colors that form the pastel color gamut are: 10B 5/4, 5B 5/4, 10BG 5/4, 5BG 5/4, 10G 5/4, 5G 5/4, 10GY 5/4, 5GY 5/4, 10Y 5/4, 5Y 5/4, 10YR 5/4, 2.5YR 5/4, 10R 5/4, 7.5R 5/4, 2.5R 5/4, 10RP 5/4, 5RP 5/4, 10P 5/4, 5P 5/4, 10PB 5/4.

The set of saturated Munsell colors that form the saturated color gamut are: 7.5B 5/10, 10BG 5/8, 2.5BG 6/10, 2.5G 6/10, 7.5GY 7/10, 2.5GY 8/10, 5Y 8.5/12, 10YR 7/12, 5YR 6/12, 10R 6/12, 2.5R 4/10, 7.5RP 4/12, 2.5RP 4/10, 7.5P 4/10, 10PB 4/10, 5PB 4/10.

In the Munsell color system, b-denotes blue hue, "G" denotes green hue, "Y" denotes yellow hue, "R" denotes red hue, "P" denotes purple hue. A combination of two hues denotes a hue that is in-between these two hues. For example, "RP" denotes a hue in-between a red hue and a purple hue, while "BG" denotes a hue in-between a blue hue and a green hue. Some in-between hues may have unique names, such as "BG" can be called cyan herein.

Figure 7A:
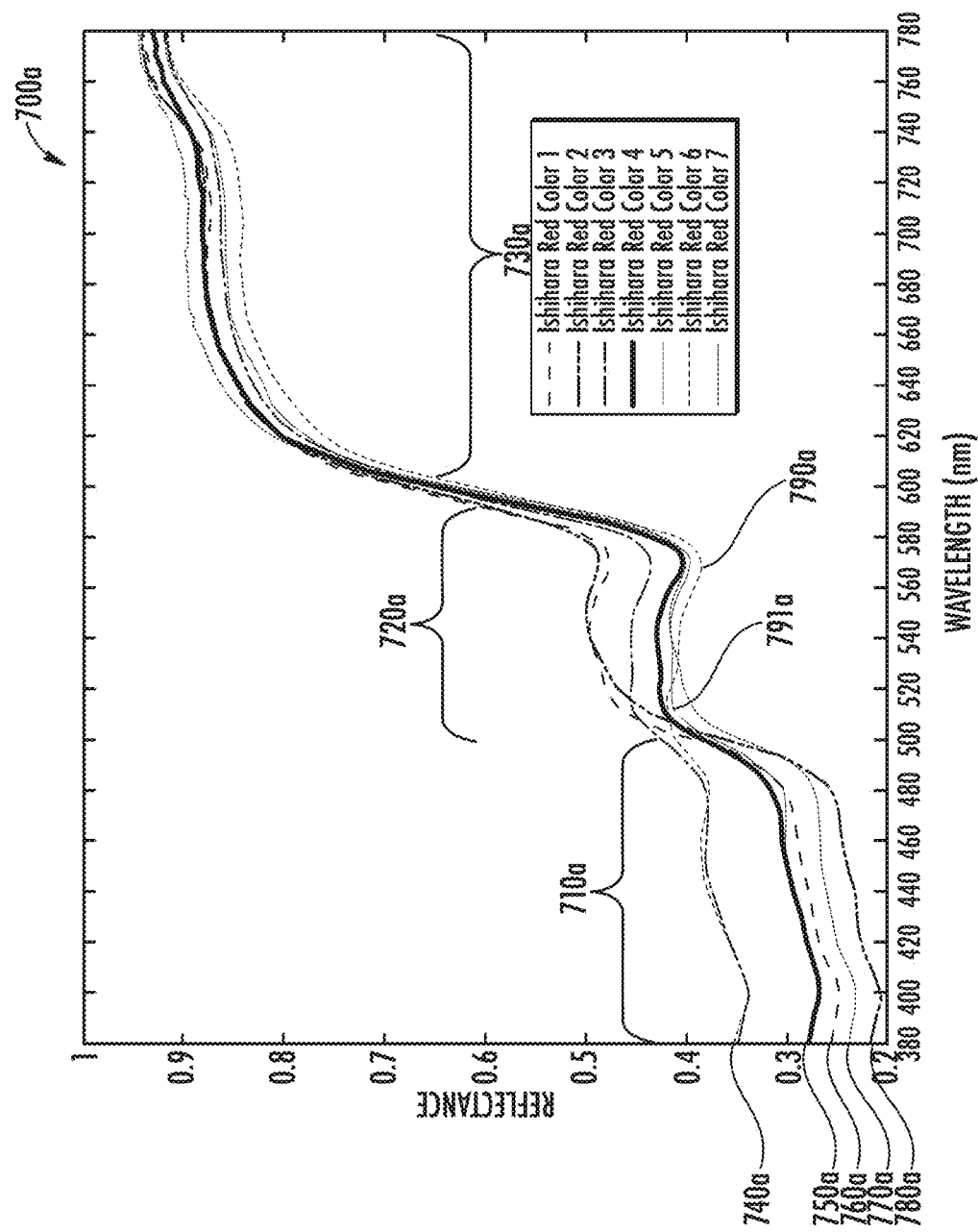
FIG. 7A illustrates 7 reflectance spectra of Ishihara red colors used in this invention.
Figure 7B:
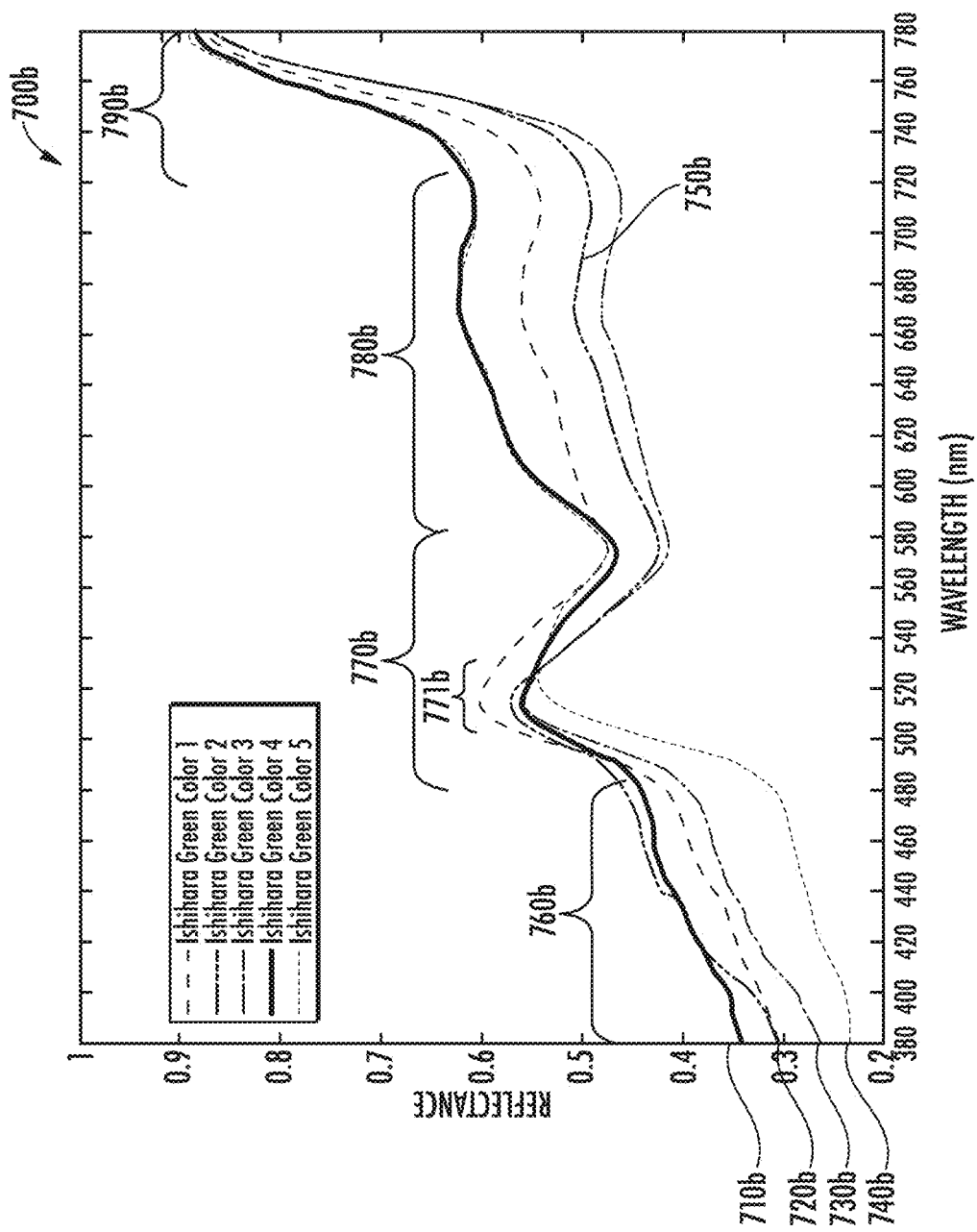
FIG. 7B illustrates 5 reflectance spectra of Ishihara green colors used in this invention.

Another representative color set is comprised of colors used in Ishihara Colorblind Test. Reflectance spectra of colors in the Ishihara's Tests for Color Deficiency 38 Plates are from the 2016 Ishihara's Tests For Color Deficiency, 38 Plates Edition, published by Kanehara Trading Inc., Tokyo, Japan. FIGS. 7A and 7B illustrate the reflectance of 7 colors forming the Ishihara red color set and 5 colors forming the Ishihara green color set used in this invention, respectively. These Ishihara colors are used to evaluate the CPM of red-green lightness difference (LD).

FIG. 7B illustrates the 7 Ishihara red colors 700*a* with each of the respective colors being represented by curves 740*a*, 750*a*, 760*a*, 770*a*, 780*a*, 790*a*, 791*a*. The curves 740*a*, 750*a*, 760*a*, 770*a*, 780*a*, 790*a*, 791*a* exhibit reflectance between: (1) 380 nm to 499 nm have reflectance 710*a* of between approximately 0.2 (20%) and 0.45 (45%), (2) 500 nm to 589 nm have reflectance 720*a* between approximately 0.4 (40%) and 0.55 (55%), and (3) 590 nm to 780 nm have reflectance 730*a* between approximately 0.5 (50%) and 0.95 (95%).

FIG. 7B shows the 5 Ishihara green colors 700*b* with each of the respective colors being represented by curves 710*b*, 720*b*, 730*b*, 740*b*, 750*b*. The curves 710*b*, 720*b*, 730*b*, 740*b*, 750*b* exhibit reflectance between: (1) 380 nm to 480 nm have reflectance 760*b* between approximately 0.25 (25%) and 0.45 (45%), (2) 481 nm to 580 nm have reflectance 770*b* between approximately 0.45 (45%) and 0.6 (60%) with local reflectance peaks 771*b* between approximately 505 nm and 530 nm, (3) 581 nm to 720 nm have reflectance 780*b* between approximately 0.4 (40%) and 0.65 (65%), and (4) 721 nm to 780 nm have reflectance 790*b* between approximately 0.45 (45%) and 0.9 (90%).

Figure 8:
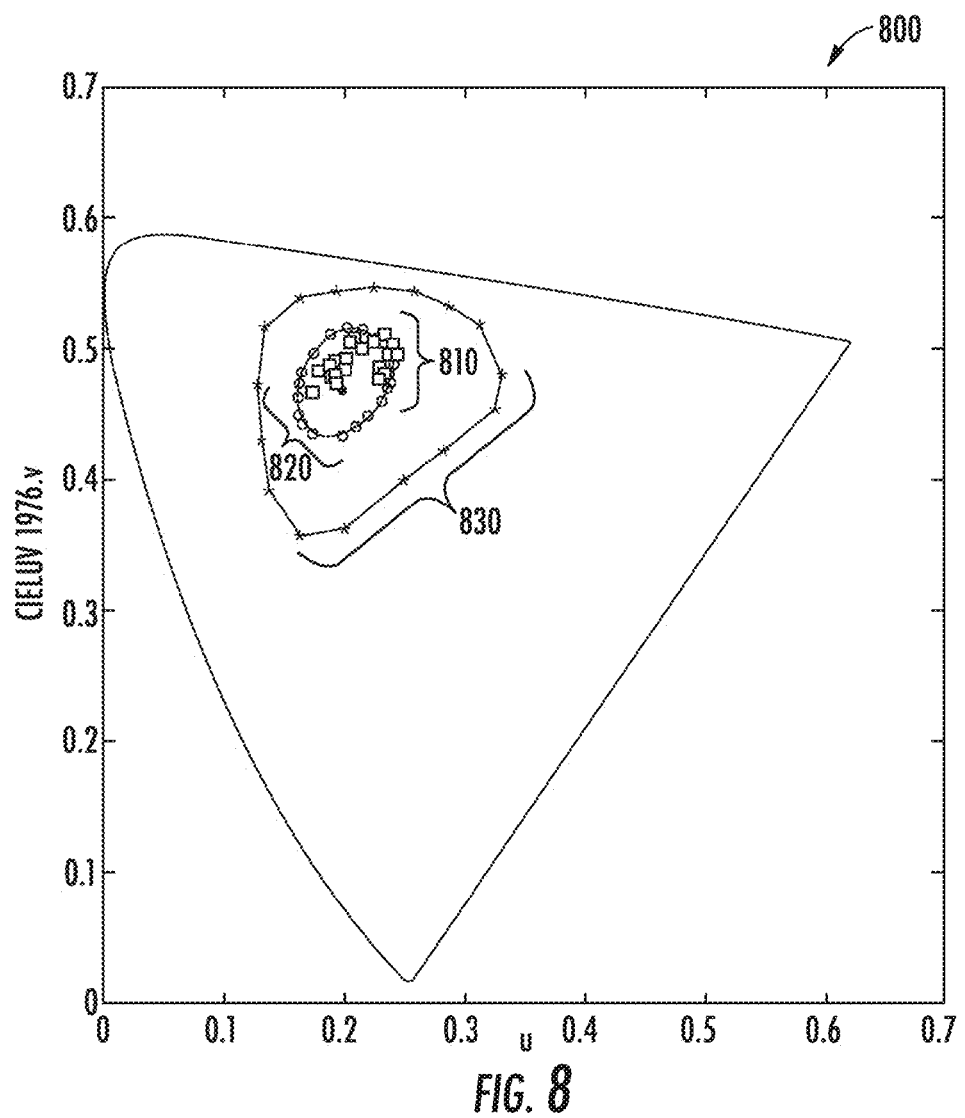
FIG. 8 shows the perceived colors of the sample set of the Ishihara reflectance spectra shown in FIG. 7.

FIG. 8 shows the perceived colors 800 of an expanded sample set of the Ishihara reflectance spectra in the CIE 1976 LUV color space 810 (marked by squares). The sample Ishihara colors cover cyan, green, yellow, orange, red hues, and overlay the Munsell pastel 820 and saturated color gamuts 830 as shown by connected circle markers and connected star markers, respectively.

The optical devices described herein may be designed to be illuminated by a single illuminant, a combination of illuminants at the same time and/or multiple separate illuminants in different lighting environments. Illuminants include primary sources, such as a light producing body—sun, reflective surfaces and/or fluorescent bodies. All illuminants have a SPD that can be characterized. CIE standard illuminants used in this invention include: (1) daylight sources such as CIE D55, D65, D75, (2) fluorescent sources such as CIE F2, F7 and F11, (3) incandescent or filament sources such as CIE A, (4) light-emitting diode (LED) sources such as the CIE L-series, and (5) any blend of two or more of these sources. The blending of light sources can be appropriate for lighting environments with multiple illuminants at the same time, such as a blend of daylight and fluorescent lighting in an office space. One such blending technique is a linear combination of two or more of illuminants as provided in Equation 3.

$$\text{Blended Light} = \Sigma a_i * \text{Illuminant}_i, i \in \text{selected Illuminants} \quad \text{Equation 3,}$$

where {a} is the set of constants that weight the contribution of each illuminant to be blended. For example, a blended light may be comprised of or modeled with 75% F2 fluorescent light and 25% D65 daylight. Typically, the sum of all {a} equals 1 (100%), with each $a_i$ value between 0 (0%) and 1 (100%), inclusive.

As described herein the default illuminant is CIE D65, unless specified otherwise.

The described systems and methods include several crucial CPMs useful for both design and construction of the optical device that correct or reduce CVD or enhance normal color vision through increasing color contrast. The described systems and methods contrast between two or more colors defined as the color difference between the colors in terms of hue, chroma and/or lightness. These three-dimensions of color difference may be evaluated independently or jointly.

In the CIE 1976 LUV CAM, the color gamut coordinates are denoted u and v, and the lightness scale denoted L, completely defining hue, chroma and lightness. The described systems and methods incorporate the lightness of the optical device (OD) designed and constructed is a key CPM and defined by Equations 4-6, below.

$$\text{Tristimulus Values}_{OD} = \quad \text{Equation 4}$$

$$\begin{cases} Y_{OD} = \sum_{\lambda=380nm}^{\lambda=780nm} [\text{Illuminant}(\lambda)T(\lambda)\bar{y}(\lambda)] \\ X_{OD} = \sum_{\lambda=380nm}^{\lambda=780nm} [\text{Illuminant}(\lambda)T(\lambda)\bar{x}(\lambda)] \\ Z_{OD} = \sum_{\lambda=380nm}^{\lambda=780nm} [\text{Illuminant}(\lambda)T(\lambda)\bar{z}(\lambda)] \end{cases}$$

$$f(Y_{OD}) = \begin{cases} \left(\frac{Y_{OD}}{100}\right)^{\frac{1}{3}}, & Y_{OD} > 100 * \left(\frac{6}{29}\right)^3 \\ \frac{1}{3}\left(\frac{29}{6}\right)^2 \left(\frac{Y_{OD}}{100}\right) + \frac{4}{29}, & \text{otherwise} \end{cases} \quad \text{Equation 5}$$

$$L_{OD} = 116 f(Y_{OD}) - 16. \quad \text{Equation 6}$$

The illuminant may be any singular illuminants or any blended light. $T(\lambda)$ is the transmission spectrum of the optical device. $L_{OD}$ is the lightness of the optical device. A minimum transmission value of the optical device of at least 0.1% can be imposed on the design and construction to ensure minimal transmittance at some or all visible wavelengths for safety or other reasons. For example, such minimum transmission limits may be imposed for one or more wavelengths within 550 nm to 620 nm, and within 440 nm to 510 nm.

Tristimulus values, denoted by X, Y, Z are comprised of spectra of the illuminant, the optical device transmission (in single-pass or double-pass), CMFs, and SPDs (e.g. reflectance) of colors in view. Tristimulus Values$_{OD}$ denotes tristimulus values with a selective light transmission optical device (OD).

Lightness of the optical device is a similar CPM to the photopic and scotopic luminosity of the OD, which are the apparent transparencies of the optical device under lit or very dim light sources, respectively. Color correction or enhancement for those with Red Green CVD and/or YCV can be achieved through increased color difference, which is the enlarged perceived difference in two or more colors. Lightness differences between two or more colors are a factor in color contrast. In this invention, the lightness of color perceived through the optical device is a key CPM. Equations 7-9 define the perceived lightness of a color i through an optical device, where i is an index for a selected color such as the Munsell Color set, Ishihara color set, or other samples of natural or artificial colors.

Tristimulus $Values_{color\ i} =$ Equation 7

$$\begin{cases} Y_{color\ i} = \sum_{\lambda=380nm}^{\lambda=780nm} [\text{Illuminant}(\lambda)T(\lambda)C_i(\lambda)\bar{y}(\lambda)] \\ X_{color\ i} = \sum_{\lambda=380nm}^{\lambda=780nm} [\text{Illuminant}(\lambda)T(\lambda)C_i(\lambda)\bar{x}(\lambda)], \\ Z_{color\ i} = \sum_{\lambda=380nm}^{\lambda=780nm} [\text{Illuminant}(\lambda)T(\lambda)C_i(\lambda)\bar{y}(\lambda)] \end{cases}$$

$$f(Y_{color\ i}) = \begin{cases} \left(\frac{Y_{color\ i}}{100}\right)^{\frac{1}{3}}, & Y_{color\ i} > 100 * \left(\frac{6}{29}\right)^3 \\ \frac{1}{3}\left(\frac{29}{6}\right)^2\left(\frac{Y_{color\ i}}{100}\right) + \frac{4}{29}, & \text{otherwise} \end{cases}$$  Equation 8

$$L_{color\ i} = 116 f(Y_{color\ i}) - 16,$$ Equation 9 where $C_i(\lambda)$ is the spectral power distribution (SPD) incident on the optical device. Such SPDs can be reflectance or emission spectra of selected color i.

Another key CPM is the Lightness Difference (LD) between two colors or two sets of colors. Equation 10 below describes LD between any red color set and any green color set, forming red-green LD.

Red-Green Lightness Difference = Equation 10

$$L_{average,red} - L_{average,green} = \left(\frac{\sum_{r\in red\ color\ set} L_r}{R}\right) - \left(\frac{\sum_{g\in green\ color\ set} L_g}{G}\right).$$

where R is the number of colors in red color set, and G is the number of colors in the green color set.

For improvement in red-green color contrast in order to correct or reduce CVD or enhance normal color vision, LD between selected red and green color sets (red-green LD) are increased via perception through optical device. Red-green LD may simultaneously enlarge contrast of red or green derivative colors such as orange, rose, magenta, pink, purple, brown, yellow-green and cyan.

The transmission spectrum of the optical device, $T(\lambda)$, may be designed and constructed to amplify such red-green LD. The described Munsell Colors spectra for red and green color sets can be used to evaluate and improve the CPM of red-green LD.

The described Ishihara Colors spectra for red and green color sets, such as those in FIGS. 7A-B and/or 8 can be used to evaluate and increase the CPM of red-green LD.

Additional natural or artificial spectra colors spectra for red, green, yellow, blue and derivative colors can be used to evaluate and increase the CPM of red-green LD. Any combination of spectra of Munsell Colors, Ishihara Colors, and other natural and artificial colors for red, green, yellow, blue and/or derivative colors can be used to evaluate and increase the CPM of red-green LD. For example, if red-green LD of selected Munsell or Ishihara colors perceived with naked eye is some value A, and that perceived through OD is some value B, then the change/difference in red-green LD is B-A. Positive valued red-green LD means that lightness of the selected red color or color set is higher than lightness of the selected green color set. Vice versa for negative valued red-green LD.

Equations 11 and 12 define the evaluation of $\langle u,v \rangle$ in CIE LUV color space based on tristimulus values. uv is the chromaticity coordinates referenced herein when referring to CIE LUV.

$$u = \frac{4X}{X + 15Y + 3Z}.$$ Equation 11

$$v = \frac{9X}{X + 15Y + 3Z}.$$ Equation 12

Additional CPMs may enable design and construction of an optical device with the desired transmission spectrum is the White Point Shift (WPS) and Tinted Hue of the device. The WPS and Tinted Hue directly contribute to the cosmetic look of the device. Equation 13 defines WPS.

White Point Shift$_{optical\ device}=$
$$\sqrt{(u^*_{wp}-u^n_{wp})^2+(v^*_{wp}-v^n_{wp})^2}$$ Equation 13, where $\langle u^*_{wp}, v^*_{wp} \rangle$ and $\langle u^n_{wp}, v^n_{wp} \rangle$ denote White Point (WP) in uv coordinates of the optical device and with the naked eye, respectively. These WP coordinates correspond to a particular illuminant or Blended Light. These WP coordinates also correspond to a particular color vision, such as normal color vision or a deficient color vision. WP and WPS are associated with single-pass and/or double-pass tint of the OD. Tinted Hue of the optical device is the hue of the WP of the optical device in single-pass or double-pass OD tint. Generally, unspecified WP of OD refers to WP in single-pass, and not WP in double-pass.

Lightness-Independent Red-Green Color Difference ($RG_{LI}$ Color Difference) is another CPM. As FIGS. 4 and 5 illustrate, the MacAdam Ellipses for the color deficient encompasses large gamuts of red, green and derivative colors. Colors inside the MacAdam Ellipses are confusing or hard to distinguish colors for the protan and deutan, particularly the protanomalous and deuteranomalous. Often those with protanopia and deuteranopia have even more elongated and enveloping MacAdam Ellipses. The dichromatic may also confuse most or all colors along and adjacent to the color confusion lines as illustrated in FIGS. 4 and 5. Therefore, increasing $RG_{LI}$ Color Difference is an effective method to reducing the color confusion, increasing the color discernment for red-green and derivative colors for those with red-green CVD and/or for those with normal color vision. The designs and constructions of optical devices with the desired transmission spectra that achieve the desired increases in $RG_{LI}$ Color Difference, can also achieve other CPMs in order to correct or reduce CVD and/or enhance normal color vision. Equation 14 discloses the $RG_{LI}$ Color Difference formula in uv coordinates.

$RG_{LI}$Color Difference$=\sqrt{(u_{red}-u_{green})^2+(v_{red}-v_{green})^2}$ Equation 14, where the red and green colors selected for evaluation can be single colors, or one or more sets of red colors, and one or more sets of green colors.

The specified Munsell red color set and Munsell green color set are inputs into CPMs calculations, including $RG_{LI}$ color difference, $RG_{LI}$ color difference percent, LAB $RG_{LI}$ color difference, LAB $RG_{LI}$ color difference percent, and red-green LD. The specified Ishihara red color set and Ishihara green color set are inputs into CPMs calculations, including red-green LD. The specified Munsell blue color set and Munsell yellow color set are inputs into CPMs calculations, including $BY_{LI}$ color difference, $BY_{LI}$ color difference percent, LAB $BY_{LI}$ color difference, and LAB $BY_{LI}$ color difference percent.

The average statistic of one or more selected red color sets can be used to enumerate $\langle u_{red}, v_{red}\rangle$, $\langle a_{red}, b_{red}\rangle$ and $L_{red}$. The average statistic of one or more selected green color sets can be used to enumerate $\langle u_{green}, v_{green}\rangle$, $\langle a_{green}, b_{green}\rangle$ and $L_{green}$.

The average statistic of one or more selected blue color sets can be used to enumerate $\langle u_{blue}, v_{blue}\rangle$, $\langle a_{blue}, b_{blue}\rangle$ and $L_{blue}$. The average statistic of one or more selected yellow color sets can be used to enumerate $\langle u_{yellow}, v_{yellow}\rangle$, $\langle a_{yellow}, b_{yellow}\rangle$ and $L_{yellow}$.

The individual coordinate variable of <L, u, v>, of Luv color system and <L, a, b> of CIE LAB color system in CPMs calculations are individual averages of the underlying colors' corresponding coordinate for a defined color set, provided that one or more color sets are specified for the CPM. L of Luv equal to L of Lab. For example, $u_{red}$ is the average of u-coordinate values of all colors in a selected red color set; $v_{red}$ is the average of v-coordinate values of all colors in a selected red color set; similarly for a selected green, yellow and/or blue color set. For example, $a_{red}$ is the average of a-coordinate values of all colors in a selected red color set; $b_{red}$ is the average of b-coordinate values of all colors in a selected red color set; similarly for a selected green, yellow and/or blue color set. For example, $L_{red}$ is the average of L-coordinate values of all colors in a selected red color set; similarly for a selected green, yellow and/or blue color set.

The CPM that compares the $RG_{LI}$Color Difference Percent between seeing the contrast of red and green color sets with a designed and constructed optical device with seeing the color contrast with only the naked eye is provided by Equation 15.

$$RG_{LI}\text{Color Difference Percent} = \qquad \text{Equation 15}$$

$$100\left(\frac{RG_{LI}\text{Color Difference With Optical Device}}{RG_{LI}\text{Color Difference With Naked Eye}} - 1\right) =$$

$$100\left(\frac{\sqrt{(u^*_{red} - u^*_{green})^2 + (v^*_{red} - v^*_{green})^2}}{\sqrt{(u^\eta_{red} - u^\eta_{green})^2 + (v^\eta_{red} - v^\eta_{green})^2}} - 1\right),$$

where $\langle u^*, v^*\rangle$ and $\langle u^\eta, v^\eta\rangle$ denote color space coordinates with an optical device and with the naked eye, respectively.

The CPM of Total Red-Green Color Difference ($RG_{Total}$ Color Difference) defines red-green color difference to include all three aspects of color: lightness, hue and chroma, as Equation 16 shows.

$$RG_{Total}\text{Color Difference} = \qquad \text{Equation 16}$$

$$\sqrt{LD^2_{red-green} + RG_{LI}\text{Color Difference}^2} =$$

$$\sqrt{(L_{red} - L_{green})^2 + (u_{red} - u_{green})^2 + (v_{red} - v_{green})^2}.$$

The CPM that compares the $RG_{Total}$Color Difference between seeing the contrast of red and green color sets with a designed and constructed optical device with seeing the color contrast with only the naked eye is described in Equation 17.

$$RG_{Total}\text{Color Difference Percent} = \qquad \text{Equation 17}$$

$$100\left(\frac{RG_{Total}\text{Color Difference With Optical Device}}{RG_{Total}\text{Color Difference With Naked Eye}} - 1\right) =$$

$$100\left(\frac{\sqrt{(L^*_{red} - L^*_{green})^2 + (u^*_{red} - u^*_{green})^2 + (v^*_{red} - v^*_{green})^2}}{\sqrt{(L^\eta_{red} - L^\eta_{green})^2 + (u^\eta_{red} - u^\eta_{green})^2 + (v^\eta_{red} - v^\eta_{green})^2}} - 1\right),$$

where $\langle L^*, u^*, v^*\rangle$ and $\langle L^\eta, u^\eta, v^\eta\rangle$ denote color space coordinates, lightness included, with an optical device and with the naked eye, respectively. That is "*" denote the use of OD and "$\eta$" denote use of the naked eye.

In the evaluation of all colorimetric characteristics, including all CPMs and color gamuts, the Tristimulus values as described in Equation 4 are used to evaluate the underlying color space coordinates, for color vision involving the optical devices. In the evaluation of all colorimetric characteristics, including all CPMs and color gamuts, the Tristimulus values as described in Equation 7 are used to evaluate the underlying color space coordinates, for color vision involving the optical devices and selected colors, including color sets.

The CPM of Hue Shift (HS) is a factor in the design and construction of the optical device. HS is defined as the ability of optical devices, through the transmission spectra, to maintain or alter the original hues of colors when viewed with and without the optical device. In some embodiments, HS is constrained to the "Preservation, Preserve or Preserved" category. That is, for example, if a color originally has a green hue viewed with the naked eye, then an optical device have "preserved green hue" if the perceived color maintains a substantially green hue when viewed with the optical device. In some embodiments, HS is constrained to the "Alteration, Alter or Altered" category. That is, for example, if a color originally has a green hue viewed with the naked eye, then an optical device have "altered green hue" if the perceived color changed from a green hue to a substantially non-green hue when viewed with the optical device. HS is applied to every hues perceivable, comprised of green, cyan, blue, purple, red, orange, yellow, green-yellow, and neutral (inclusive of white, grey and black) hues.

In the design and construction of the transmission spectra of optical devices, it may be beneficial to have minimum transmission limits (MTLs) over some or all regions of wavelengths from 380 nm to 780 nm. In particular, a MTL of 0.01% or more for some or all wavelengths between 500 nm and 650 nm allows sufficient illumination from traffic lights to pass through the optical device and to be detected by drivers.

Lightness-Independent Blue-Yellow Color Difference ($BY_{LI}$ Color Difference) is a CPM important for an optical device designed and constructed to reduce Yellow Color Vision (YCV). Larger $BY_{LI}$Color Difference increases the ability of someone with YCV to distinguish between yellow, blue and derivative colors, such as yellow-green, cyan, yellow-orange, and purple. Uncorrected YCV have more difficulty in distinguishing those colors.

The designs and constructions of optical devices with the desired transmission spectra to achieve the increases in $BY_{LI}$ Color Difference and $BY_{LI}$ Color Difference Percent in order to correct or reduce YCV and/or enhance normal color vision, and/or also to achieve other CPMs. Equation 18 discloses the $BY_{LI}$ Color Difference formula.

$$BY_{LI} \text{Color Difference} = \sqrt{(u_{blue} - u_{yellow})^2 + (v_{blue} - v_{yellow})^2} \quad \text{Equation 18,}$$

where the blue and yellow colors selected for evaluation may be single colors, or one or more sets of blue colors, and one or more sets of yellow colors.

The CPM, described in Equation 19, compares the $BY_{LI}$ Color Difference Percent for a YCV person between seeing the contrast of blue and yellow color sets with a designed and constructed optical device with seeing the color contrast with the unassisted naked eye.

$$BY_{LI} \text{Color Difference Percent} = \quad \text{Equation 19}$$

$$100 \left( \frac{BY_{LI} \text{Color Difference With Optical Device}}{BY_{LI} \text{Color Difference With Unassisted YCV}} - 1 \right) =$$

$$100 \left( \frac{\sqrt{(u^*_{blue} - u^*_{yellow})^2 + (v^*_{blue} - v^*_{yellow})^2}}{\sqrt{(u^\eta_{blue} - u^\eta_{yellow})^2 + (v^\eta_{blue} - v^\eta_{yellow})^2}} - 1 \right),$$

where $\langle u^*, v^* \rangle$ and $\langle u^\eta, v^\eta \rangle$ denote color space coordinates of a YCV viewer seeing with an optical device and with the unassisted naked eye, respectively.

Tuning the transmission spectra of an optical device that improves YCV can achieve (1) larger $BY_{LI}$ Color Difference, including percentage difference, in order to better distinguish blue, yellow and similar colors, (2) decreased WPS of the assisted or corrected YCV, i.e. WPS of the light on the retina after passing through the OD, NCL or IOL and any other light altering media, and/or (3) minimal WPS of the optical device as acceptable cosmetic tints.

Color balance is the adjustment and/or control (collectively termed "manage") of perceived color, typical of an objective, such as an optical device. Color balance may manage the residual cosmetic tint of an optical device due to the device's spectral requirements. For instance, to increase an optical device's performance in $RG_{LI}$ Color Difference Percent, inhibiting only yellow wavelengths between 550 nm and 600 nm in the optical device's transmission spectrum will result in a perceived blue, cyan or purple residual cosmetic tint on the optical device. Color balancing may be used to further modify the optical device's transmission spectrum to achieve or improve towards a neutral tint or another desirable tint. Another example application of color balancing is to design and construct an optical device to correct CVD while simultaneously manage the otherwise variable cosmetic tints of the optical device under different lighting conditions, e.g. daylight, fluorescent lights, incandescent light and LED lights. This type of color balance is called color constancy. In various applications, some color balancing cases may involve the use of chromic colorants, which create variable spectra from a single optical device or optical system to compensate for the corresponding variable lighting conditions. Other cases involve the careful design and construction of an optical device's single or fixed transmission spectrum to color balance the optical device's cosmetic tints under a variety of lighting conditions.

Figure 9:
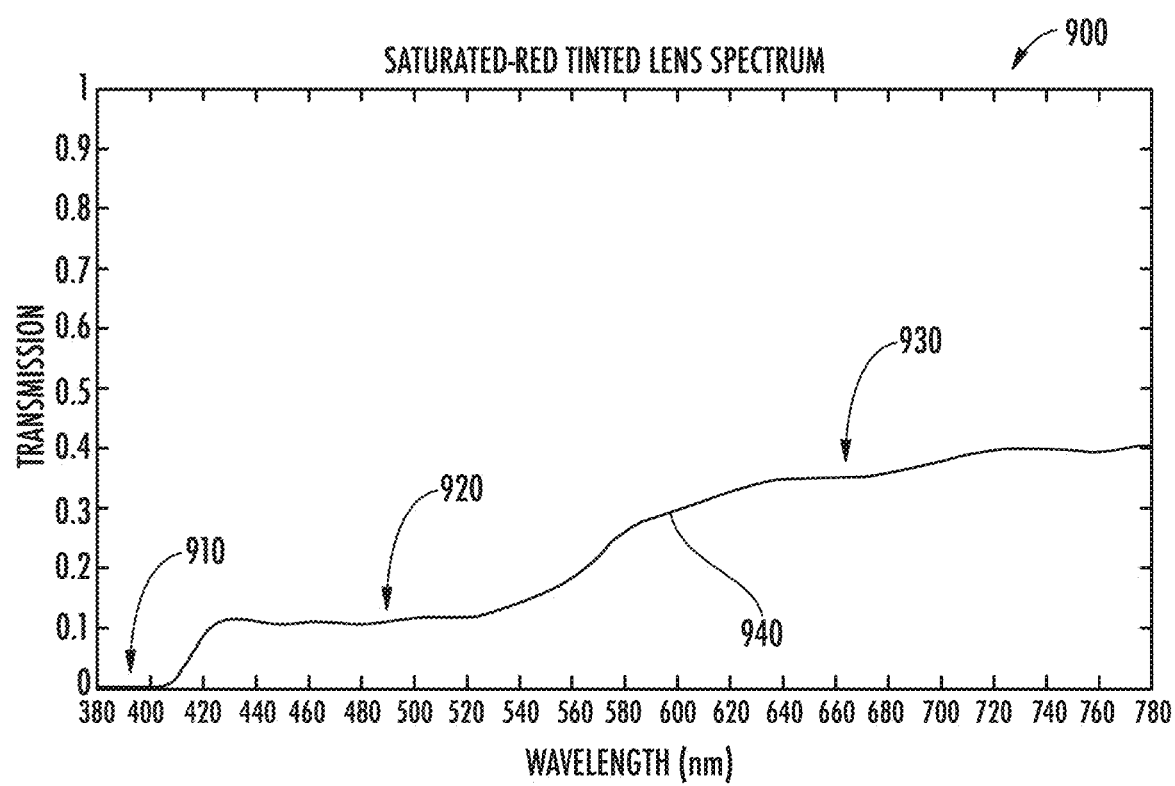
FIG. 9 is the transmission spectrum of an optical device, embodied in the form of a red-tinted OD.

FIG. 9 illustrates a saturated red tinted lens spectrum 900 including the transmission spectrum 940 of an optical device, embodied in the form of a red-tinted OD. This optical device is intended for enhancing red-green color discernment for those with CVD and those with normal color vision. This OD may be constructed using three broad spectrum absorptive dyes, with peak absorption at about 480 nm, 525 nm and 670 nm, respectively. An ultraviolet (UV) absorbing dye with peak absorption at 375 nm may be used to absorb UV and high-energy visible light (HEVL) up to 410 nm. The UV absorber serves to both block the electromagnetic spectrum harmful to human eyes and also to reduce the bleaching effects of UV and HEVL on the broad spectrum dyes. Consequently, the OD can remain lightfast and retain its transmission spectrum. The CPM of OD lightness is 49 viewed under CIE D65 illumination. OD's transmission spectrum 940 in FIG. 9 has 3 characteristics: (1) low transmission 910 up to 410 nm of between 0% and 20%, (2) medium transmission 920 from 411 nm to 570 nm of between 5% and 30%, and (3) high transmission 930 from 571 nm to 660 nm of between 10% and 60%.

Figure 10:
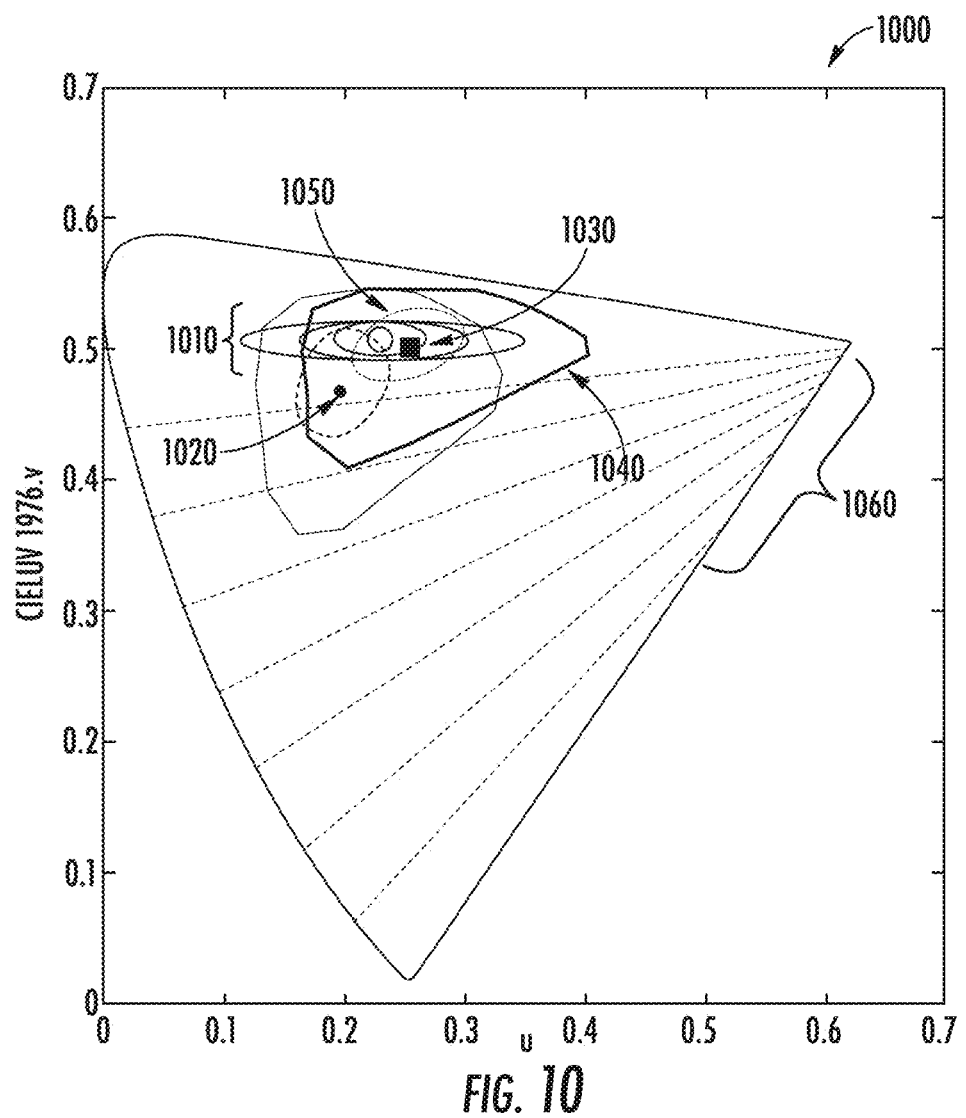
FIG. 10 shows the colorimetric effects of the red-tinted OD with transmission spectrum shown in FIG. 9.

FIG. 10 illustrates the colorimetric effects 1000 of the red-tinted OD with the transmission spectrum 900 illustrated in FIG. 9. The horizontal concentric ellipses are the MacAdam Ellipses 1010. The thin solid line, thin dashed line and solid circle mark the saturated Munsell color gamut, pastel Munsell color gamut, and WP 1020 for a naked eye protanomalous or protanopic observer, respectively. The thick solid line, thick dashed line and solid square mark the saturated Munsell color gamut 1040, pastel Munsell color gamut 1050, and WP 1030 for a protanomalous or protanopic observer seeing with the optical device, respectively. From neutral, the WP 1030 of the OD in single-pass is shifted by 0.067, i.e. between 0.005 and 0.15, distance units in $\langle u,v \rangle$ coordinates towards substantially red, yellow, orange or a combination of these hues. Both the pastel Munsell color gamuts 1050 and saturated Munsell color gamuts 1040—representative of broader color perception—are also shifted towards red. As the color confusion lines 1060 for a protan converge at or near the monochromatic red, the ability to distinguish between colors positioned on or adjacent to two separate color-confusion lines increases. In single-pass light, a red tinted OD and/or red-shifted gamuts 1040, 1050 of color perception increases color discernment for protanomalous or protanopic person and/or people with normal color vision.

In FIG. 10 the MacAdam Ellipses 1010 for a protan (and very similar ellipses for a deutan) are superimposed over the Munsell color gamuts 1040, 1050. The red-tinted OD 1030 and in general all non-blue or non-yellow tinted ODs shift the color perception gamuts to better intersect adjacent or more distant MacAdam Ellipses, either on the red hue side or on the green hue side, relative to the smallest MacAdam Ellipses in the middle. People with red-green CVD can distinguish colors on different MacAdam Ellipses, and are confused on colors positioned on or near the same MacAdam Ellipse. Therefore, non-blue or non-yellow tinted ODs can increase color discernment for both protans and deutans.

An optical device that increases the magnitude of the perceived LD (lightness difference) between previously confusing colors help the CVD to better distinguish those colors using lightness information. With the naked eye, under CIE D65, the red-green LD of red and green color sets is: (1) 0.9 when those colors are represented by select Munsell color sets, and (2) −0.5 when those colors are represented by select Ishihara color sets. A positive LD value indicate red color set (including derivative colors such as orange and pink) are higher in lightness than green color set (including derivative colors such as cyan and yellow-green), and vice versa for a negative LD value.

When viewed through the red-tinted OD prescribed in FIGS. 9 and 10, the red-green LD of red and green color sets is: (1) 2.5 or between 1.0 and 4.0, when those colors are represented by select Munsell red and green color sets, and (2) 1.3 or between 0.5 and 3.5 when those colors are represented by select Ishihara red and green color sets. The red-tinted OD has improved the vision of both protans and deutans to better discern previously confusing red, green and derivative colors by increasing the LD between those colors. The red-tinted OD prescribed by FIGS. 9 and 10 has a $RG_{LI}$ Color Difference Percent of 9.0% or between 5.0% and 15% based on select Munsell red and green color sets. In terms of Hue Shift (HS) CPM for pastel colors (as represented by pastel Munsell color gamut), the OD altered green, cyan and blue hues to orange, yellow and red hues or similar hues, respectively. The HS CPM preserved red and orange hues. In terms of HS for saturated colors (as represented by saturated Munsell color gamut), the OD altered green and yellow hues to yellow and orange or similar hues, respectively. The HS CPM preserved other saturated hues. In some applications, it is more desirable for the OD to preserve more of the original hues of both saturated and pastel colors. For example, green hues of both saturated and pastel colors can be preserved in other optical devices disclosed in this invention. In CPM evaluations where color reflectance spectra are required, such as in the cases of color difference and color difference percent CPMs, select Munsell colors, including defined color sets, and/or select Ishihara colors, including defined color sets from illustrated color spectra, are used, unless otherwise stated.

Figure 11:
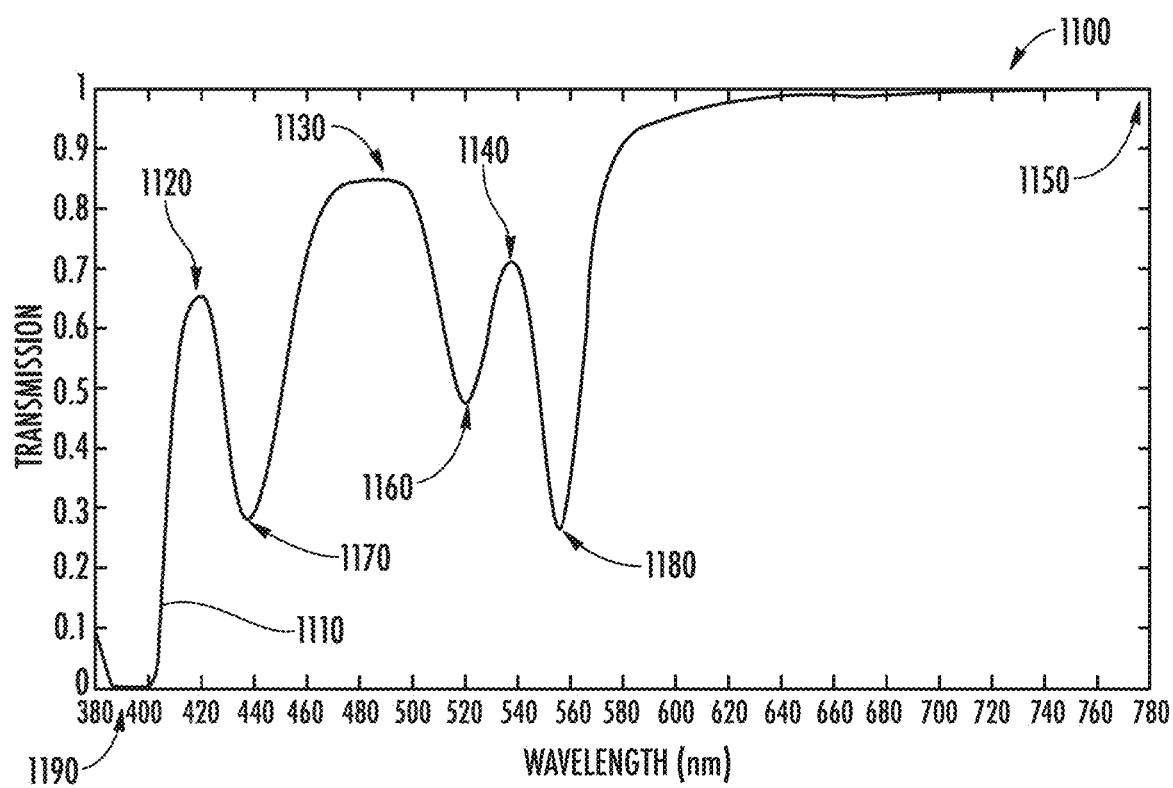
FIG. 11 is the transmission spectrum of an optical device, embodied in the form of a First Rose-Tinted device.

FIG. 11 illustrates a plot 1100 of the transmission spectrum 1110 of an optical device, embodied in the form of a rose-tinted optical device (OD). This rose-tinted OD is termed First Rose-Tinted OD. This OD is utilized for enhancing red-green color discernment for those with CVD and those with normal color vision. This OD may be constructed using three narrow spectrum absorptive dyes, with peak absorption at about 438 nm 1170, peak absorption at about 520 nm 1160 and peak absorption at about 555 nm 1180. An UV absorbing dye with peak absorption at 390 nm may be used to absorb UV and high-energy visible light (HEVL) up to 405 nm 1190. The substrate of this optical device may be any plastic, glass or other optically-transparent material.

FIG. 11 illustrates 4 pass-bands 1120, 1130, 1140, 1150 in the transmission spectrum 1110 of the OD or tetrachromatic transmission spectrum from 380 nm to 780 nm. At least one pass-band 1120 has a peak transmittance wavelength shorter than 440 nm; at least two pass-bands 1130, 1140 have peak transmittance wavelengths between 440 nm and 600 nm, with one pass-band's 1130 peak wavelength shorter than that of another pass-band 1140 by at least 10 nm, and at least one pass-band 1150 has peak transmission wavelength longer than 600 nm.

The tetrachromatic transmission spectrum 1110 of OD in FIG. 11 shows at least one stop-band 1160 sandwiched between two pass-bands which are centered between 440 nm and 600 nm, and such stop-band(s) has an absorbance with a FWHM (full-width at half-maximum) of at least 5 nm, including at least 10 nm. There may be at least one absorbance peak at wavelengths longer than 600 nm. For any stop-band whose peak absorbance is between 440 nm and 510 nm, its peak or max absorbance is less than 80%, with the resultant transmission spectrum at higher than 20% at the wavelength of peak absorbance.

The First Rose-Tinted OD uses Polycarbonate (PC), an optically-transparent plastic suitable for ophthalmic, automotive, aerospace and other applications due to PC's shatter-resistant properties. The dyes are infused into a 10 mm uniform-thickness OD, round disk with a diameter of 80 mm. The disk is post-processed, such as polished, film or treatment coated (e.g. anti-scratch, anti-glare, anti-fog) and shaped or cut into the desired geometries. Furthermore, the disk may be ground into the correct prescriptions for visual acuity and other vision correction applications. Each of the colorant used in this OD may include concentrations between 0.1 and 100 micro-mol per 10 mm of absorption thickness of those colorants. Absorption thickness is defined as the physical distance that light transmits through where light absorption occurs. If the final absorption thickness of the OD is different than 10 mm, then the concentrations of the same colorants may be adjusted by the same proportional difference as governed by the Beer-Lambert Law. For example, if the colorant with peak absorption at 555 nm has a concentration of 70 micro-mol per 10 mm of absorption thickness, then its concentration needs to be 350 micro-mol per 2 mm of absorption thickness to achieve similar effective absorption. For example, if the colorant with peak absorption at 438 nm has a concentration of 80 micro-mol per 1 mm of absorption thickness, then its concentration needs to be 8 micro-mol per 10 mm of absorption thickness to achieve similar effective absorption. In certain configurations, an OD's physical thickness is its absorption thickness. Alternatively, the absorption thickness is the physical thickness of the coating thickness of the colorants.

The same sets of Munsell and/or Ishihara colors may be used to evaluate all CPMs when comparing any OD to the "red-tinted OD", whose transmission spectrum and gamut performance are illustrated in FIGS. 9 and 10. The CPM of OD lightness is 84, or between 50 and 100, when viewed under CIE D65 illumination, which is a high lightness, e.g., suitable for indoor and outdoor ophthalmic use. The photopic and scotopic luminous transmittances of the OD are 71% and 67%, respectively, or are both between 40% and 100%.

Figure 12:
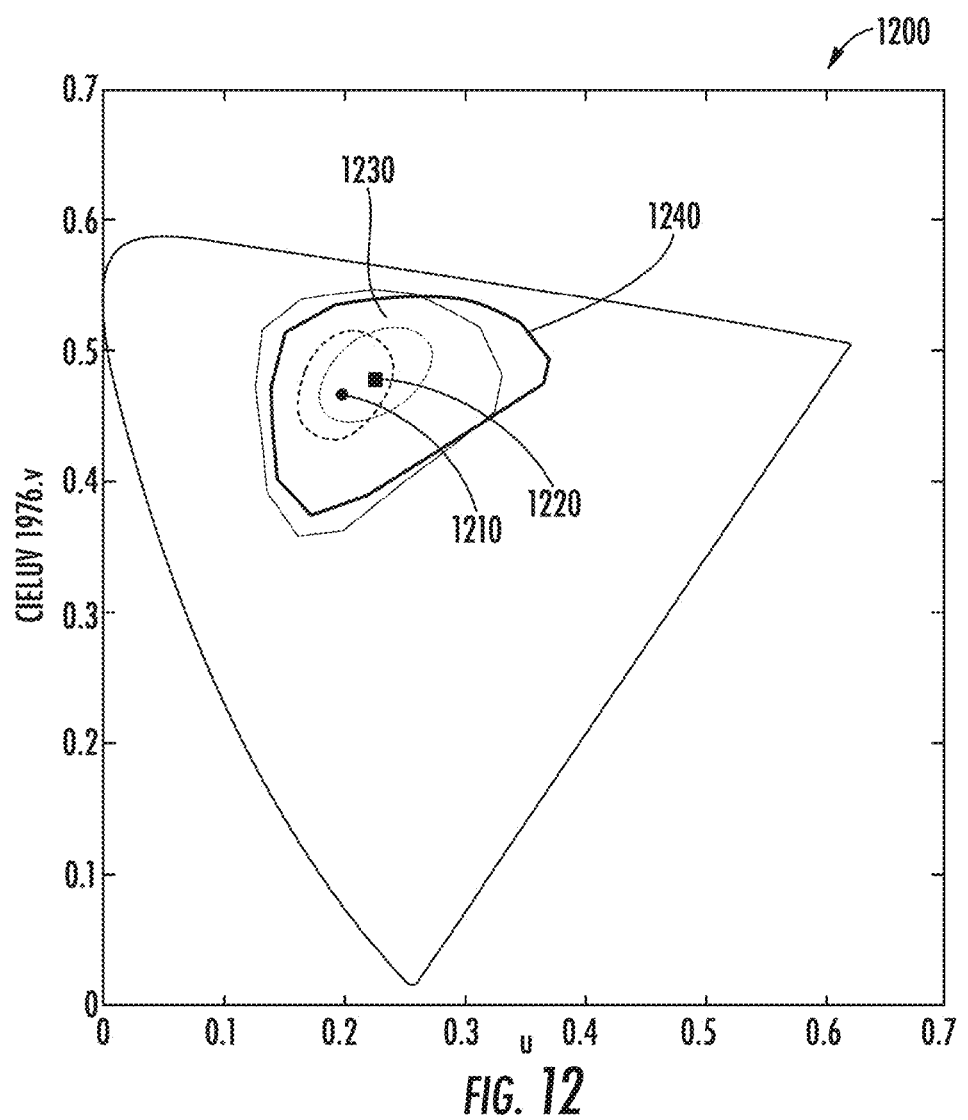
FIG. 12 shows the colorimetric effects of the rose-tinted OD with transmission spectrum shown in FIG. 11.

FIG. 12 illustrates a plot 1200 that shows the colorimetric effects of the rose-tinted OD with a transmission spectrum illustrated in the plot 1100 of FIG. 11. The thin solid line, thin dashed line and solid circle mark the saturated Munsell color gamut, pastel Munsell color gamut, and WP 1210 for a naked eye red-green CVD observer, respectively. The thick solid line, thick dashed line and solid square mark the saturated Munsell color gamut 1240, pastel Munsell color gamut 1230, and WP 1220 for a red-green CVD observer seeing with the OD, respectively. The WP 1220 of the OD is shifted by 0.029 distance units, i.e., between 0.001 and 0.2, in ⟨u,v⟩ coordinates towards red. This OD is cosmetically less red-tinted, and rather rose-tinted, which preserves originally white or very pastel colors better. Both the pastel 1230 and saturated 1240 Munsell color gamuts—representative of broader color perception—are also shifted towards red, though may not achieve red or warm color hues. In particular, warm colors (e.g., red, pink, orange) red-shifted the most. Non-primary and non-cool colors (e.g., yellow, purple) red-shifted less than the warm colors. Cool colors (e.g., green, cyan, blue) red-shifted the least. Some of the cool colors red-shifted imperceptibly or did not achieve JND (just noticeable difference).

The First Rose-Tinted OD has a $RG_{LI}$ Color Difference Percent of 10.6%, or between 5% and 20%. In terms of Hue Shift (HS) CPM for pastel and saturated Munsell color gamuts, the OD altered some green, yellow-green, yellow and some blue hues to yellow-green, yellow, orange, and purple hues or similar hues, respectively. The HS CPM preserved all other hues. Due to the minimal HSs, this embodiment better preserved the original hues as viewed by the naked eye than the red-tinted OD represented in FIGS. 9 and 10.

As is the case with the red-tinted OD represented FIGS. 9 and 10, the First Rose-Tinted OD and its red-shifted gamuts of color perception increases color recognition/discernment for protanomalous or protanopic person due to the OD's ability to decrease color distance between adjacent color confusion lines for the user.

As is the case with the red-tinted OD in FIGS. 7 and 8, the First Rose-Tinted OD shifts the color perception gamuts to better intersect adjacent or more distant MacAdam Ellipses on the warm-color hue side, relative to the smallest Mac-Adam Ellipses in the middle. Therefore, the First Rose-Tinted OD can increase color discernment for both deutans and protans.

When viewed through the First Rose-Tinted OD, the red-green LD of red and green color sets is: (1) 3.0, or between 0.5 and 4.5, when those colors are represented by select Munsell color sets and reflectance spectra, and (2) 2.1, or between 0.5 and 4.5, when those colors are represented by select Ishihara color sets and reflectance spectra. The rose-tinted OD allows protans, deutans and normal people to better discern previously confusing red, green and derivative colors by increasing the LD between those colors, similar to the red-green LD effects of the red-tinted OD in FIGS. 7 and 8.

Figure 13:
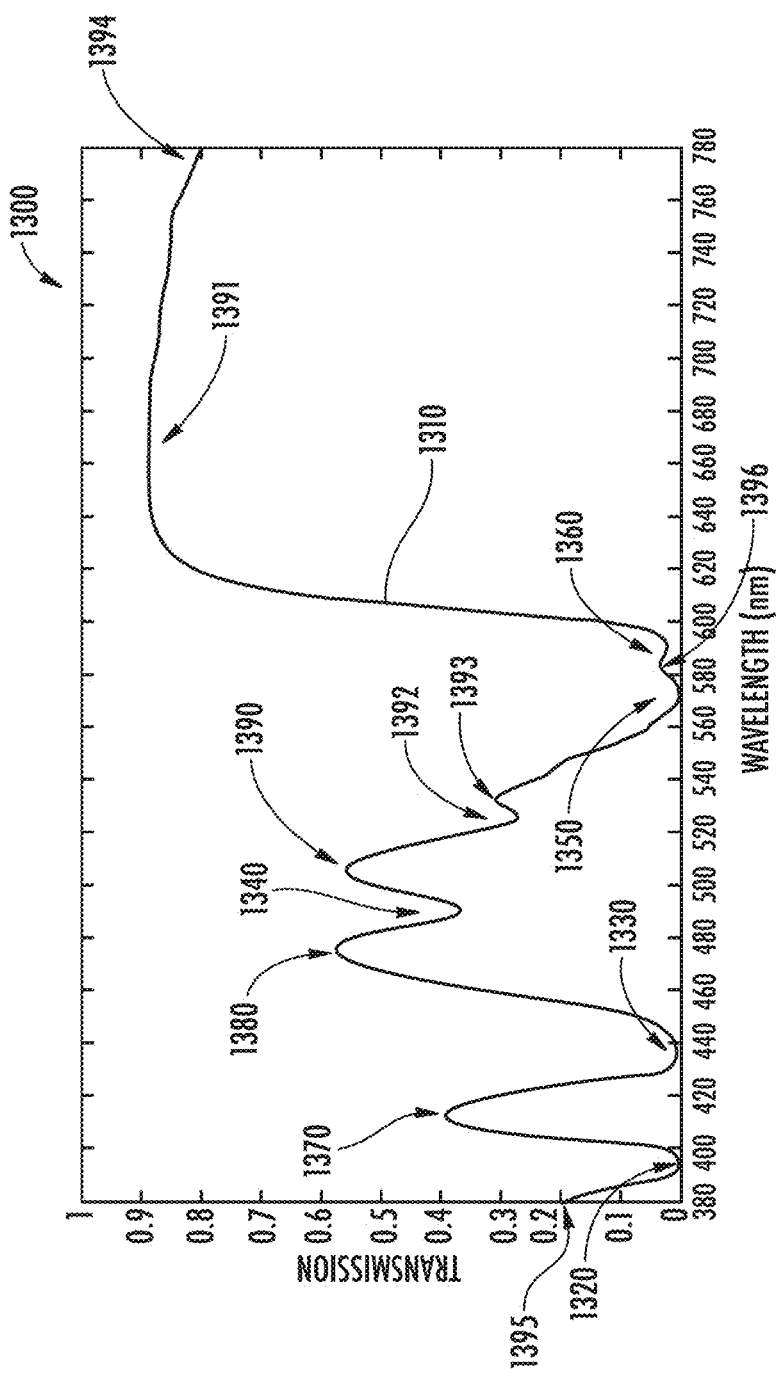
FIG. 13 is the transmission spectrum of an optical device, embodied in the form of a Second Rose-Tinted device.

FIG. 13 illustrates a plot 1300 representing the transmission spectrum 1310 of an optical device, embodied in the form of a second rose-tinted optical device (OD). This rose-tinted OD is termed the Second Rose-Tinted OD. This OD is intended for enhancing red-green color discernment for those with CVD and/or those with normal color vision. This OD was constructed using five absorptive dyes, with peak absorption at about 395 nm 1320, 438 nm 1330, 490 nm 1340, 570 nm 1350 and 590 nm 1360. The substrate of this OD may be any plastic, glass or other optically-transparent material. The Second Rose-Tinted OD may utilize CR-39, an optically-transparent plastic. The dye coating process starts with dissolving the dyes into a solvent, well mixed and then surface coated onto a 2.5 mm uniform-thickness lens of zero optical power. Coating of OD with or without any vision correction capability can follow standard manufacturing processes. The round lens blank has a diameter of 70 mm. The coating process may occur via dipping, spraying, spinning or other standard coating methods. The thickness of the dye coating may typically be between 1 micron and 80 microns, for example. The concentrations of these dyes can range between 20 micro-mol and 20,000 micro-mol due to the thin dye coating. The disk may be post-processed, such as treatment coated (e.g. anti-scratch, anti-glare, anti-fog) and cut into the desired geometries. The lightness CPM of the Second Rose-Tinted OD is 56, or between 30 and 70, viewed under CIE D65 illumination. The photopic and scotopic luminous transmittances of the OD are 28% and 34%, respectively, or are both between 10% and 50%.

The plot 1300 of FIG. 13 illustrates pass-band 1370, pass-band 1380, pass-band 1390, and pass-band 1391 in the transmission spectrum 1310 of the OD (the tetrachromatic transmission spectrum from 380 nm to 780 nm). One pass-band 1370 has a peak transmittance wavelength shorter than 440 nm, two pass-bands 1380, 1390 have peak transmittance wavelengths between 440 nm and 610 nm, with one pass-band's peak wavelength shorter than that of another pass-band by at least 10 nm, and at least one pass-band 1391 has peak wavelength longer than 610 nm. There may be at least one absorbance peak at a wavelength longer than 591 nm.

The tetrachromatic transmission spectrum 1310 of OD in FIG. 13 shows a stop-band 1340 sandwiched between two pass-bands 1380, 1390, which are centered between 440 nm and 610 nm, and such stop-band has an absorbance with a full-width at 80% of maximum of at least 5 nm, including at least 8 nm. Full-width at 80% of maximum absorbance is the width of the absorbance band at 80% of the peak absorbance of the spectrum. Full-width at 80% of maximum transmittance is the width of the pass-band at 80% of the peak transmittance of the spectrum. Full-width at 80% of maximum is a simple numerical variant of the more popular FWHM (full-width at 50% of maximum).

For spectrum 1310, the corresponding stop-band is centered at 490 nm 1340, with a local valley transmission at around 37%, and local peak absorbance at 63%. Therefore, full-width at 80% max absorbance is with absorbance at 63%×80%=50% or equivalently transmission is at 50%. Hence, the full-width of the stop-band centered at 490 nm 1340 and 50% absorbance is approximately 10 nm. So the full-width at 80% of max absorbance at the stop-band is 10 nm.

At least one pass-band 1391 centered between 571 nm and 780 nm, and it has a peak transmission higher than the peak transmission of at least one pass-band centered between 380 nm and 570 nm 1370, 1380, 1390. For example, stop-band 395 nm 1320, stop-band 438 nm 1330, stop-band 490 nm 1340, stop-band 520 nm 1392, stop-band 570 nm 1350, stop-band 590 nm 1360 and stop-band 780 nm 1394 are stop-bands illustrated in FIG. 13. It is equivalent to state that the stop-bands are centered or have absorbance peaks at these identified wavelengths. For example, pass-band 380 nm 1395, pass-band 410 nm 1370, pass-band 475 nm 1380, pass-band 505 nm 1390, pass-band 535 nm 1393, pass-band 585 nm 1396 and pass-band 670 1391 nm are pass-bands illustrated in FIG. 13. It is equivalent to state that the pass-bands are centered or have transmission peaks at these identified wavelengths.

Figure 14:
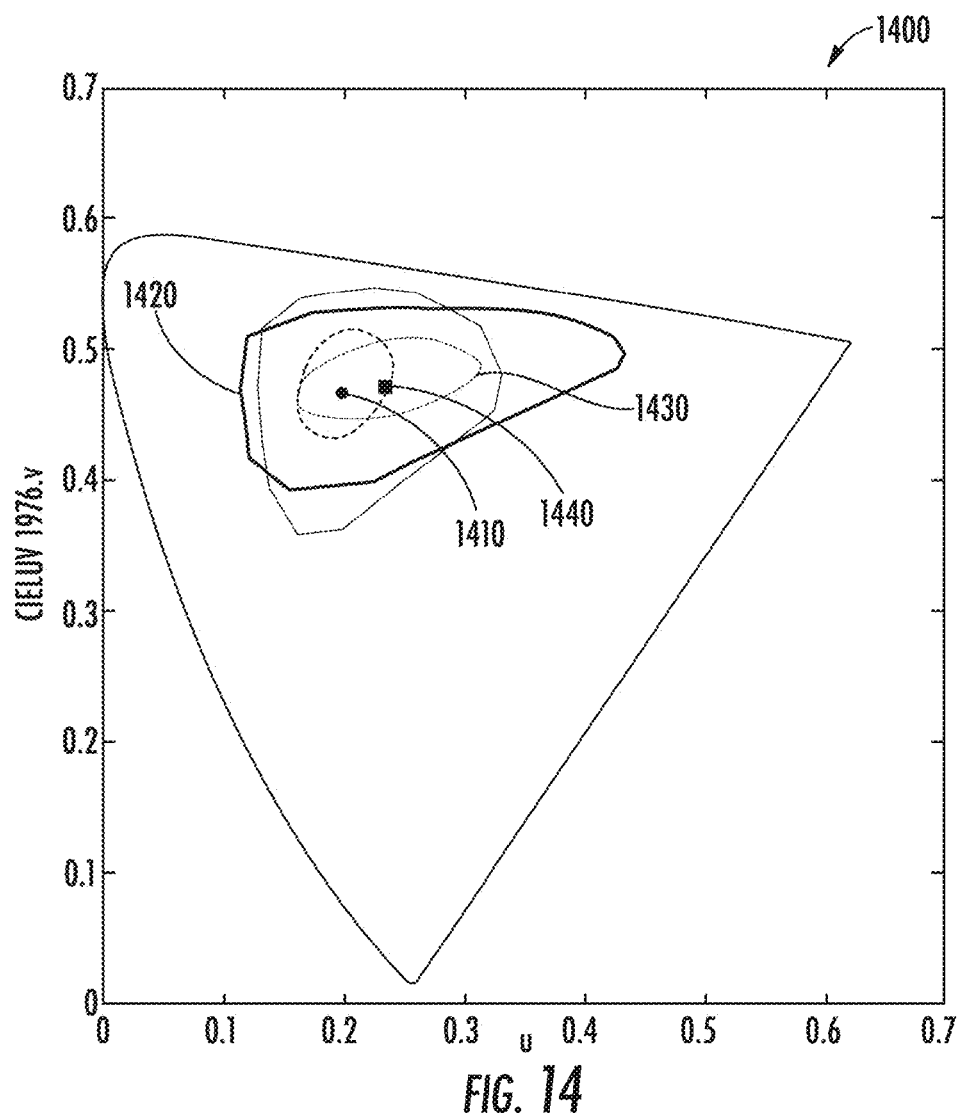
FIG. 14 shows the colorimetric effects of the Second Rose-Tinted device with transmission spectrum shown in FIG. 13.

FIG. 14 illustrates a plot 1400 that shows the colorimetric effects of the Second Rose-Tinted OD described with respect to FIG. 13. The thin solid line, thin dashed line and solid circle mark the saturated Munsell color gamut, pastel Munsell color gamut, and WP 1410 for a naked eye red-green CVD observer, respectively. The thick solid line, thick dashed line and solid square mark the saturated Munsell color gamut 1420, pastel Munsell color gamut 1430, and WP 1440 for a red-green CVD observer seeing with the OD, respectively. The WP 1440 of the OD is shifted by 0.036, or more specifically between 0.001 and 0.2, distance units in ⟨u,v⟩ coordinates towards red. This OD may be cosmetically rose-tinted, which preserves originally white or very pastel colors better than a strong red-tinted OD in FIGS. 9 and 10. Both the pastel 1430 and saturated 1420 Munsell color gamuts are also shifted towards yellow, yellow-red or red. In particular, warm colors (e.g., red, pink, orange) red-shifted the most. Non-primary and non-cool colors (e.g., yellow, purple) red-shifted less than the warm colors. Some cool colors (e.g., green, cyan, blue), if red-shifted, did so with the least magnitude. Other cool colors red-shifted imperceptibly or did not achieve JND. Furthermore, some green, cyan and blue hues remained in their original perceptions. Many saturated cyan and some green hues may be enhanced to be even more saturated.

The Second Rose-Tinted OD has a $RG_{LI}$ Color Difference Percent of 77.4%, or more specifically between 20% and 100%. In terms of Hue Shift (HS) CPM for pastel 1430 Munsell color gamut, the OD altered some green, yellow-green, yellow and some blue hues to yellow-green, yellow, orange, and purple hues or similar hues, respectively. In terms of Hue Shift (HS) CPM for saturated 1420 Munsell color gamut, the OD altered some yellow-green, yellow and orange hues to yellow, orange, and red hues or similar hues, respectively. The HS CPM preserved all other hues in both the pastel and saturated color sets or gamuts. Due to the minimal HSs, this embodiment better preserved the original hues as viewed by the naked eye than the red-tinted OD illustrated in FIGS. 9 and 10.

As is the case with the red-tinted OD in FIGS. 9 and 10, the Second Rose-Tinted OD and its red-shifted gamuts 1420, 1430 of color perception further increases color recognition/discernment for protanomalous or protanopic person due to the OD's ability to decrease color distance between adjacent color confusion lines for the user. As is the case with the red-tinted OD in FIGS. 9 and 10, the Second Rose-Tinted OD shifts the color perception gamuts to better intersect adjacent or more distant MacAdam Ellipses on the warm-color hue side, relative to the smallest MacAdam Ellipses in the middle. Therefore, the Second Rose-Tinted OD can increase color discernment for both deutans and protans. When viewed through the Second Rose-Tinted OD, the red-green LD of red and green color sets is: (1) 2.0, or between 0.5 and 4.0, when those colors are represented by select Munsell color sets, and (2) 1.6, or between 0.5 and 4.0, when those colors are represented by select Ishihara color sets. The Second Rose-Tinted OD allows protans, deutans and normal people to better discern previously confusing red, green and derivative colors by increasing the LD between those colors, especially targeting red and green LDs on the Ishihara Colorblindness Test.

Figure 15:
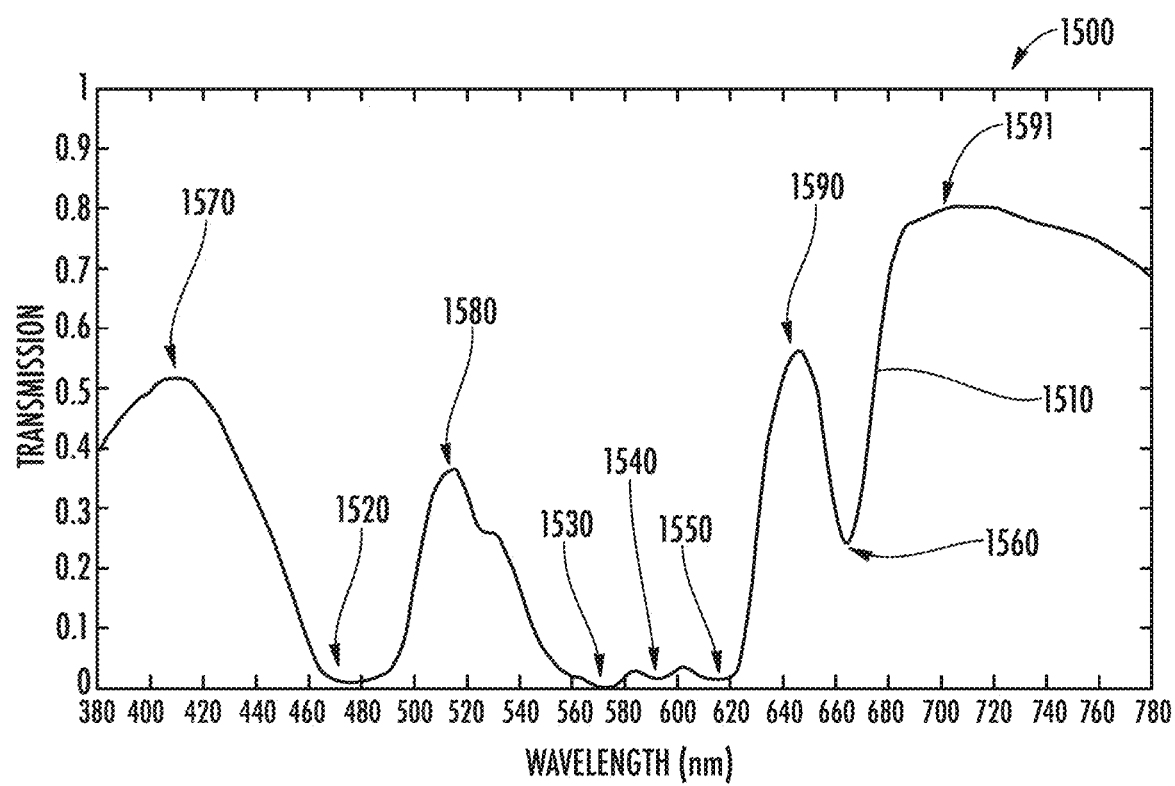
FIG. 15 is the transmission spectrum of an optical device, embodied in the form of a blue-tinted optical device.

FIG. 15 illustrates a plot 1500 of the transmission spectrum 1510 of an optical device, embodied in the form of a blue-tinted optical device (OD), referred to as the Blue-Tinted OD. This OD may enhance red-green color discernment for those with CVD and those with normal color vision. This OD may be constructed using five narrow spectrum absorptive dyes, with peak absorption at about 475 nm 1520, 570 nm 1530, 590 nm 1540, 615 nm 1550 and 665 nm 1560.

The Blue-Tinted OD may be formed from Poly-methyl methacrylate (PMMA), an optically-transparent plastic suitable for ophthalmic, windows and other general applications. The dyes are compounded and molded (i.e., infused) into a 3 mm uniform-thickness OD, round disk with a diameter of 68 mm. Each of the colorant used in this OD has concentrations between 0.1 and 300 micro-mol per 3 mm of absorption thickness of those colorants. Like with other compounded and molded plastics described before, post-processing of the disk, such as polishing, coating, grinding and cutting can be performed to satisfy product requirements. The lightness CPM of the Blue-Tinted OD is 40, or between 20 and 60, viewed under CIE D65 illumination. The photopic and scotopic luminous transmittances of the OD are 13% and 17%, respectively, or are both between 5% and 70%.

Plot 1500 of FIG. 15 illustrates 4 pass-bands 1570, 1580, 1590, 1591 in the transmission spectrum 1510 (tetrachromatic transmission spectrum 1510) from 380 nm to 780 nm). At least one pass-band 1570 has a peak transmittance wavelength shorter than 479 nm, at least one pass-band 1580 has a peak transmittance wavelength between 480 nm and 570 nm, at least one pass-band 1590 has a peak transmittance wavelength between 571 nm and 660 nm, and at least one pass-band 1591 has peak wavelength longer than 661 nm. Pass-bands 1590, 1591 may be centered between 571 nm and 780 nm, and it has a peak transmission higher than the peak transmission of at least one pass-band 1570, 1580 centered between 380 nm and 570 nm. Peak wavelength of one or more pass-bands 1580 centered between 480 nm and 570 nm is at least 40 nm shorter than peak wavelength of one or more pass-bands centered between 571 nm and 660 nm 1590. The peak absorbance of at least one stop-band centered between 630 nm and 780 nm is higher than the peak absorbance of at least one stop-band centered between 380 nm and 630 nm. The center of a stop-band is equivalent to the wavelength of peak absorbance of the same stop-band. The center of a pass-band is equivalent to the wavelength of peak transmission of the same pass-band.

Figure 16:
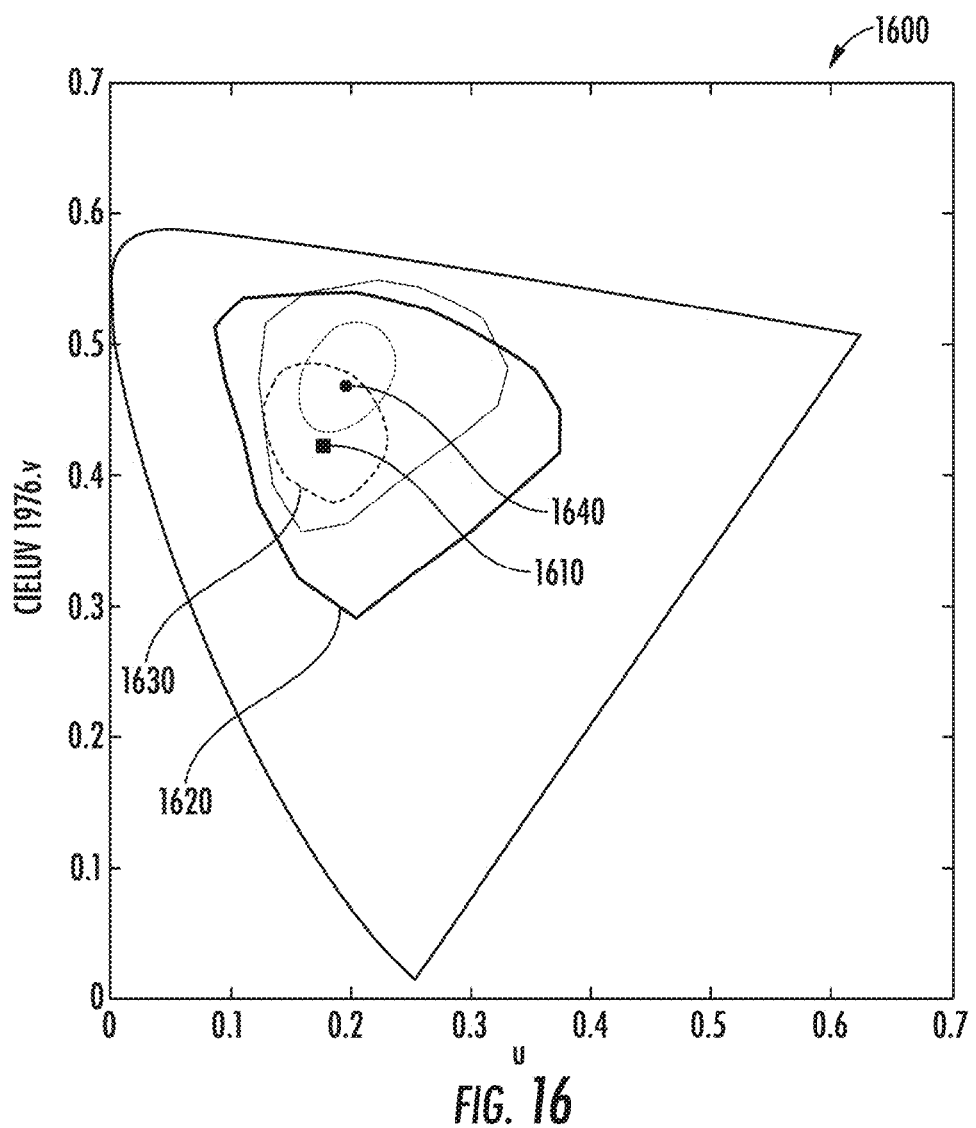
FIG. 16 shows the colorimetric effects of the Blue-Tinted device with transmission spectrum shown in FIG. 15.

FIG. 16 illustrates a plot 1600 that shows the colorimetric effects of the Blue-Tinted OD described with respect to FIG. 15. The thin solid line, thin dashed line and solid circle mark the saturated Munsell color gamut, pastel Munsell color gamut, and WP 1610 for a naked eye red-green CVD observer, respectively. The thick solid line, thick dashed line and solid square mark the saturated 1620 Munsell color gamut, pastel 1630 Munsell color gamut, and WP 1640 for a red-green CVD observer seeing with the OD, respectively. From neutral, the WP 1640 of the OD is shifted by 0.049, or between 0.001 and 0.2 distance units in $\langle u, v \rangle$ coordinates towards blue. Both the pastel 1630 and saturated 1620 color gamuts are also shifted towards blue. Many saturated cyan, blue and yellow colors remained in their original color perceptions. The Blue-Tinted OD has a $RG_{LI}$ Color Difference Percent of 59.7% or between 10% and 100%. In terms of Hue Shift (HS) CPM for pastel 1630 Munsell color gamut, the OD altered yellow, some green and some red hues to be almost neutral, cyan and purple hues or similar hues, respectively. For other Munsell pastel 1630 gamut colors and saturated 1620 Munsell color gamut, the OD preserved the hues. Due to the minor HSs, this configuration may preserve the original hues as viewed by the naked eye than the red-tinted OD prescribed in FIGS. 9 and 10.

As is the case with the red-tinted OD in FIGS. 9 and 10, the Blue-Tinted OD shifts the color perception gamuts to better intersect adjacent or more distant MacAdam Ellipses on the cool-color hue side, relative to the smallest MacAdam Ellipses in the middle. This OD may increase color discernment for both deutans and protans. When viewed through the Blue-Tinted OD, the red-green LD of red and green color sets is: (1) −1.4 or between −4.0 and 0.8 when those colors are represented by select Munsell color sets, and (2) −1.0 or between −4.0 and −0.6 when those colors are represented by select Ishihara color sets. The Blue-Tinted OD allows protans, deutans and normal people to better discern previously confusing red, green and derivative colors by increasing the LD between those color sets. With green color set higher in lightness than red color set, the OD overcame the original lightness difference of red color set being higher in lightness than green color set when looking with only naked eye.

Figure 17:
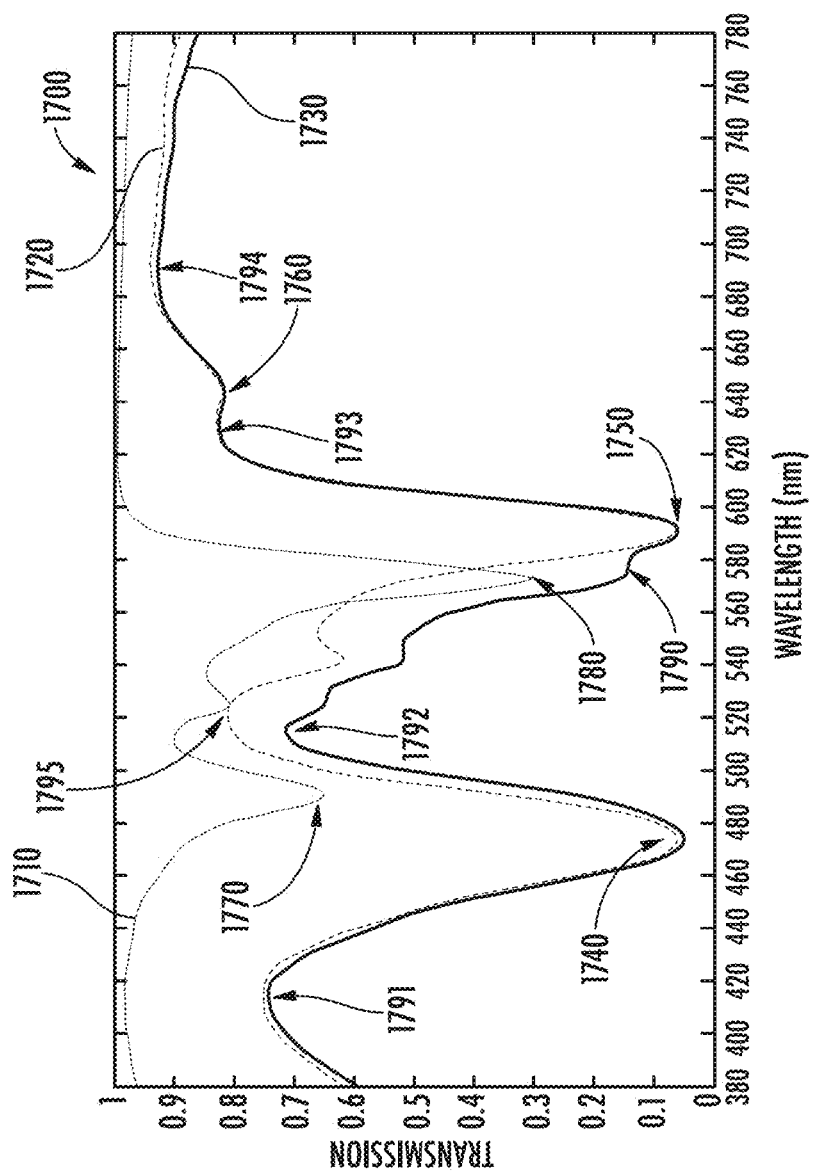
FIG. 17 shows the transmission spectra of an optical device, embodied in the form of a yellow-tinted optical device.

FIG. 17 illustrates a plot 1700 that shows the transmission spectra 1710, 1720, 1730 of an optical device exposed to various lighting conditions. This yellow-tinted OD exhibits photochromism, and is termed First Photochromic OD. This OD enhances red-green color discernment for those with CVD and those with normal color vision. The dashed-line is the transmission spectrum 1720 of the OD under non- or low-UV artificial lighting, such as the CIE F11 fluorescent lighting. The dotted-line is the transmission spectrum 1710 of the photochromic colorants under daylight illumination, such as the CIE D65, which occurs in addition to the persistent transmission spectra 1720 (dashed-line) when exposed to daylight or another UV source. The photochromic dyes are activated by a UV source. The resultant or effective transmission spectrum 1730 of the OD under daylight, including overcast illumination, is shown by the solid line. For illumination conditions where both fluorescent lighting and daylight exist, then any resultant transmission spectrum of the OD is bounded between the solid-line spectrum 1730 and dash-line spectrum 1720, at each wavelength between 380 nm and 780 nm. The pure daylight illuminated spectrum 1730 is the lower bound and the pure non- or low-UV light illuminated spectrum 1720 is the upper bound. The pure non- or low-UV light transmission spectrum 1720 may be constructed using three non-photochromic dyes with peak absorption at about 475 nm 1740, 595 nm 1750 and 645 nm 1760. The two photochromic dyes are used, and when activated by a UV source have peak absorptions at about 490 nm 1770 and 575 nm 1780, respectively. At least one photochromic dye has absorbance peak between 380 nm and 540 nm when activated, such as peak absorption 1770. At least one photochromic dye has absorbance peak between 541 nm and 780 nm when activated, such as peak absorption 1780.

Under a UV source, such as daylight, plot 1700 shows at least 4 pass-bands 1791, 1792, 1793, 1794 in the transmission spectrum of the OD or at least tetrachromatic transmission spectrum from 380 nm to 780 nm, denoted by the solid line. At least one pass-band has a peak transmittance wavelength shorter than 440 nm 1791, at least one pass-band has a peak transmittance wavelength between 480 nm and 570 nm 1792, at least one pass-band has a peak transmittance wavelength between 571 nm and 670 nm 1793, and at least one pass-band has peak wavelength longer than 671 nm 1794. For FIG. 17, one pass-band is substantially centered at 415 nm 1791, one pass-band is substantially centered at 515 nm 1792, one pass-band is substantially centered at 630 nm 1793, and one pass-band is substantially centered at 690 nm 1794. Wavelength of peak transmission of one or more pass-bands 1792 centered between 480 nm and 570 nm is at least 40 nm shorter than wavelength of peak transmission of one or more pass-bands 1793 centered between 571 nm and 670 nm. The lowest transmission between 571 nm and 780 nm is higher than the lowest transmission between 380 nm and 570 nm.

A non- or low-UV source is any light source that does not substantially activate the photochromic dyes, such as CIE F11, F2 and F7. An UV source is any light source that substantially activates the photochromic dyes, such as daylight.

Within 480 nm to 570 nm of an OD's transmission spectrum, the peak transmittance of at least one pass-band when illuminated only by any non- or low-UV source is at least 2% higher than the peak transmittance of at least one pass-band when illuminated at least by any UV source.

Within 520 nm to 620 nm of an OD's transmission spectrum, the FWHM of at least one stop-band when illuminated at least by any UV source is at least 2 nm wider than the FWHM of at least one stop-band when illuminated only by any non- or low-UV source.

For example in FIG. 17, peak transmission of the pass-band 1795 substantially centered at 520 nm and illuminated by CIE F11 is approximately 10% higher than the peak transmission of the pass-band 1792 substantially centered at 515 nm and illuminated by CIE D65.

For example in FIG. 17, FWHM of the stop-band substantially centered at 595 nm and illuminated by CIE D65 is approximately 20 nm wider than the FWHM of the stop-band also substantially centered at 595 nm, as illuminated by CIE F11.

Photochromic dyes may be chemically categorized as Spiroxazines, Naphthopyrans or other types. The photochromic dyes may be added to color balance the OD's cosmetic tints under both non- or low-UV light and daylight illuminations, such that the OD cosmetic tints in single-pass and/or double-pass under multiple lighting environments are of acceptable chroma, such as pastel yellows, blues, reds, greens or other pastel colors.

The cosmetic tints of the OD under different lighting conditions may be designed and constructed to be color constant under all (or a subset) of those lighting conditions by using photochromic and non-photochromic colorants to modify the OD's transmission spectra. The photochromic and non-photochromic dyes may tune the transmission spectra to achieve high performance of the CPMs under different lighting conditions, e.g., daylight and fluorescent light.

There are a number of ways of incorporating photochromic dyes onto or into the OD. Photochromic dyes often require a substrate matrix that is flexible and has enough space at the molecular level to allow the photochromic dyes to change physical structure. These requirements may be achieved by infusing the two photochromic dyes into an optical monomer such as MMA (methyl methacrylate) resin blends, then UV or thermally curing with desired specifications, e.g., mechanical, geometric and optical requirements. Photochromic dyes may also be incorporated into one or more matrix layers which are then laminated or sandwiched between other layers. Furthermore, the photochromic dyes may be surface coated onto a layer using spray, spin, dip or other coating methods. Chemical additives, such as siloxanes, and other resins can be used with the matrix to alter the chemical structure of the OD's substrate, and thus improve the photochromic dye performance.

For the First Photochromic OD, non-photochromic dyes may be incorporated into the OD substrate in the same manners as those for the photochromic dyes. Less stringent requirements on the molecular structure of the substrate are needed for proper performance of the non-photochromic dyes. The non-photochromic dyes may be incorporated onto or into the same or different optical layer(s) as those for the photochromic dyes through coating or mixing, respectively, or through other well-known manufacturing methods. The post-processing of the OD described herein may be applied, such as surface coatings, curing, cutting, grinding and polishing.

Viewed under CIE F11 illumination, without photochromic dye activation, the lightness CPM of the First Photochromic OD is 44, where that with the naked eye is 57. Equivalently, under CIE F11 illumination, lightness of OD is 77% of that with the naked eye or is 77 or is between 50 and 100. The photopic and scotopic luminous transmittances of the OD are 56% and 50%, respectively, or are both between 30% and 90%. Viewed under CIE D65 illumination (with photochromic dye activation), the lightness CPM of the First Photochromic OD is 70, where that with the naked eye is 96. Equivalently, under CIE D65 illumination, lightness of OD is 73% of that with the naked eye or is 73 or is between 50 and 100. The photopic and scotopic luminous transmittances of the OD are 45% and 43% respectively, or are both between 20% and 90%.

The difference in the photopic luminous transmittances of the OD is within 40% when the illuminant switches from CIE F11 to CIE D65, regardless of presence of one or more photochromic dyes.

The difference in the scotopic luminous transmittances of the OD is within 40% when the illuminant switches from CIE F11 to CIE D65, regardless of presence of one or more photochromic dyes.

Figure 18A:
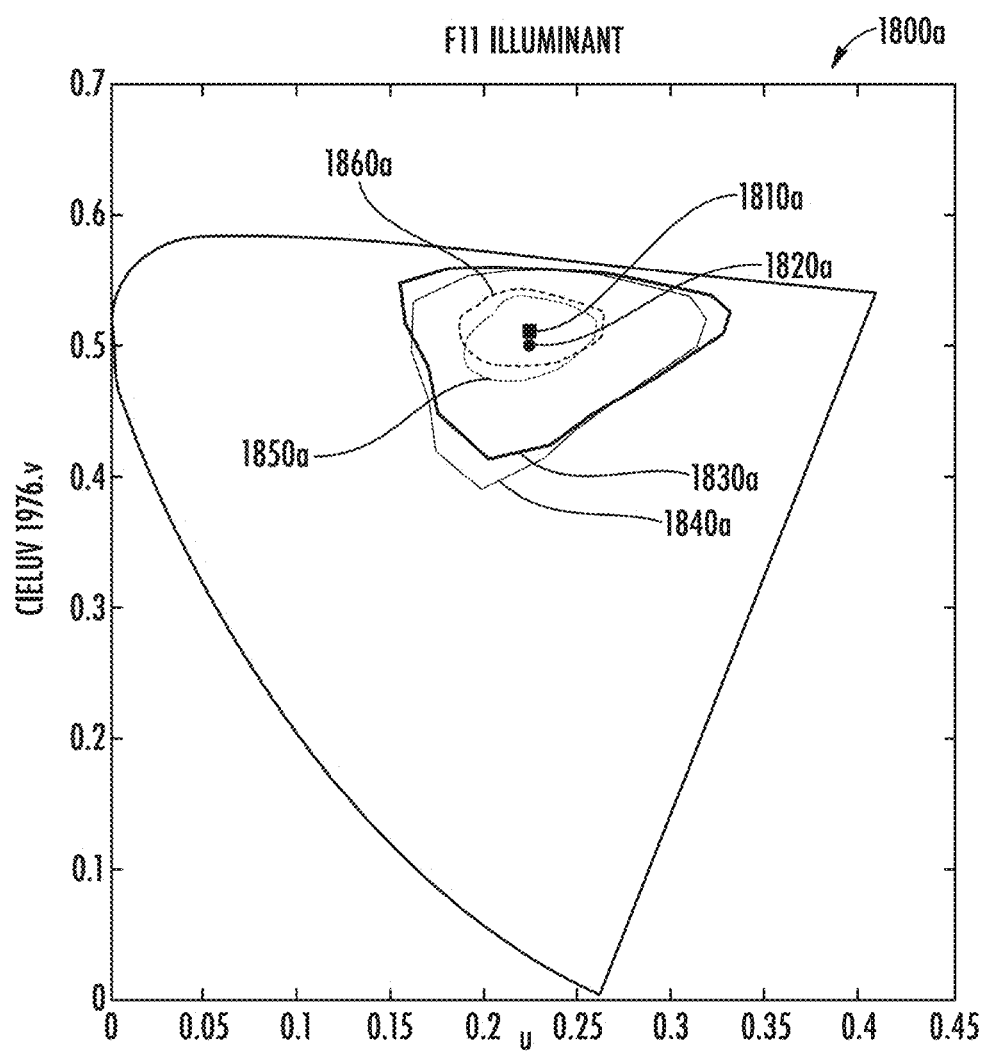
FIG. 18A shows the colorimetric effects of the photochromic optical device shown in FIG. 17 under F11 illuminant and with a deuteranomalous observer.
Figure 18B:
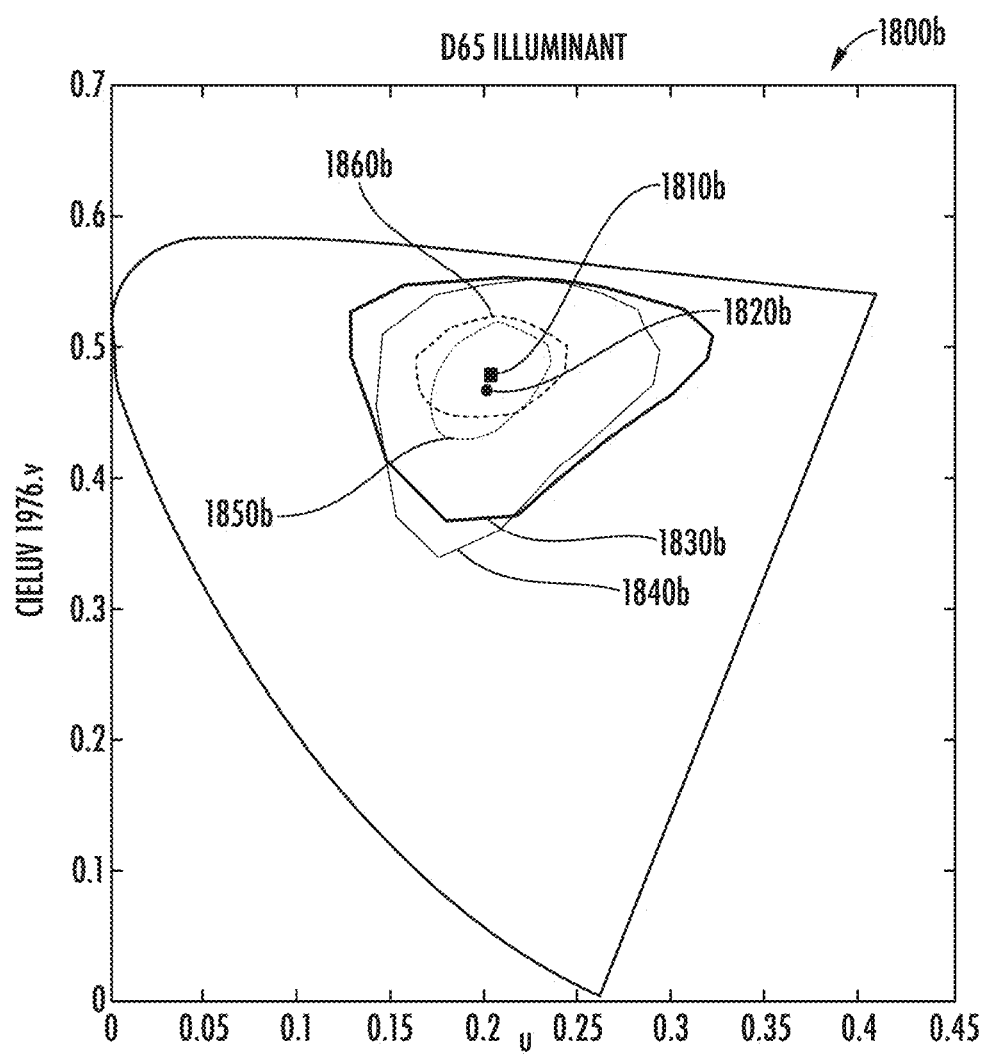
FIG. 18B shows the colorimetric effects of the photochromic optical device shown in FIG. 17 under D65 illuminant and with the same deuteranomalous observer.

FIG. 18A illustrates a plot 1800a that shows the colorimetric effects of the First Photochromic OD under F11 illuminant and with a deuteranomalous observer, where the M-cone is red-shifted 10 nm. FIG. 18B illustrates a plot 1800b that shows the colorimetric effects of the First Photochromic OD under D65 illuminant and with the same deuteranomalous observer.

For both FIGS. 18A and 18B, the thin solid line, thin dashed line and solid circle mark the saturated Munsell color gamut 1840a, 1840b, pastel Munsell color gamut 1850a, 1850b, and WP 1820a, 1820b for a naked eye red-green CVD observer, respectively. The thick solid line, thick dashed line and solid square mark the saturated Munsell color gamut 1830a, 1830b, pastel Munsell color gamut 1860a, 1860b, and WP 1810a, 1810b for a red-green CVD observer seeing with the OD, respectively. Select pastel and saturated Munsell colors are used.

For FIG. 18A, from neutral 1820a, the WP 1810a of the OD is shifted by 0.01, or between 0.001 and 0.2, distance units in ⟨u,v⟩ coordinates. For FIG. 18B, from neutral 1820b, the WP 1810b of the OD is shifted by 0.012, or between 0.001 and 0.2, distance units in ⟨u,v⟩ coordinates.

Without the photochromic dyes activated (including use of such dyes), the WP of the OD in daylight may be shifted by at least 0.005 distance units more or less than the WPS 1810b of OD in daylight with photochromic dye activation, in ⟨u,v⟩ coordinates. WPS is towards blue, cyan, green, yellow-green, yellow, yellow-red, red, purple or substantially these hues. The difference in the WPSes of the OD is within 0.2 in uv coordinates when the illuminant switches from CIE F11 to CIE D65, regardless of the use and activation of any photochromic dyes.

At least one of an OD's single-pass WPs, i.e., single-pass cosmetic tint, is non-red compared to naked eye (i.e., chromatically-adapted neutral) when illuminated by CIE F2, D65 or F11. "Non-red compared to naked eye" refers to the u-value of the OD's WP is less than the u-value of the naked eye (equivalently, WP of naked eye) under an illuminant.

Under CIE F11, the First Photochromic OD has a $RG_{LI}$ Color Difference Percent of 17.1%, or between 5% and 70%. Both the pastel and saturated color gamuts 1860a, 1830a are minimally shifted towards yellow. In terms of Hue Shift (HS) CPM, hues largely remained the same when viewed with and without the OD. Hence, hues are preserved. Under CIE D65 illuminant, the First Photochromic OD has a $RG_{LI}$ Color Difference Percent of 41.0%, or between 5% and 70%. Both the pastel and saturated color gamuts 1860b, 1830b are minimally shifted towards yellow. In terms of Hue Shift (HS) CPM, all hues largely remained the same when viewed with and without the OD. Hence, hues are preserved.

The difference in the $RG_{LI}$ Color Difference Percent of the OD is within 50% when the illuminant switches from CIE F11 to CIE D65, regardless of the presence and/or activation of any photochromic dyes.

When viewed under CIE D65 lighting and through the First Photochromic OD, the red-green LD of red and green color sets is: (1) 1.9, or between 0.5 and 4.0, when those colors are represented by select Munsell color sets, and (2) 1.8 or between 0.5 and 4.0 when those colors are represented by select Ishihara color sets. When viewed under CIE F11 lighting and through the First Photochromic OD, the red-green LD of red and green color sets is: (1) 1.6 or between 0.5 and 4.0 when those colors are represented by select Munsell color sets, and (2) 1.7 or between 0.5 and 4.0 when those colors are represented by select Ishihara color sets. The First Photochromic OD allows protans, deutans and normal people to better discern previously confusing red, green and derivative colors by increasing the LD between those color sets. Viewing through the OD, the difference in the red-green LDs when the illuminant switches from CIE F11 to CIE D65 is within 3.5 for both Ishihara and Munsell color sets, regardless of the presence and/or activation of any photochromic dyes.

Figure 19:
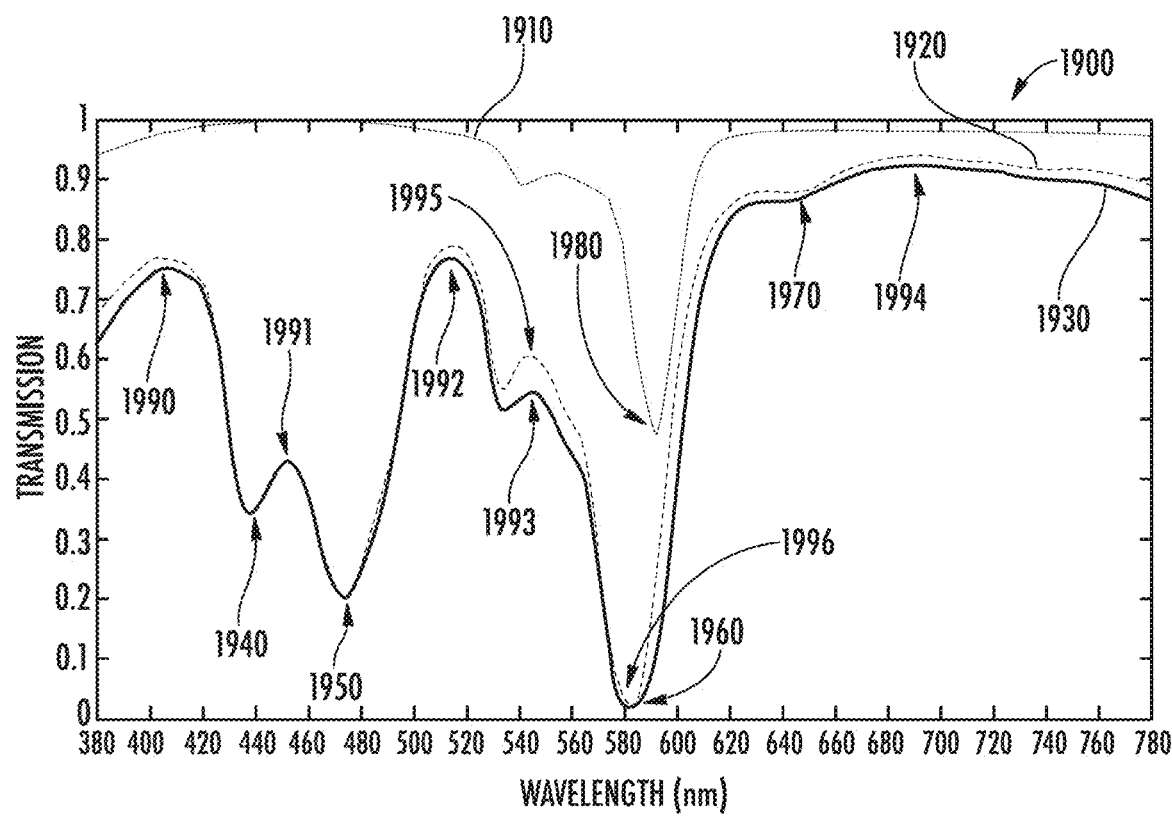
FIG. 19 shows the transmission spectra of an optical device, embodied in the form of a yellow-tinted optical device.

FIG. 19 illustrates a plot 1900 that shows the transmission spectra 1910, 1920, 1930 of an optical device, embodied in the form of a yellow-tinted OD, exposed to various lighting conditions. This OD exhibits photochromism, and is referred to as the Second Photochromic OD. This OD may enhance red-green color discernment for those with CVD and those with normal color vision. The dashed-line is the transmission spectrum 1920 of the OD under CIE F2 fluorescent lighting, as another example of a non- or low-UV source. The dotted-line is the transmission spectrum 1910 of one or more photochromic colorants under D65 daylight illumination, which occurs in addition to the persistent transmission spectra 1920 (dashed-line) when exposed to daylight or another UV source. The resultant or effective transmission spectrum 1930 of the OD under daylight, including overcast illumination, is shown by the solid line. For illumination conditions where both fluorescent lighting and daylight exist, then any resultant transmission spectrum of the OD is bounded between the solid-line spectrum 1930 and dash-line spectrum 1920, at each wavelength between 380 nm and 780 nm. The non- or low-UV, e.g. fluorescent light lit, transmission spectrum 1920 may be constructed using four non-photochromic dyes with peak absorptions at about 438 nm 1940, 475 nm 1950, 585 nm 1960 and 645 nm 1970. At least one photochromic dye has absorbance peak between 520 nm and 780 nm when activated, such as peak absorption 1980.

Under a UV source, such as daylight, plot 1900 shows at least 4 pass-bands 1990, 1991, 1992, 1993, 1994 in the transmission spectrum 1930 or at least tetrachromatic transmission spectrum from 380 nm to 780 nm, denoted by solid line. At least one pass-band 1990 has a peak transmittance wavelength shorter than 440 nm, at least two pass-bands 1990, 1991 have peak transmittance wavelengths shorter than 495 nm, at least four pass-bands 1990, 1991, 1992, 1993 have peak transmittance wavelengths shorter than 595 nm, where at least one pass-band's peak transmittance wavelength is at least 5 nm longer than that of another pass-band, at least one pass-band 1994 has a peak wavelength longer than 596 nm. For spectrum 1930, one pass-band 1990 is substantially centered at 405 nm, one pass-band 1991 is substantially centered at 450 nm, one pass-band 1992 is substantially centered at 510 nm, one pass-band 1993 is substantially centered at 545 nm, and another pass-band 1994 is substantially centered at 690 nm. The lowest transmission between 530 nm and 780 nm is higher than the lowest transmission between 380 nm and 529 nm.

Within 380 nm to 780 nm of an OD's transmission spectrum, the peak transmittance of at least one pass-band 1995 when illuminated by any non- or low-UV source, i.e., inactivated photochromic dye(s), is at least 2% higher than the peak transmittance of at least one pass-band (1993) when illuminated at least by one UV source. Within 520 nm to 620 nm of an OD's transmission spectrum, the FWHM of at least one stop-band 1960 when illuminated at least by any UV source is at least 2 nm wider than the FWHM of at least one stop-band (1996) when illuminated by any non- or low-UV source.

For example in FIG. 19, peak transmission of the pass-band substantially centered at 545 nm 1995 and illuminated by CIE F2 (non- or low-UV source) is approximately 6% higher than the peak transmission of the pass-band also substantially centered at 545 nm 1993 when illuminated by CIE D65. For example in FIG. 19, FWHM of the stop-band 1960 substantially centered at 585 nm and illuminated by CIE D65 is approximately 10 nm wider than the FWHM of the stop-band 1996 also substantially centered at 585 nm, as illuminated by CIE F2.

One or more photochromic dyes is used, and when activated by a UV source have peak absorption at about 590 nm 1980. Both photochromic and non-photochromic colorants can be incorporated into or onto the OD substrate via previously described methods of construction.

Viewed under CIE F2 illumination, without photochromic dye activation, the lightness CPM of the Second Photochromic OD is 59, where that with the naked eye is 81. Equivalently, under CIE F2 illumination, lightness of OD is 72% of that with the naked eye or is 72 or is between 50 and 100. The photopic and scotopic luminous transmittances of the OD are both between 5% and 95%. Viewed under CIE D65 illumination, with photochromic dye activation, the lightness CPM of the Second Photochromic OD is 72, where that with the naked eye is 96. Equivalently, under CIE D65 illumination, lightness of OD is 75% of that with the naked eye or is 75 or is between 50 and 100. The photopic and scotopic luminous transmittances of the OD are both between 5% and 95%. The difference in the photopic luminous transmittances of the OD is within 40% when the illuminant switches from CIE F2 to CIE D65, regardless of the presence and/or activation of any photochromic dyes. The difference in the scotopic luminous transmittances of the OD is within 40% when the illuminant switches from CIE F2 to CIE D65, regardless of the presence and/or activation of any photochromic dyes.

FIG. 20A illustrates a plot 2000a that shows the colorimetric effects of the Second Photochromic OD under F2 illuminant and with a deuteranomalous observer, where the M-cone is red-shifted 15 nm. Select pastel and saturated Munsell color gamuts are used. From neutral 2020a, the WP 2010a of the OD is shifted by 0.007, or between 0.001 and 0.2, distance units in ⟨u,v⟩ coordinates.

Without the photochromic dyes activated (including use of such dyes), the WP of the OD in daylight may be shifted by at least 0.003 distance units more or less than the WPS 2010b of OD in daylight with photochromic dye activation, in ⟨u,v⟩ coordinates.

FIG. 20B illustrates a plot 2000b that shows the colorimetric effects of the Second Photochromic OD under D65 illuminant and with the same deuteranomalous observer. From neutral 2020b, the WP 2010b of the OD is shifted by 0.013, or between 0.001 and 0.2, distance units in ⟨u, v⟩ coordinates towards yellow, creating a pastel yellow single-pass cosmetic tint for the OD.

The difference in the WPSes of the OD is within 0.2 in uv coordinates when the illuminant switches from CIE F2 to CIE D65, regardless of the use and/or activation of any photochromic dyes. At least one of an OD's single-pass WPs, i.e., single-pass cosmetic tint, is non-red compared to naked eye (i.e., chromatically-adapted neutral) when illuminated by CIE F2, D65 and/or F11.

For both FIGS. 20A and 20B, the thin solid line, thin dashed line and solid circle mark the saturated Munsell color gamut 2040a, 2040b, pastel Munsell color gamut 2050a, 2050b, and WP for a naked eye red-green CVD observer 2020a, 2020b. The thick solid line, thick dashed line and solid square mark the saturated Munsell color gamut 2030a, 2030b, pastel Munsell color gamut 2060a, 2060b, and WP 2010a, 2010b for a red-green CVD observer seeing with the OD.

Under CIE F2 illumination, the Second Photochromic OD has a $RG_{LI}$ Color Difference Percent of 48.6%, or between 10% and 90%. Both the pastel and saturated color gamuts 2060a, 2030a are minimally shifted towards yellow. In terms of Hue Shift (HS) CPM, gamut hues largely remained the same when viewed with and without the OD. Hence, hues are preserved. Under CIE D65 illuminant, the Second Photochromic OD has a $RG_{LI}$ Color Difference Percent of 40.9%, or between 10% and 90%. Both the pastel and saturated color gamuts 2060b, 2030b are minimally shifted towards yellow. In terms of Hue Shift (HS) CPM, gamut hues largely remained the same when viewed with and without the OD. Hence, hues are preserved.

The difference in the $RG_{LI}$ Color Difference Percent of the OD is within 50% when the illuminant switches from CIE F2 to CIE D65, regardless of the use and/or activation of any photochromic dyes.

When viewed under CIE D65 lighting and through the Second Photochromic OD, the red-green LD of red and green color sets is: (1) 2.3, or between 0.5 and 5.0, when those colors are represented by select Munsell color sets, and (2) 2.1, or between 0.5 and 5.0, when those colors are represented by select Ishihara color sets. When viewed under CIE F2 lighting and through the Second Photochromic OD, the red-green LD of red and green color sets is: (1) 2.5 or between 0.5 and 5.0, when those colors are represented by select Munsell color sets, and (2) 2.0 or between 0.5 and 5.0, when those colors are represented by select Ishihara color sets. The Second Photochromic OD allows protans, deutans and normal people to better discern previously confusing red, green and derivative colors by increasing the LD between those colors. In comparison, with the naked eye under CIE D65 illuminant, the red-green LD is: (1) 0.9 when those colors are represented by select Munsell red and green color sets, and (2) −0.5 when those colors are represented by select Ishihara red and green color sets. Viewing through the OD, the difference in the red-green LDs when the illuminant switches from CIE F2 to CIE D65 is within 4.5 for both Ishihara and Munsell color sets, regardless of the presence of photochromic dyes.

Figure 21:
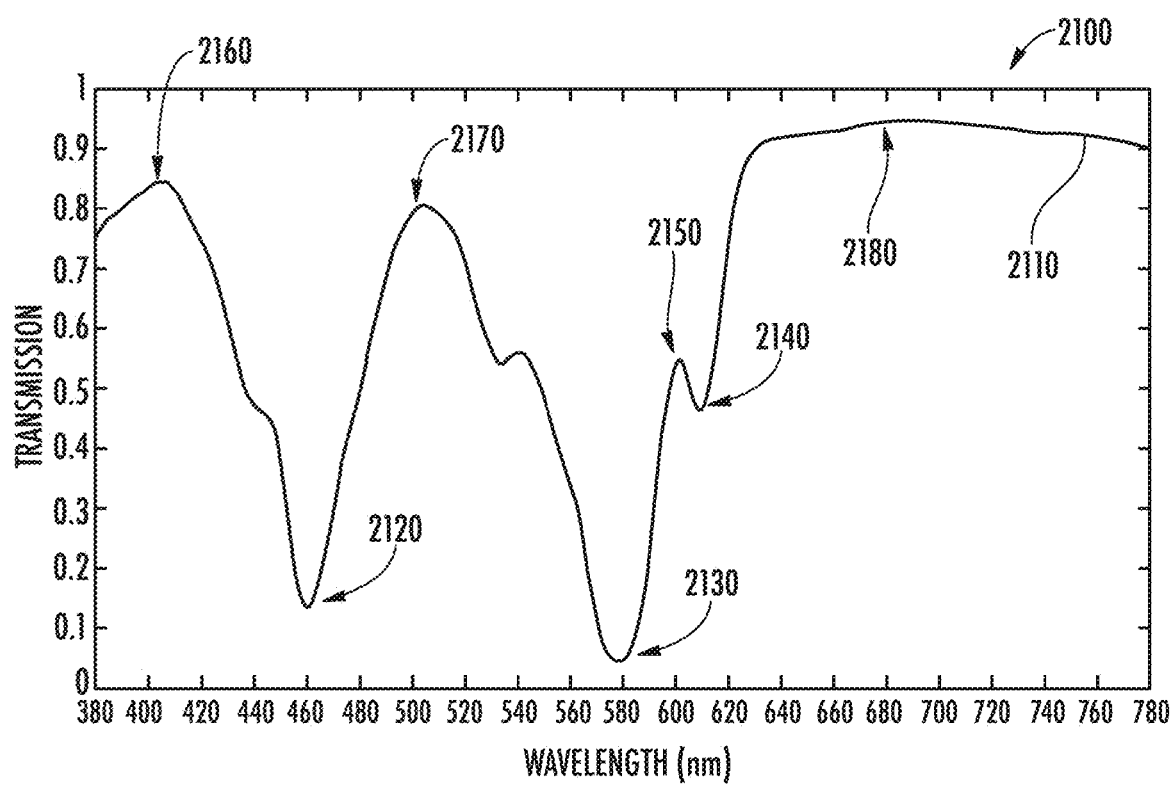
FIG. 21 shows the transmission spectra of an optical device, embodied in the form of a color constant optical device.

FIG. 21 illustrates a plot 2100 that shows the transmission spectra 2110 of an optical device, embodied in the form of a color constant optical device (OD). This OD is referred to as a First Color Constant OD. This OD enhances red-green color discernment for those with CVD and those with normal color vision. This OD exhibits color constancy of single-pass and/or double-pass cosmetic tint (including neutral tint or near neutral tint) under multiple lighting sources, including fluorescent and natural lighting, such as daylight, without the use of chromic colorants. Chromic colorants are dyes, pigments and other colorants that can be induced to change their optical characteristics. Chromic colorants include photochromic, thermochromic, electrochromic, and many others. Cosmetic tint may also include the WP (white point) of an observers color vision while viewing through the OD. Color constancy refers to the lightness, hue and/or chroma of a color appearance is the same or nearly the same under different viewing environments, which can include different illuminants.

The transmission spectrum 2110 may be constructed using three non-chromic dyes with peak absorptions at about 460 nm 2120, 580 nm 2130 and 610 nm 2140. This spectrum may be designed and constructed to be invariant, i.e., not chromic. The non-chromic dyes may be used to alter the transmission spectra to achieve high performance of the CPMs under different lighting conditions, e.g., daylight, fluorescent light and LED light. These non-chromic colorants may be incorporated into or onto a substrate with suitable optical characteristic via many manufacturing methods, such as compounding dyes into a substrate and molding the substrate into shape, coating the substrate via dipping, spraying and/or spinning or laminating the colorant layers between other substrate layers. Known post-processing of the OD can be applied, such as surface coatings, curing, cutting, grinding and polishing. Regardless of the manufacturing method or geometric dimensions or post-processing, the OD contains the effective transmission spectra, as illustrated in FIG. 21.

FIG. 21 illustrates a plot 2100 that shows at least 4 pass-bands 2150, 2160, 2170, 2180 in the transmission spectrum 2110 of the OD or at least tetrachromatic transmission spectrum from 380 nm to 780 nm. At least one pass-band 2160 has a peak transmittance wavelength shorter than 460 nm; at least two pass-bands 2160, 2170 have peak transmittance wavelengths shorter than 540 nm, at least three pass-bands 2160, 2170, 2150 have peak transmittance wavelengths shorter than 640 nm, at least four pass-bands 2160, 2170, 2150, 2180 have peak transmittance wavelengths shorter than 780 nm, the pass-band 2180 with the longest peak transmittance wavelength has a longer such wavelength by at least 10 nm than that of the pass-band 2150 with the second longest peak transmittance wavelength.

For spectrum 2100, one pass-band 2160 is substantially centered at 405 nm, one pass-band 2170 is substantially centered at 505 nm, one pass-band 2150 is substantially centered at 600 nm, and another pass-band 2180 is substantially centered at 680 nm. The average transmission between 460 nm and 540 nm is higher than the average transmission between 550 nm and 600 nm.

Viewed under CIE F11 illumination the lightness CPM of the First Color Constant OD is 41, where that with the naked eye is 57. Equivalently, under CIE F11 illumination, lightness of OD is 72% of that with the naked eye, or is 72, or is between 50 and 100. The photopic and scotopic luminous transmittances of the OD are 48% and 52%, respectively, or are both between 5% and 95%. Viewed under CIE F2 illumination the lightness CPM of the First Color Constant OD is 55, where that with the naked eye is 81. Equivalently, under CIE F2 illumination, lightness of OD is 68% of that with the naked eye, or is 68, or is between 50 and 100. The photopic and scotopic luminous transmittances of the OD are 39% and 51%, respectively, or are both between 5% and 95%. Viewed under CIE D65 illumination, the lightness CPM of the First Color Constant OD is 71, where that with the naked eye is 96. Equivalently, under CIE D65 illumination, lightness of OD is 74% of that with the naked eye, or is 74, or is between 50 and 100. The photopic and scotopic luminous transmittances of the OD are 47% and 54%, respectively, or are both between 5% and 95%. The variation in the photopic luminous transmittances of the OD is within 40% when the illuminant varies between CIE D65, F2 and F11. The variation in the scotopic luminous transmittances of the OD is within 40% when the illuminant varies between CIE D65, F2 and F11.

Figure 22:
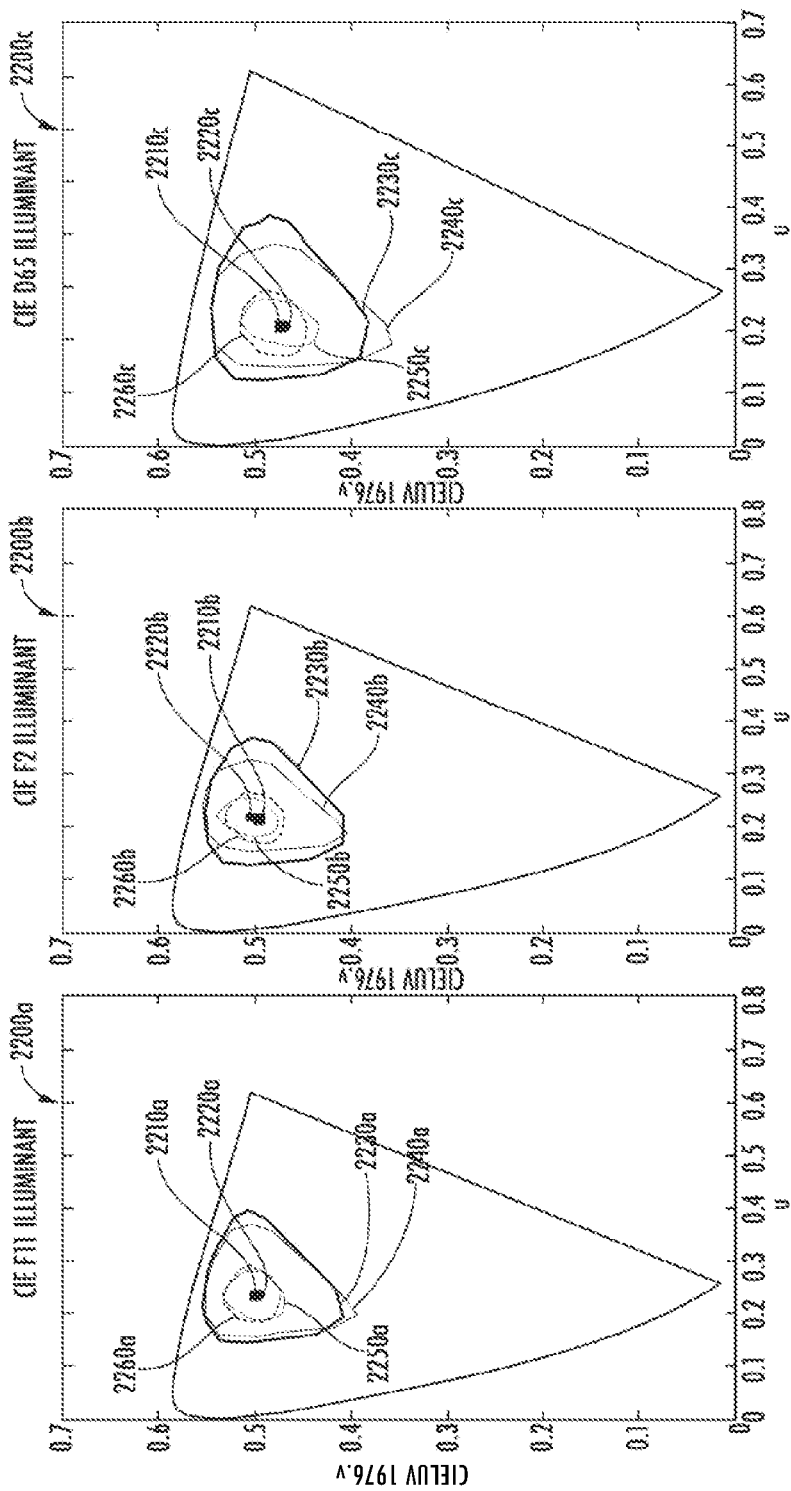
FIG. 22A shows the colorimetric effects of the Color Constant device whose transmission spectrum is graphed in FIG. 21, with F11 as an illuminant, in CIE LAB color space.
FIG. 22B shows the colorimetric effects of the Color Constant device whose transmission spectrum is graphed in FIG. 21, with F2 as an illuminant, in CIE LAB color space.
FIG. 22C shows the colorimetric effects of the Color Constant device whose transmission spectrum is graphed in FIG. 21, with D65 as an illuminant, in CIE LAB color space.

FIG. 22A illustrates plot 2200a that shows the colorimetric effects of the First Color Constant OD under F11 illuminant. Select pastel and saturated Munsell color gamuts are used. From neutral 2220a, the single-pass cosmetic tint 2210a of the OD is shifted (WPS), nearly imperceptibly, by 0.003, or between 0.001 and 0.2, distance units in ⟨u, v⟩ coordinates. Hue of the OD's WP 2210a is shifted towards substantially yellow, yellow-red, red or purple hue.

FIG. 22B illustrates a plot 2200b that shows the colorimetric effects of the First Color Constant OD under F2 illuminant. The same pastel and saturated Munsell color gamuts are used from FIG. 22A. From neutral 2220b, the single-pass cosmetic tint 2210b of the OD is minimally shifted (WPS) by 0.008, or between 0.001 and 0.2, distance units in ⟨u,v⟩ coordinates. Hue of the OD's WP 2210b shifted towards substantially blue, cyan or purple hue.

FIG. 22C illustrates a plot 2200c that shows the colorimetric effects of the First Color Constant OD under D65 illuminant. The same pastel and saturated Munsell color gamuts are used from FIGS. 22A and 22B. From neutral 2220c, the single-pass cosmetic tint 2210c of the OD is shifted (WPS) minimally by 0.007, or between 0.001 and 0.2 distance units in ⟨u,v⟩ coordinates. Hue of the OD's WP 2210c shifted towards substantially green, yellow-green, yellow or yellow-red hue.

In FIGS. 22A, 22B and 22C, the thin solid line, thin dashed line and solid circle mark the saturated Munsell color gamut 2240a, 2240b, 2240c, pastel Munsell color gamut 2250a, 2250b, 2250c, and WP 2220a, 2220b, 2220c for a naked eye red-green CVD observer. The thick solid line, thick dashed line and solid square mark the saturated Munsell color gamut 2230a, 2230b, 2230c, pastel Munsell color gamut 2260a, 2260b, 2260c, and WP 2210a, 2210b, 2210c for a red-green CVD observer or normal person seeing with the OD. The variation in the WPSes of the OD is within 0.2 in uv coordinates when the illuminant varies between CIE D65, F2 and F11.

The OD's single-pass WP 2210b, i.e., single-pass cosmetic tint, is bluer with a smaller (or less larger) v-value compared to v-value of the naked eye's WP 2220b when illuminated by CIE F2 than that when illuminated by CIE D65 2210c, 2220c and/or CIE F11 2210a, 2220a. The OD's cosmetic tint appears to be bluer or less yellow when under CIE F2 than when under D65 and/or F11. Bluer means color is more towards blue, i.e., in the direction of blue, though may not necessarily achieve blue. Bluer is equivalent to less yellow, because blue and yellow are opposing colors. Vice versa for yellower.

The OD's single-pass WP 2210a is redder with a larger (or less smaller) u-value compared to u-value of the naked eye's WP 2220a when illuminated by CIE F11 than that when illuminated by CIE D65 2210c, 2220c and/or CIE F2 2210b, 2220b. The OD's single-pass cosmetic tint appears to be redder or less green when under CIE F11 than when under D65 and/or F2. Redder means color is more towards red, i.e., in the direction of red, though may not necessarily achieve red. Redder is equivalent to less green, because red and green are opposing colors. Vice versa for greener.

Under CIE F11, the First Color Constant OD has a $RG_{LI}$ Color Difference Percent of 20.9%, or between 10% and 90%. Both the pastel and saturated blue colors are nearly imperceptibly shifted towards yellow. In terms of Hue Shift (HS) CPM, hues remained the same when viewed with and without the OD. Hence, hues are preserved. Under CIE F2, the First Color Constant OD has a $RG_{LI}$ Color Difference Percent of 54.1%, or between 10% and 90%. The pastel color gamut 2260b minimally shifted towards blue. The saturated color gamut 2230b did not shift towards blue. In terms of Hue Shift (HS) CPM, hues almost completely remained the same when viewed with and without the OD. Hence, hues are preserved. Under CIE D65, the First Color Constant OD has a $RG_{LI}$ Color Difference Percent of 41.5%, or between 10% and 90%. Both the pastel and saturated blue colors are minimally shifted towards yellow or yellow-green. In terms of Hue Shift (HS) CPM, hues almost completely remained the same when viewed with and without the OD. Hence, hues are preserved. The variation in the $RG_{LI}$ Color Difference Percent of the OD is within 60% when the illuminant varies between CIE F2, D65 and F11.

When viewed under CIE D65 lighting and through the First Color Constant OD, the red-green LD of red and green color sets is: (1) 1.3, or between 0.5 and 5.0, when those colors are represented by the select Munsell red and green color sets, and (2) 1.5, or between 0.5 and 5.0, when those colors are represented by select Ishihara red, green color sets. When viewed under CIE F11 lighting and through the First Color Constant OD, the red-green LD of red and green color sets is: (1) 1.0, or between 0.5 and 5.0, when those colors are represented by select Munsell colors, and (2) 1.1, or between 0.5 and 5.0, when those colors are represented by select Ishihara colors. When viewed under CIE F2 lighting and through the First Color Constant OD, the red-green LD of red and green color sets: (1) 0.9, or between 0.5 and 5.0, when those colors are represented by the selected Munsell colors, and (2) 0.8, or between 0.5 and 5.0, when those colors are represented by selected Ishihara colors.

Viewing through the OD, the variation in the red-green LDs when the illuminant varies between CIE F2, D65 and F11 is within 5.0 for both Ishihara and Munsell color sets.

The First Color Constant OD allows protans, deutans and normal people to better discern previously confusing red, green and derivative colors by (1) increasing the $RG_{LI}$ Color Difference, and/or (2) increasing the LD (lightness difference) between Munsell and/or Ishihara red and green color sets. The First Color Constant OD is considered color constant as the color differences between the described single-pass cosmetic tints under a variety of lighting environments are minimal. The First Color Constant OD is considered Cosmetically Acceptable as the WPSes of the cosmetic tints (including under different lighting environments) are minimal, e.g., less than 0.10 in WPS from naked eye, and/or the cosmetic tints are of acceptable hue, such as yellow, blue, green or red.

Figure 23:
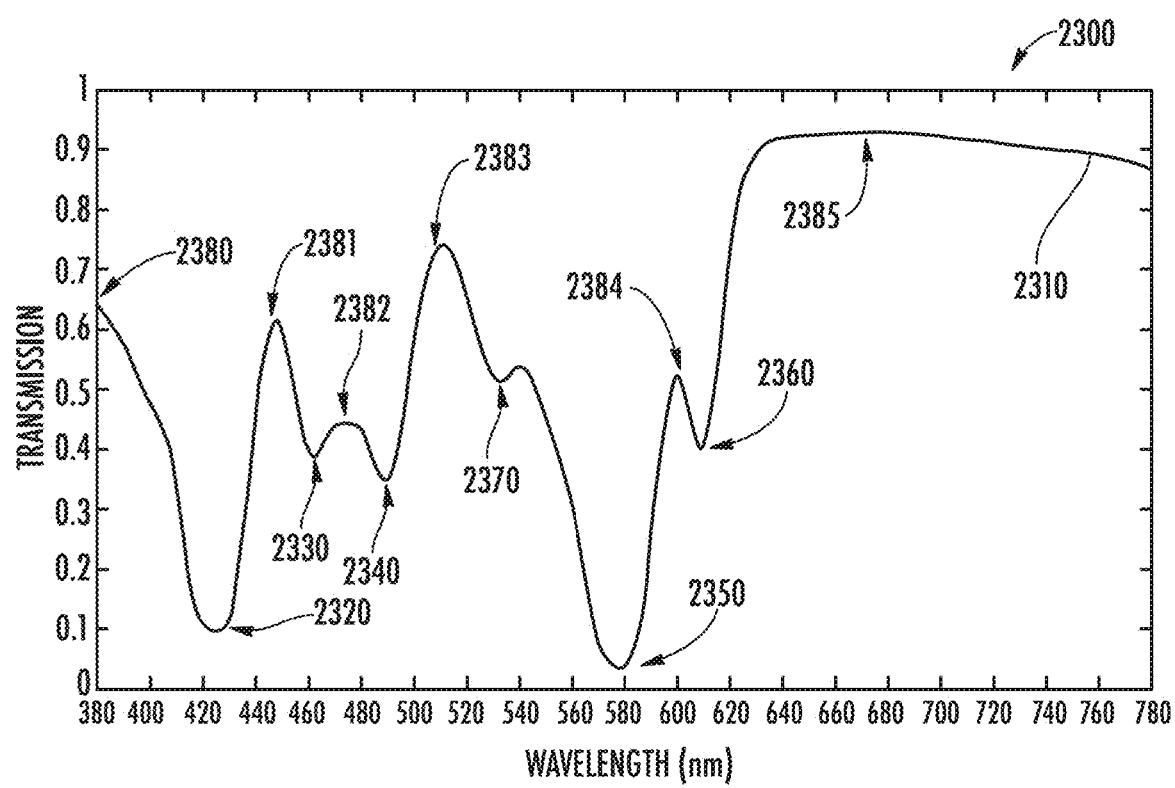
FIG. 23 shows the transmission spectra of an optical device, embodied in the form of another color constant optical device.

FIG. 23 illustrates a plot 2300 that illustrates the transmission spectrum 2310 of an optical device, embodied in the form of a color constant OD. This OD is termed Second Color Constant OD. This OD enhances red-green color discernment for those with CVD and those with normal color vision. This OD also exhibits color constancy of single-pass and/or double-pass cosmetic tint (including neutral tint or near neutral tint) under multiple lighting sources, including fluorescent and natural lighting, such as daylight, without the use of chromic colorants. The transmission spectrum 2310 may be constructed using five non-chromic dyes with peak absorption at about 425 nm 2320, 460 nm 2330, 490 nm 2340, 580 nm 2350 and 610 nm 2360. This spectrum may be designed and constructed to be invariant, i.e., not chromic. The non-chromic dyes were also used to modify the transmission spectra to achieve high performance of the CPMs under different lighting conditions, e.g., daylight, fluorescent light, incandescent light, and LED light. Each of the colorant used in this OD has concentrations between 0.1 and 250 micro-mol per 2 mm of absorption thickness of those colorants.

FIG. 23 illustrates a plot 2300 that shows at least 4 pass-bands in the transmission spectrum 2310 of the OD or at least tetrachromatic transmission spectrum from 380 nm to 780 nm. Stop-bands are centered at 425 nm 2320, 460 nm 2330, 490 nm 2340, 535 nm 2370, 580 nm 2350 and 610 nm 2360. Pass-bands are centered at 380 nm 2380, 450 nm 2381, 475 nm 2382, 510 nm 2383, 600 nm 2384 and 670 nm 2385.

Spectrum 2310 has at least one pass-band, two pass-bands shown in plot 2300, pass-band 2380, pass-band 2381, with a peak transmittance wavelength shorter than 460 nm, at least one pass-band, two pass-bands shown in plot 2300, pass-band 2382, pass-band 2383, with a peak transmittance wavelength between 461 nm and 540 nm, at least two pass-bands 2384, 2385 with peak transmittance wavelengths longer than 541 nm, and a separation of at least 5 nm between all pairs of adjacent pass-bands' centers. For example, the pass-bands centered at 450 nm 2381 and 475 nm 2382 is a pair of adjacent pass-bands' centers. The pass-bands centered at 475 nm 2382 and 510 nm 2383 are also a pair of adjacent pass-bands' centers. The average transmission between 500 nm and 550 nm is higher than the average transmission between 570 nm and 590 nm.

A stop-band's center at shorter than 450 nm 2320 may have at least 30% peak absorbance. The most peak-absorptive stop-band 2350 centered between 550 nm and 610 nm has at least 30% peak absorbance. At least one stop band 2330, 2340 centered between 440 nm and 510 nm have less than 85% peak absorbance. The pass-band 2383 with the highest peak transmission centered between 480 nm and 570 nm has a peak transmission larger than 20%. There is at least one stop-band 2360 centered at a wavelength longer than 580 nm.

Viewed under CIE F11 illumination the lightness CPM of the Second Color Constant OD is 40, where that with the naked eye is 57. Equivalently, under CIE F11 illumination, lightness of OD is 70% of that with the naked eye, or is 70, or is between 50 and 100. The photopic and scotopic luminous transmittances of the OD are 45% and 45%, respectively, or are both between 5% and 95%. Viewed under CIE F2 illumination the lightness CPM of the Second Color Constant OD is 53, where that with the naked eye is 81. Equivalently, under CIE F2 illumination, lightness of OD is 66% of that with the naked eye, or is 66, or is between 50 and 100. The photopic and scotopic luminous transmittances of the OD are 37% and 45%, respectively, or are both between 5% and 95%. Viewed under CIE D65 illumination, the lightness CPM of the Second Color Constant OD is 69, where that with the naked eye is 96. Equivalently, under CIE D65 illumination, lightness of OD is 72% of that with the naked eye, or is 72, or is between 50 and 100. The photopic and scotopic luminous transmittances of the OD are 44% and 49%, respectively, or are both between 5% and 95%. The variation in the lightnesses of the OD is within 40 when the illuminant varies between CIE D65, F2 and F11. The variation in the scotopic luminous transmittances of the OD is within 40% when the illuminant varies between CIE D65, F2 and F11.

Figure 24:
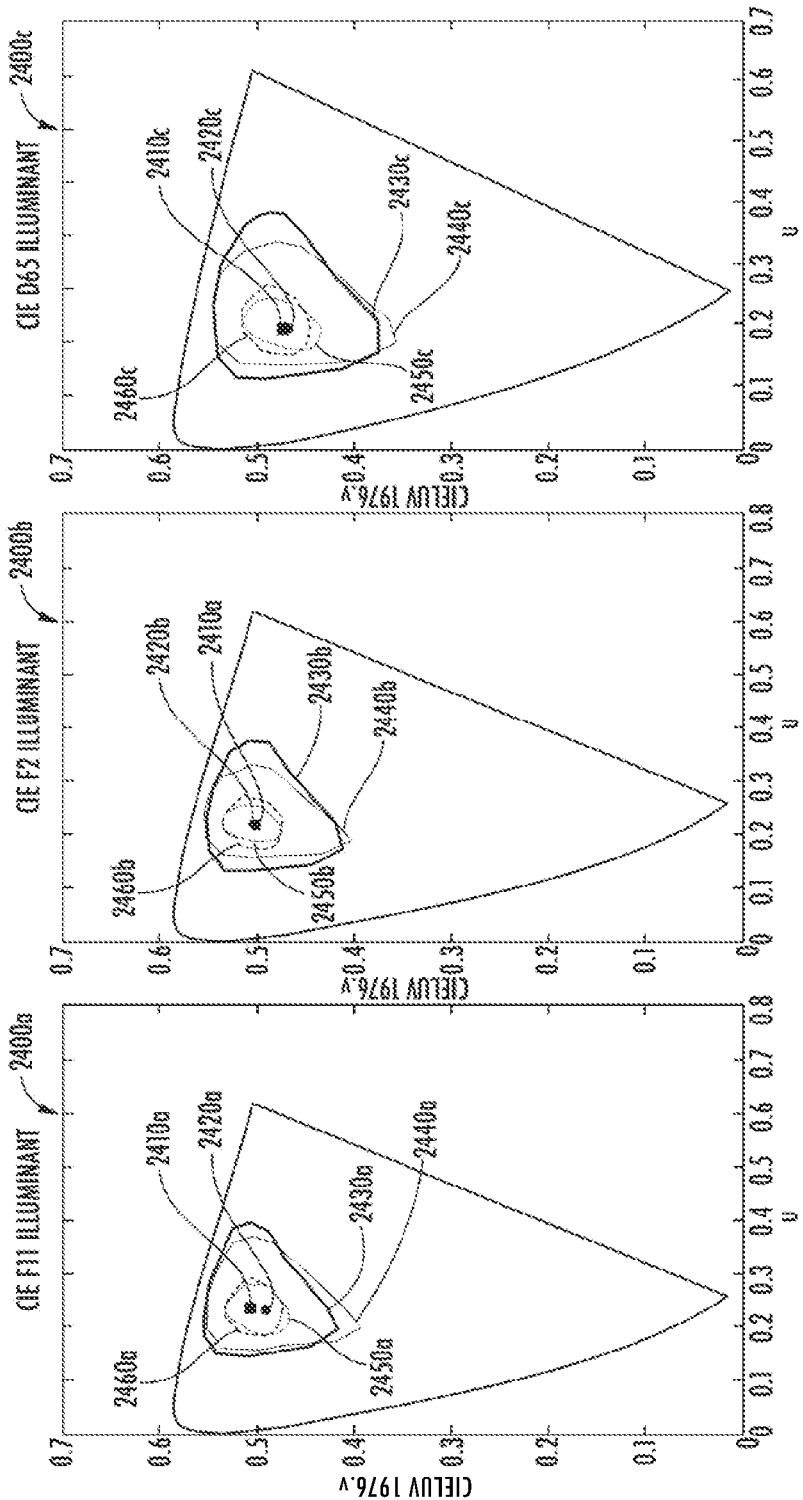
FIG. 24A shows the colorimetric effects of the Color Constant device whose transmission spectrum is graphed in FIG. 23, with F11 as an illuminant, in CIE LAB color space.
FIG. 24B shows the colorimetric effects of the Color Constant device whose transmission spectrum is graphed in FIG. 23, with F2 as an illuminant, in CIE LAB color space.
FIG. 24C shows the colorimetric effects of the Color Constant device whose transmission spectrum is graphed in FIG. 23, with D65 as an illuminant, in CIE LAB color space.

FIG. 24A illustrates a plot 2400a that shows the colorimetric effects of the Second Color Constant OD under F11 illuminant. Select pastel and saturated Munsell color gamuts are used. From neutral 2420a, the WP 2410a of the OD is shifted minimally by 0.01, or between 0.001 and 0.2, distance units in ⟨u,v⟩ coordinates. Hue of the OD's WP 2410a shifted towards substantially yellow-green, yellow, yellow-red, red or purple hue, from WP of naked eye.

FIG. 24B illustrates a plot 2400b that shows the colorimetric effects of the Second Color Constant OD under F2 illuminant. The same pastel and saturated Munsell colors are used from FIG. 24A. From neutral 2420b, the WP 2410b of the OD is minimally shifted by 0.002, or between 0.001 and 0.2, distance units in ⟨u,v⟩ coordinates towards blue. Such low WPS of the cosmetic tint 2410b, from WP of naked eye 2420b, which may be considered visually imperceptible.

FIG. 24C illustrates a plot 2400c that shows the colorimetric effects of the Second Color Constant OD under D65 illuminant. The same pastel and saturated Munsell colors are used from FIGS. 24A and 24B. From neutral 2420c, the WP 2410c of the OD is shifted minimally by 0.006, or between 0.001 and 0.2, distance units in ⟨u,v⟩ coordinates. Hue of the OD's WP 2410c shifted towards substantially green, yellow-green, yellow, yellow-red or red hue, from WP 2420c of naked eye.

The variation in the WPSes of the OD is within 0.07 in uv coordinates when the illuminant varies between CIE D65, F2 and/or F11. The OD's single-pass WP 2410b, i.e. single-pass cosmetic tint, is bluer with a smaller (or less larger) v-value compared to v-value of the naked eye's WP 2420b when illuminated by CIE F2 than that when illuminated by CIE D65 2410c, 2420c and/or CIE F11 2410a, 2420a. The OD's cosmetic tint appears to be bluer or less yellow when under CIE F2 than when under D65 and/or F11.

For FIGS. 24A, B and C, the thin solid line, thin dashed line and solid circle mark the saturated Munsell color gamut 2440a, 2440b, 2440c, pastel Munsell color gamut 2540a, 2540b, 2540c, and WP 2420a, 2420b, 2420c for a naked eye red-green CVD observer. The thick solid line, thick dashed line and solid square mark the saturated Munsell color gamut 2430a, 2430b, 2430c, pastel Munsell color gamut 2460a, 2460b, 2460c, and WP 2410a, 2410b, 2410c for a red-green CVD observer seeing with the OD.

Under CIE F11, the Second Color Constant OD has a $RG_{LI}$ Color Difference Percent of 21.7%, or between 10% and 90%. Both the pastel and saturated blue colors are minimally shifted towards yellow. In terms of Hue Shift (HS) CPM, all hues remained largely the same when viewed with and without the OD. Hence, hues are preserved. Under CIE F2, the Second Color Constant OD has a $RG_{LI}$ Color Difference Percent of 56.2%, or between 10% and 90%. Both the pastel and saturated color gamuts 2460b, 2430b did not shift towards blue. In terms of Hue Shift (HS) CPM, the hues almost completely remained the same when viewed with and without the OD so hues are preserved. Under CIE D65, the Second Color Constant OD has a $RG_{LI}$ Color Difference Percent of 42.5%, or between 10% and 90%. Both the pastel and saturated blue colors are minimally shifted towards yellow. In terms of Hue Shift (HS) CPM, hues almost completely remained the same when viewed with and without the OD so hues are preserved. The variation in the $RG_{LI}$ Color Difference Percent of the OD is within 70% when the illuminant varies between CIE F2, D65 and F11.

When viewed under CIE D65 lighting and through the Second Color Constant OD, the red-green LD of red, green color sets is: (1) 1.5, or between 0.5 and 5.0, when those colors are represented by the select Munsell red, green color sets, and (2) 1.4, or between 0.5 and 5.0, when those colors are represented by select Ishihara red, green color sets. When viewed under CIE F11 lighting and through the Second Color Constant OD, the red-green LD of red and green color sets is: (1) 0.9, or between 0.5 and 5.0, when those colors are represented by select Munsell color sets, and (2) 1.1, or between 0.5 and 5.0, when those colors are represented by select Ishihara color sets. When viewed under CIE F2 lighting and through the Second Color Constant OD, the red-green LD of red and green color sets is: (1) 1.0, or between 0.5 and 5.0, when those colors are represented by the selected Munsell color sets, and (2) 0.7, or between 0.5 and 5.0, when those colors are represented by selected Ishihara color sets.

Viewing through the OD, the variation in the red-green LDs when the illuminant varies between CIE F2, D65 and F11 is within 5.0 for both Ishihara and Munsell color sets.

The Second Color Constant OD allows protans, deutans and normal people to better discern previously confusing red, green and derivative colors by (1) increasing the $RG_{LI}$ Color Difference, and/or (2) increasing the LD between Munsell and/or Ishihara red and green color sets. The Second Color Constant OD is considered color constant or nearly color constant as the color differences between the described single-pass cosmetic tints (WPs) under a variety of lighting environments are minimal, e.g., less than 0.07 in WPS from naked eye, and/or the cosmetic tints are of acceptable hue, such as yellow, blue or green.

Figure 25:
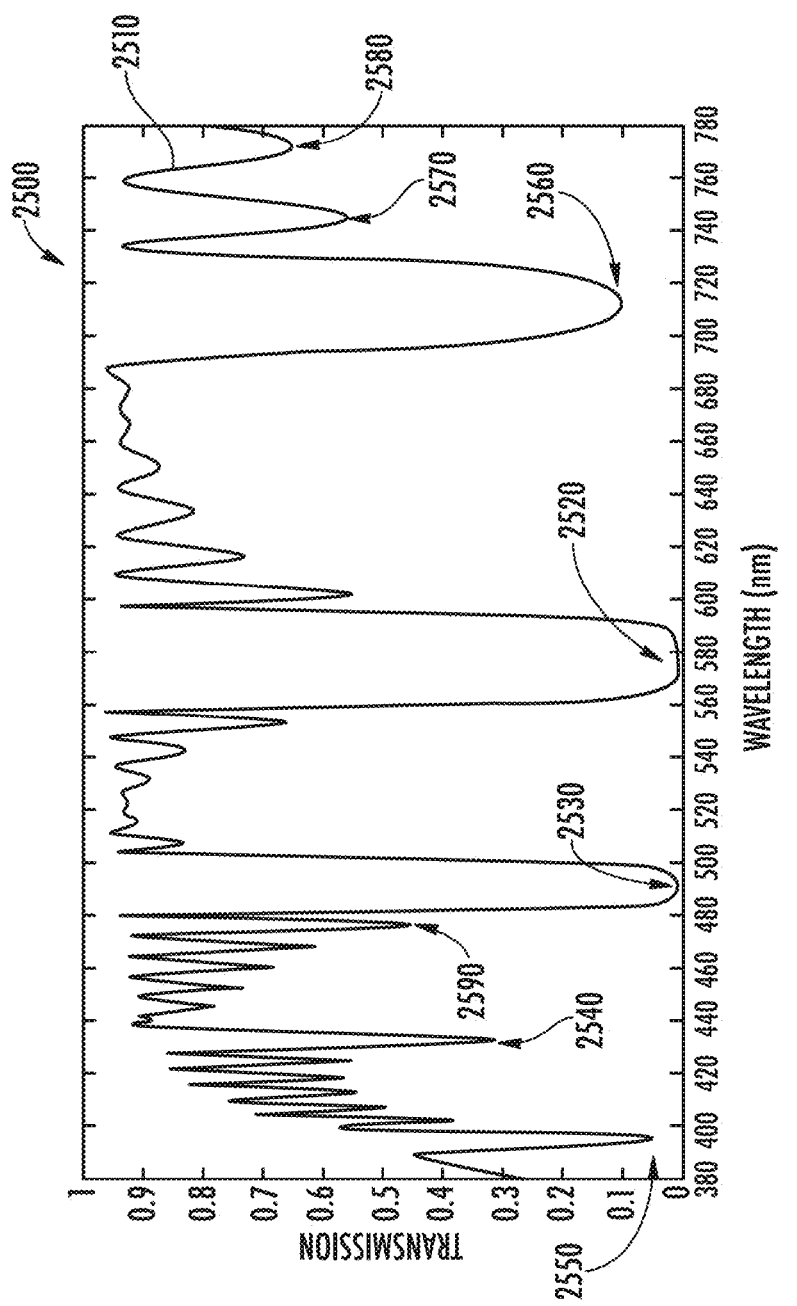
FIG. 25 shows the transmission spectra of an optical device, embodied in the form of a third color constant optical device.

FIG. 25 illustrates a plot 2500 that shows the transmission spectrum 2510 of an optical device, embodied in the form of a color constant OD. This OD is termed Third Color Constant OD. This OD enhances red-green color discernment for those with CVD and those with normal color vision. This OD also exhibits color constancy of single-pass and/or double-pass cosmetic tint (including neutral tint or near neutral tint) under multiple lighting sources, including fluorescent, LED, incandescent and natural lighting, such as daylight, without the use of chromic colorants. The transmission spectrum (2510) may be constructed using thin films, such as interference and/or rugate thin films. Thirteen alternating layers of TiO2 and SiO2 may be used as interference thin film layer materials, with index of refraction averaging 2.35 and 1.48, respectively. Each TiO2 layer has a physical thickness between 400 nm and 480 nm. Each SiO2 layer has a physical thickness between 240 nm and 320 nm. At least one transmission stop-band 2520 is centered at approximately 575 nm, or between 540 nm and 605 nm. Stop-band 2520 is designed and constructed to enhance the RG color separation capability of the OD as measured by $RG_{LI}$ Color Difference and/or $RG_{Total}$ Color Difference. This stop-band also contributes to the color balance or color control of the OD's single-pass and/or double-pass cosmetic tints, and of the receiver's color vision.

Spectrum 2510 has at least one stop-band, illustrated in plot 2500 as stop-band 2530, stop-band 2540, stop-band 2550, centered at below 539 nm. Spectrum 2510 has at least one stop-band, illustrated as stop-band 2560, stop-band 2570, stop-band 2580, is centered at above 606 nm. These stop-bands may be included for further color balancing or color controlling the single-pass and/or double-pass cosmetic tints of the OD as well as enhancing the OD's color separation capability. There is one or more stop-bands with peak wavelength shorter than 470 nm, such as at about 430 nm 2540 and 395 nm 2550.

For an effective transmission spectrum that is fully or partially constructed by one or more thin films, a spectral stop band needs to have a FWHM of reflectance of at least 8 nm, peak reflectance of at least 25%, and whose peak reflectance wavelength is not within 20 nm of the peak reflectance wavelength of another more reflecting region of wavelengths. In a transmission spectral graph, reflectance and/or absorbance is the negative space in the graph. In addition to the aforementioned stop-bands, another example stop-band is centered at 745 nm 2570. The local reflectance region centered at 475 nm generally is not referred to as a stop-band 2590.

This spectrum is designed and constructed to be invariant, i.e., not chromic. The thin film materials, deposition methods, and layer thicknesses may be used to modify the OD's transmission spectra to achieve high performance of CPMs under different lighting conditions, e.g. daylight, fluorescent light, incandescent and LED light. Thin film deposition methods are well-known, and can include physical deposition (PD) and/or chemical deposition (CD). Within CD, there are numerous techniques such as plating, vapor deposition, solution deposition and coating. Within PD, numerous techniques include thermal evaporation, molecular beam epitaxy, sputtering, and many others. The deposited complete thin film (including the composition layers) can be post-processed, such as laminated between two or more substrate layers or coated by additional materials to enhance other desirable properties of an OD (hardness, hydrophobic, anti-glared, etc.) or encased by one or more materials.

Viewed under CIE F11 illumination the lightness CPM of the Third Color Constant OD is 49, where that with the naked eye is 57. Equivalently, under CIE F11 illumination, lightness of OD is 86% of that with the naked eye, or is 86, or is between 50 and 100. The photopic and scotopic luminous transmittances of the OD are 69% and 63%, respectively, or are both between 5% and 95%. Viewed under CIE F2 illumination the lightness CPM of the Third Color Constant OD is 60.7, where that with the naked eye is 81. Equivalently, under CIE F2 illumination, lightness of OD is 75% of that with the naked eye, or is 75, or is between 50 and 100. The photopic and scotopic luminous transmittances of the OD are 49% and 62%, respectively, or are both between 5% and 95%. Viewed under CIE D65 illumination, the lightness CPM of the Third Color Constant OD is 78, where that with the naked eye is 96. Equivalently, under CIE D65 illumination, lightness of OD is 81% of that with the naked eye, or is 81, or is between 50 and 100. The photopic and scotopic luminous transmittances of the OD are 59% and 64%, respectively, or are both between 5% and 95%. The variation in the lightnesses of the OD is within 40 when the illuminant varies between CIE D65, F2 and F11. The variation in the photopic luminous transmittances of the OD is within 50% when the illuminant varies between CIE D65, F2 and F11. The variation in the scotopic luminous transmittances of the OD is within 50% when the illuminant varies between CIE D65, F2 and F11.

Figure 26:
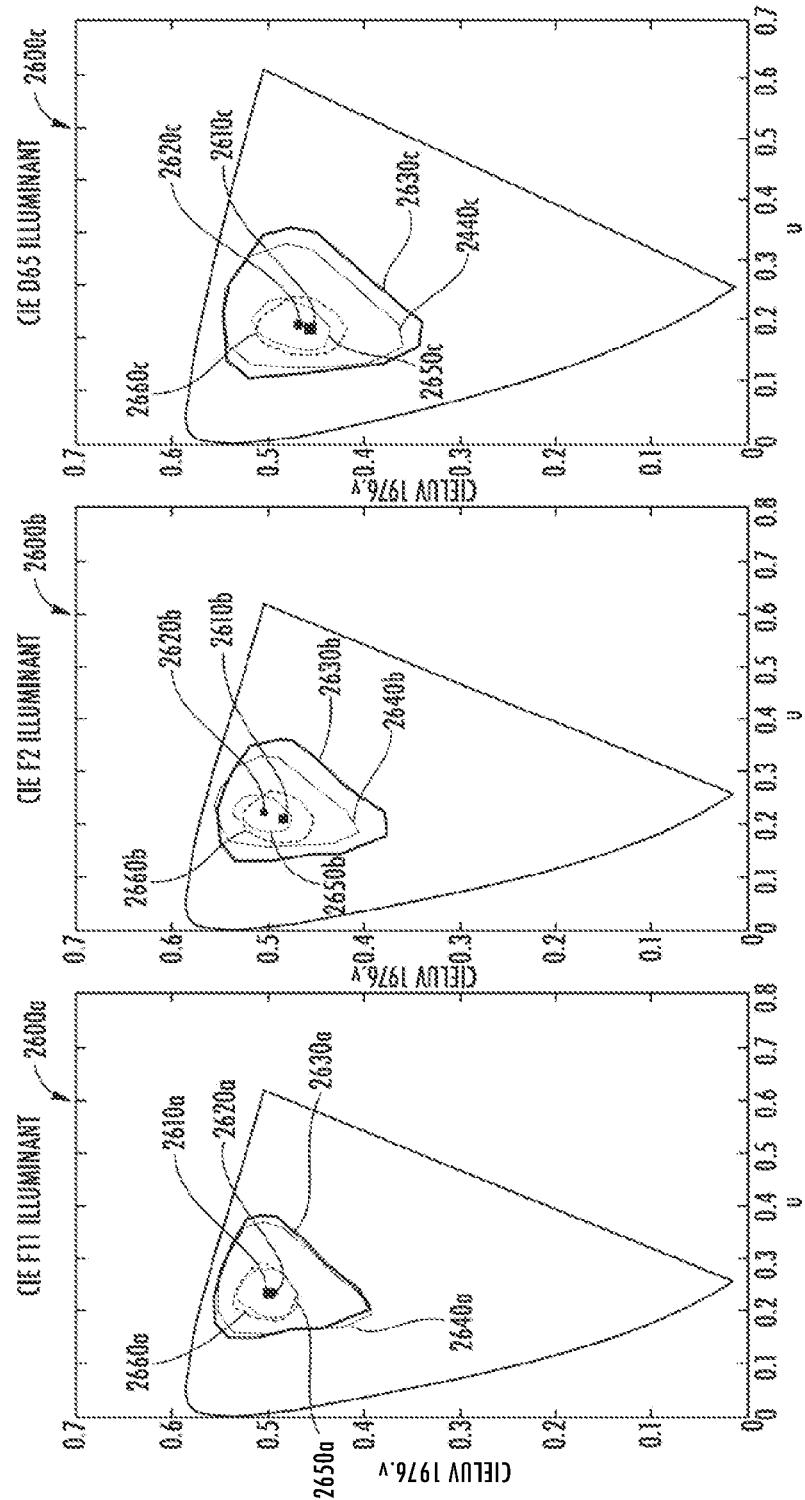
FIG. 26A shows the colorimetric effects of the Color Constant device whose transmission spectrum is graphed in FIG. 25, with F11 as an illuminant, in CIE LAB color space.
FIG. 26B shows the colorimetric effects of the Color Constant device whose transmission spectrum is graphed in FIG. 25, with F2 as an illuminant, in CIE LAB color space.
FIG. 26C shows the colorimetric effects of the Color Constant device whose transmission spectrum is graphed in FIG. 25, with D65 as an illuminant, in CIE LAB color space.

FIG. 26A illustrates a plot 2600a that shows the colorimetric effects of the Third Color Constant OD under F11 illuminant. Select pastel and saturated Munsell color gamuts are used. From neutral 2620a, the WP 2610a of the OD is shifted, minimally, by 0.003, or between 0.001 and 0.2, distance units in $\langle u,v \rangle$ coordinates. From neutral 2620a, hue of the OD's WP 2610a shifts towards substantially green, yellow-green, yellow, yellow-red, red or purple hue.

FIG. 26B illustrates a plot 2600b that shows the colorimetric effects of the Third Color Constant OD under F2 illuminant. The same pastel and saturated Munsell color gamuts are used from FIG. 26A. From neutral 2620b, the WP 2610b of the OD is shifted by 0.02, or between 0.001 and 0.2, distance units in $\langle u,v \rangle$ coordinates. From neutral 2620b, hue of the OD's WP 2610b shifted towards substantially green, cyan, blue or purple hue.

FIG. 26C illustrates a plot 2600c that shows the colorimetric effects of the Third Color Constant OD under D65 illuminant. The same pastel and saturated Munsell color gamuts are used from FIGS. 26A and 26B. From neutral 2620c, the WP 2610c of the OD is shifted by 0.014, or between 0.001 and 0.2, distance units in $\langle u,v \rangle$ coordinates. From neutral 2620c, hue of the OD's WP 2610c shifted towards substantially green, cyan, blue or purple hue.

The OD's single-pass WP 2610a, i.e., single-pass cosmetic tint, is yellower (or less blue) with a larger (or less smaller) v-value compared to v-value of the naked eye's WP 2620a when illuminated by CIE F11 than that when illuminated by CIE D65 (2610c, 2620c) and/or CIE F2 (2610b, 2620b). The OD's cosmetic tint appears to be yellower or less blue when under CIE F11 than when under D65 and/or F2.

Larger value has the equivalent meaning of less smaller value, and vice versa.

WP of the naked eye under any illuminant or combination of illuminants is considered neutral due to chromatic adaptation in human color vision. WP color shifts (i.e., WP changes), including chroma-, hue- and/or lightness-shifts, are by default shifting from a chromatically-adapted neutral, unless other baseline is specified.

For FIGS. 26A, B and C, the thin solid line, thin dashed line and solid circle mark the saturated Munsell color gamut 2640a, 2640b, 2640c, pastel Munsell color gamut 2650a, 2650b, 2650c, and WP 2620a, 2620b, 2620c for a naked eye red-green CVD observer or normal observer, respectively. The thick solid line, thick dashed line and solid square mark the saturated Munsell color gamut 2630a, 2630b, 2630c, pastel Munsell color gamut 2660a, 2660b, 2660c, and WP 2610a, 2610b, 2610c for a red-green CVD observer or normal observer seeing with the OD, respectively.

Under CIE F11, the Third Color Constant OD has a $RG_{LI}$ Color Difference Percent of 18.7%, or between 10% and 90%. Both the pastel and saturated blue colors are near-imperceptibly shifted towards yellow. In terms of Hue Shift (HS) CPM, gamut hues remained the same when viewed with and without the OD so hues are preserved. Under CIE F2, the Third Color Constant OD has a $RG_{LI}$ Color Difference Percent of 56.7%, or between 10% and 90%. Both the pastel and saturated color gamuts shifted towards blue. In terms of Hue Shift (HS) CPM, hues largely remained the same when viewed with and without the OD, and the yellow-green, yellow and orange hues are maintained. The hues are largely preserved. Under CIE D65, the Third Color Constant OD has a $RG_{LI}$ Color Difference Percent of 36.3%, or between 10% and 90%. Both the pastel and saturated color gamuts shifted towards blue. In terms of Hue Shift (HS) CPM, hues largely remained the same when viewed with and without the OD, and the yellow-green, yellow and orange hues are maintained. The hues are preserved when viewing with and without OD.

The variation in the $RG_{LI}$ Color Difference Percent of the OD is within 70% when the illuminant varies between CIE F2, D65 and F11. When viewed under CIE F11 lighting and through the Third Color Constant OD, the red-green LD of red and green color sets is: (1) 0.7 or between 0.1 and 5.0 when those colors are represented by select Munsell colors, and (2) 1.1 or between 0.1 and 5.0 when those colors are represented by select Ishihara colors. When viewed under CIE D65 lighting and through the Third Color Constant OD, the red-green LD of red and green color sets is: (1) −1.0 or between −0.1 and −5.0 when those colors are represented by the selected Munsell colors, and (2) −0.7 or between −0.1 and −5.0 when those colors are represented by selected Ishihara colors. Green colors are higher in lightness than red colors for select Munsell and Ishihara colors. When viewed under CIE F2 lighting and through the Third Color Constant OD, the red-green LD of red and green color sets is: (1) 0.9 or between 0.1 and 5.0 when those colors are represented by select Munsell colors, and (2) 1.0 or between 0.1 and 5.0 when those colors are represented by select Ishihara colors. Red colors are higher in lightness than green colors for select Munsell and Ishihara colors.

The Third Color Constant OD allows protans, deutans and normal people to better discern previously confusing red, green and derivative colors by (1) increasing the $RG_{LI}$ Color Difference, and/or (2) changing the LDs between those colors. The Third Color Constant OD is considered Cosmetically Acceptable, as the tints are blues and yellows or similar hues. The Third Color Constant OD is considered color constant when viewed under daylight and at least some fluorescent light sources, such as CIE F2 (shown in FIGS. 26B, 26C). The Third Color Constant OD is considered cosmetically neutral or has a neutral WP (including near-neutral) when viewed under at least some fluorescent light sources, such as CIE F11 (shown in FIG. 26A). Under F2, F11 and D65 lighting conditions, the OD less than 0.1 in WPS from naked eye, and/or the cosmetic tints are of acceptable hue, such as yellow, blue, green or any possible combination of these hues.

Any optical device with its transmission spectrum designed and constructed according to the descriptions in this disclosure which achieves the increased performance on Lightness Difference and/or $RG_{LI}$ Color Difference Percent with CIE Standard Illuminants improves the user's performance on the Farnsworth Munsell D-15 Test and/or the Ishihara Pseudo-Isochromatic Plate Test.

Figure 27:
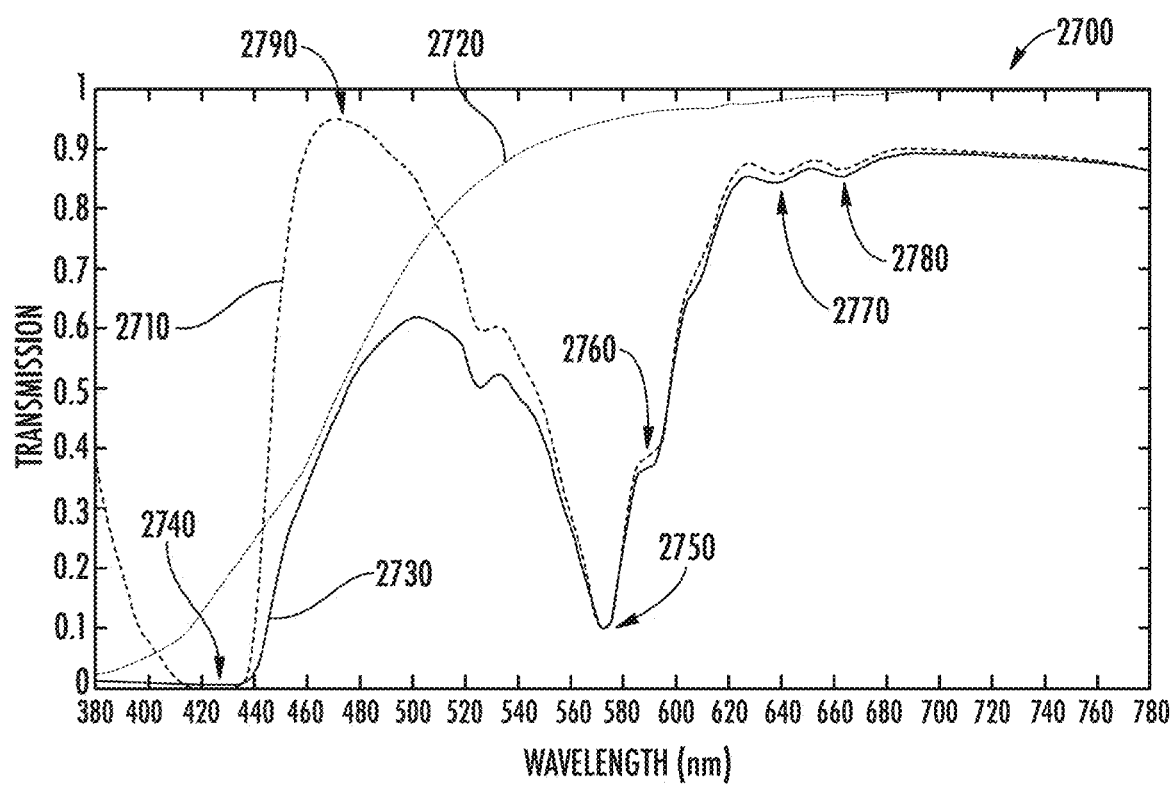
FIG. 27 illustrate the transmission spectrum for an optical device that corrects or improves yellow color vision (YCV)
Figure 28:
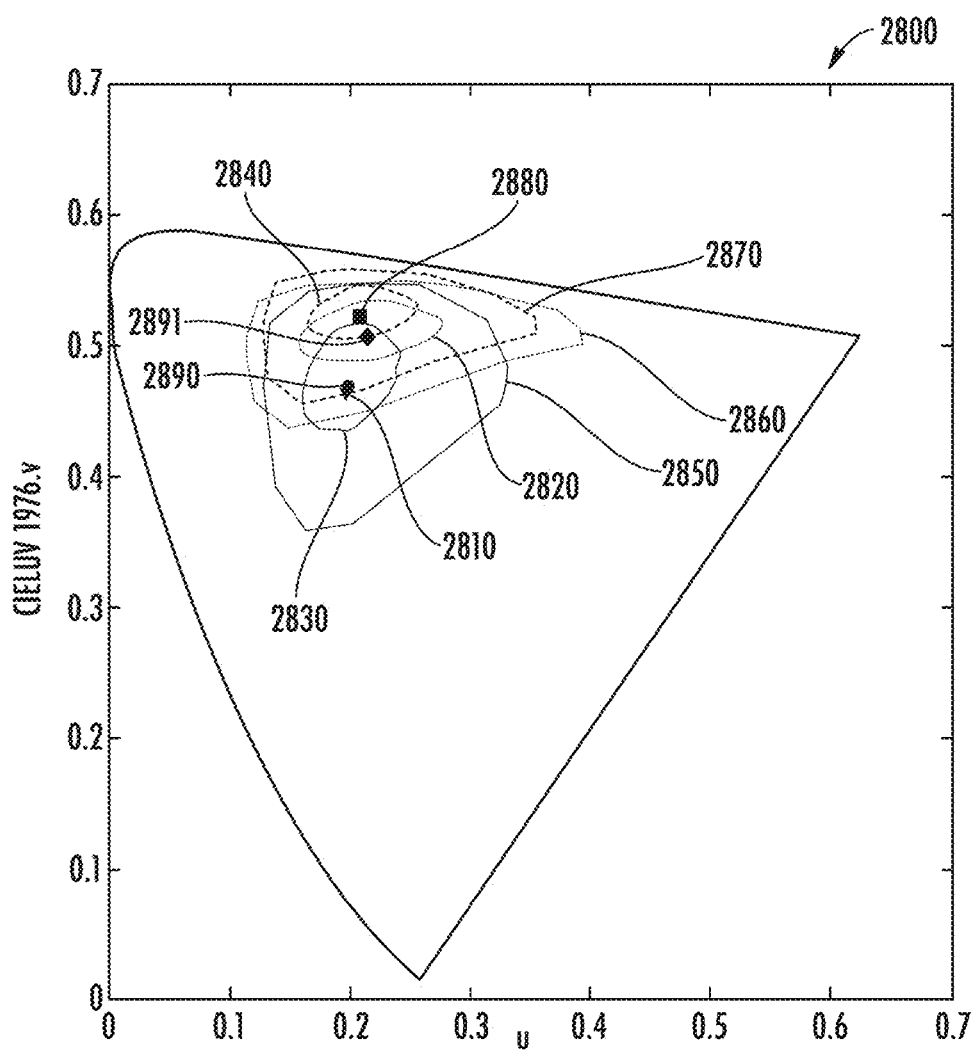
FIG. 28 shows the color gamuts and White Points for the optical device with a transmission spectrum shown in FIG. 27.

FIG. 27 illustrates a plot 2700 and FIG. 28 illustrates a plot 2800 that collectively show the transmission spectrum 2710, color gamuts and WP (2810) for an OD (and related information) that corrects or partially corrects or improves YCV (yellow color vision) to that closer to normal color vision. This OD is termed First YCV Correcting OD. In FIG. 28, smaller gamuts are Munsell pastel color gamuts 2820, 2830, 2840 and larger gamuts are Munsell saturated color gamuts 2850, 2860, 2870. Dashed-lines represent uncorrected YCV gamuts 2840, 2870, dotted-lines represent improved YCV gamuts seen with OD 2820, 2860, solid-lines represent normal color vision gamuts 2830, 2850, square marks WP 2880 of uncorrected YCV, diamond marks WP 2891 of OD-improved YCV, circle marks WP 2810 or normal color vision, triangle marks single-pass WP 2810 or cosmetic tint of the OD. The pastel 2840 and saturated 2870 color gamuts illustrate that the $BY_{LI}$ Color Difference of the uncorrected YCV is much less than that of the normal color vision 2830, 2850. As this CPM measures the ability to distinguish Munsell blue color set from Munsell yellow color set, higher values of this CPM show improvement in blue-yellow (including similar colors) color discernment when viewed through an OD having the transmission, absorption and/or reflectance spectrum described herein. A derivative CPM, $BY_{LI}$ Color Difference Percent, measures this YCV improvement as a percentage.

WP 2810 and WPS of the corrective OD of YCV are important CPMs for measuring the cosmetic tint of the device. If the WPS (White Point Shift) is too large, then the OD will have a noticeable tint, perhaps to the point of being unacceptable by the viewer. WP 2891 and WPS of the improved or corrected YCV compared to WP 2880, WPS of the unimproved YCV are also critical CPMs for measuring the improvement in YCV due to OD usage.

FIG. 27 illustrates a plot 2700 with a dashed line that shows an example transmission spectrum 2710 of the YCV-corrective OD. The dotted line shows a typical transmission spectrum 2720 of a yellowed human crystalline lens (HCL) or a yellow artificial IOL. The solid line shows the effective transmission spectrum 2730 of an optical system comprised of yellow HCLs or IOLs and the corrective OD. This optical system modifies the transmission of incident light such that the transmitted light as detected by cone cells in the eye and interpreted by the brain does not form YCV or has reduced YCV. The transmission spectrum 2710 of the OD is designed and constructed using 5 dyes whose peak absorptions are at 425 nm 2740, 575 nm 2750, 590 nm 2760, 640 nm 2770 and 665 nm 2780. Each of the colorant used in this OD has concentrations between 0.1 and 350 micro-mol per 2 mm of absorption thickness of the OD containing those colorants.

The YCV-compensating OD's transmission spectrum 2710 has at least one stop-band 2750 whose peak absorption or reflection wavelength is between 540 nm and 610 nm, and at least one pass-band 2790 whose peak transmission wavelength is between 440 nm and 520 nm. The average transmission between 380 nm and 440 nm is less than 30%.

The colorants used in the ODs generally have concentrations between 0.1 and 500 micro-mol per 2 mm of absorption thickness of the OD containing those colorants. In variations, particularly variations with coatings where one or more layers of colorants are deposited on the surface, including diffused into the surface, of the OD, concentrations of these colorants may range between 10 micro-mol and 50,000 micro-mol. The dyes may be compounded into a Polycarbonate-type resin and then extruded and molded into ODs with a thickness of 2.0 mm and diameter of 100 mm. The dyes may be coated onto a Polycarbonate-type resin via dip, spray or spin coating techniques. The thickness of the coating containing the dyes is less than 150 micron. This thickness can be an average thickness across the surface of the OD.

In CIE D65 lighting, the $BY_{LI}$ Color Difference Percent of the First YCV Correcting OD is 33.2%, or is between 10% and 90%. Lightness of the OD is 78 or 78% of naked eye lightness (OD can be used for ophthalmic applications), or is 78, or is between 50 and 100. The photopic and scotopic luminous transmittances of the OD are 53% and 69%, respectively, or are both between 10% and 90%. WP (2810) hue of the OD is blue, cyan, green or purple. WPS is 0.005, which is a nearly-imperceptible pastel-colored OD in single pass tint. WPS is between 0.001 and 0.05.

In D65 lighting, the WP hues of the uncorrected YCV (2880) and improved YCV (2891) when using the First YCV Correcting OD are both yellow. WPS of the uncorrected YCV is 0.055, and that of the improved YCV is 0.041. The WPS of YCV has a decrease of 0.014, or a decrease between 0.001 and 0.2.

In CIE F2 lighting, the $BY_{LI}$ Color Difference Percent of the First YCV Correcting OD is 49.2%, or is between 10% and 90%. Lightness of the OD is 72% of the lightness of color vision with only the naked eye, or is 72, or is between 50 and 100. The photopic and scotopic luminous transmittances of the OD are 45% and 60%, respectively, or are both between 10% and 90%. WP hue of the OD is red, yellow-red, yellow, purple or blue. WPS is 0.004, which is a nearly-imperceptible pastel-colored OD in single pass tint. Such WPS is between 0.001 and 0.05.

In F2 lighting, the WP hue of both the uncorrected YCV and improved YCV when using the First YCV Correcting OD is yellow. WPS of the uncorrected YCV is 0.038, and that of the improved YCV is 0.031. The WPS of YCV seeing through OD has a decrease of 0.007 from uncorrected YCV, or a decrease between 0.001 and 0.2.

Figure 29:
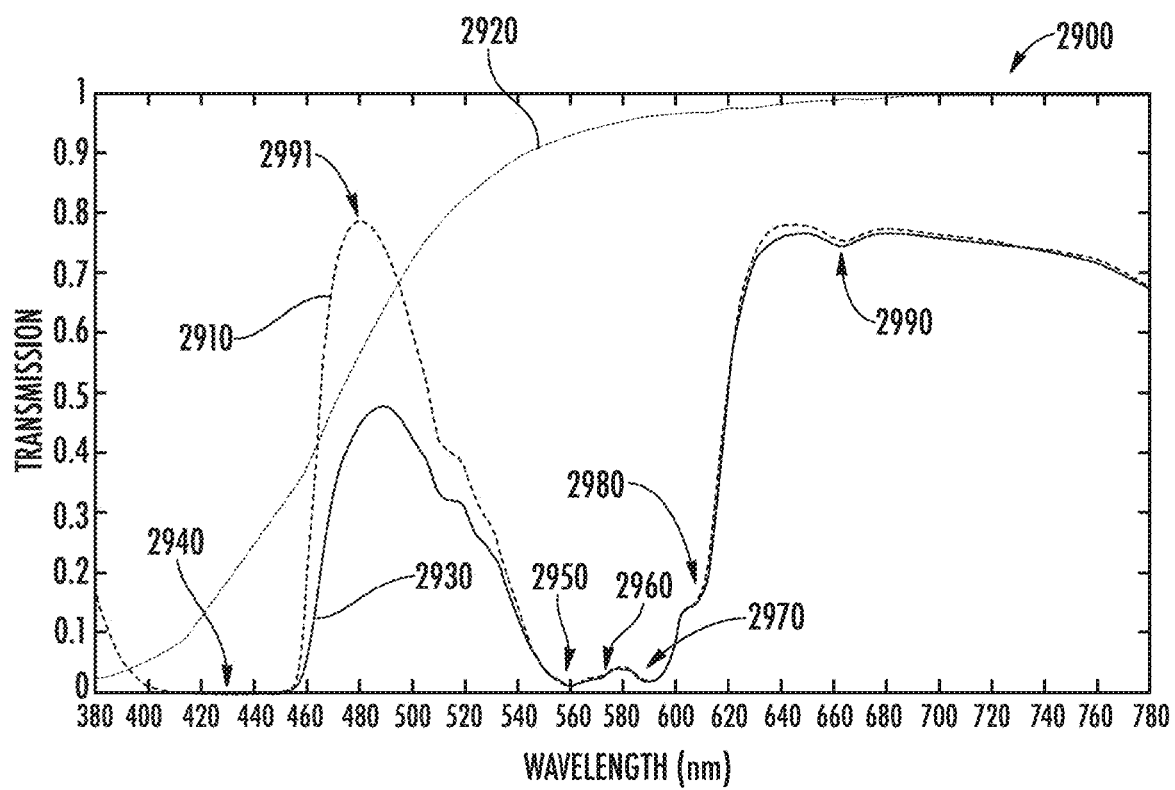
FIG. 29 illustrate the transmission spectrum for another optical device that corrects or improves yellow color vision (YCV)
Figure 30:
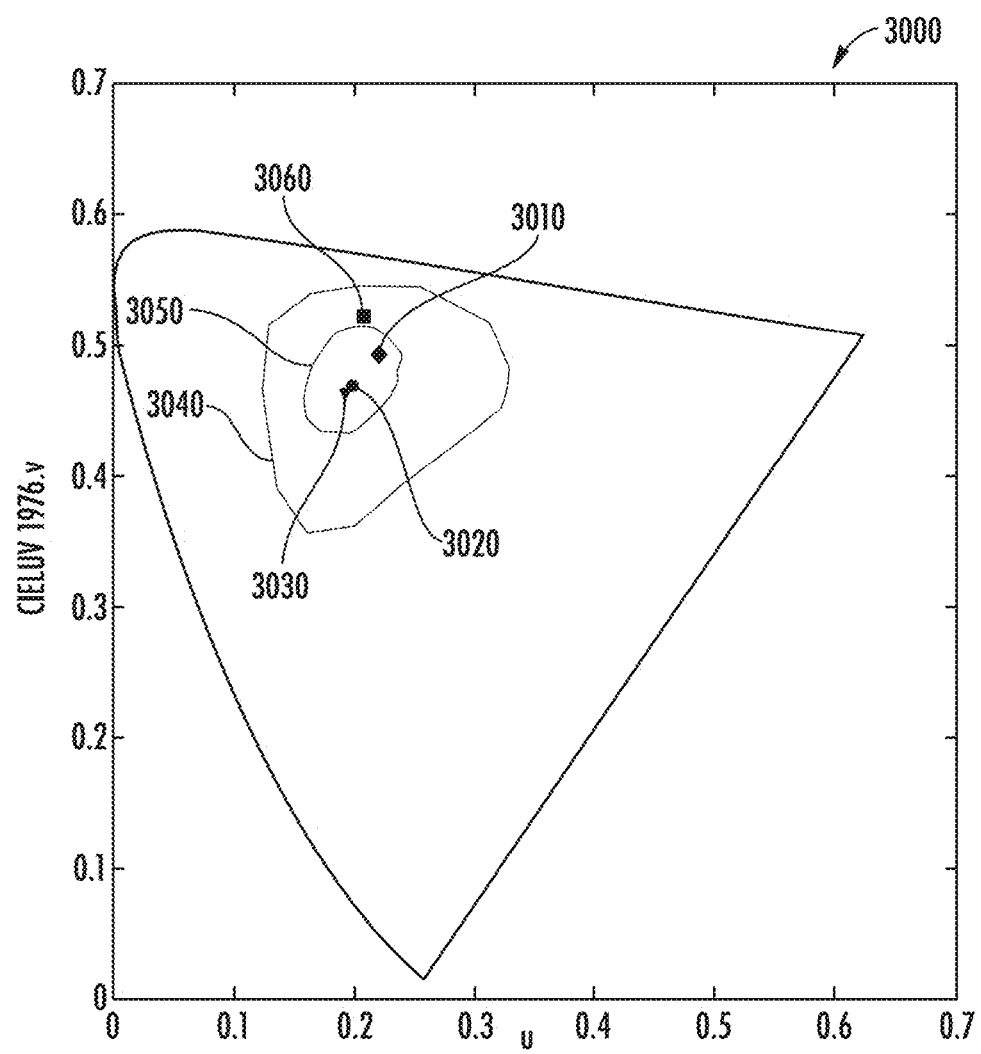
FIG. 30 shows the color gamut of a normal observer with naked eye and White Points for the optical device with a transmission spectrum shown in FIG. 29.

FIG. 29 illustrates a plot 2900 and FIG. 30 illustrates a plot 3000 that show the transmission spectrum 2910 and WP 3030 for an OD (and related information) that corrects or improves YCV to that closer to normal color vision. This OD is termed Second YCV Correcting OD. In FIG. 30, the smaller gamut is Munsell pastel color gamut 3050 and the larger gamut is Munsell saturated color gamut 3040. Solid-lines represent normal color vision 3040, 3050. The square marks the WP 3060 of uncorrected YCV, the diamond marks the WP 3010 of improved YCV seeing through OD, the circle marks WP 3020 of normal color vision, and the triangle marks the single-pass WP 3030 of the OD.

FIG. 29 illustrates a plot 2900 that shows a dashed line of an example of a transmission spectrum 2910 of the YCV-corrective OD. The dotted line shows a typical transmission spectrum 2920 of a yellowed HCL or a yellow artificial IOL. The solid line shows the effective transmission spectrum 2930 of an optical system comprised of a yellow HCL or IOL and the corrective OD. This optical system modifies the transmission of incident light. The transmission spectrum 2910 of the OD is designed and constructed using 6 dyes whose peak absorptions are centered at approximately 430 nm 2940, 560 nm 2950, 575 nm 2960, 590 nm 2970, 610 nm 2980 and 665 nm 2990.

The YCV-compensating OD's transmission spectrum 2910 is designed to have at least one stop-band, two stop-bands are shown, stop-band 2950, stop-band 2970, with peak absorption or reflection wavelength between 540 nm and 620 nm, and at least one pass-band 2991 with peak transmission wavelength between 440 nm and 520 nm. The average transmission between 380 nm and 440 nm is less than 30%. FWHM of the described stop-band is between 10 nm and 150 nm. FWHM of the described pass-band is approximately 120 nm.

In CIE D65 lighting, the $BY_{LI}$ Color Difference Percent of the Second YCV Correcting OD is 90.8%, or is between 10% and 110%. Lightness of the OD is 54 or 54% of naked eye lightness, or is between 30 and 90. The photopic and scotopic luminous transmittances of the OD are 23% and 38% respectively, or are both between 10% and 90%. WP (single-pass, 3030) hue of the OD is blue, cyan, green or purple. WPS is 0.006, which is a nearly-imperceptible pastel-colored OD in single pass tint. WPS is between 0.001 and 0.02.

In D65 lighting, the WP hues of the uncorrected YCV (3060) and improved YCV (3010) when using the Second YCV Correcting OD are both yellow, orange (i.e. yellow-red), yellow-green or green. The WPS of the uncorrected YCV is 0.055, and that of the improved YCV is 0.034. The WPS of YCV seeing through OD has a decrease of 0.021 from uncorrected YCV, or a decrease between 0.001 and 0.2.

The construction of ODs to improve or correct YCV follows the same permutations of techniques as those for the red-green CVD, which are all under the category of (1) infusing colorants, such as dyes and pigments, into the substrate of the OD or coating onto the one or more surfaces of the OD, including surfaces of one or more layers of the OD, (2) depositing thin films, such as interference and rugate films, onto one or more surfaces of the OD, including surfaces of one or more layers of the OD, and (3) any combination of the aforementioned techniques of applying one or more dyes and one or more thin films. The objective of the use of colorants and/or thin films in construction is to produce a transmission spectrum from the OD or an effective spectrum from a collected system of ODs, that produces the desired transmission spectra, values of the CPMs, comprised of $BY_{LI}$ Color Difference, $BY_{LI}$ Color Difference Percent, Lightness, Cosmetic Tint (WP, WPS, WP hue) of the OD and/or of the viewer with YCV seeing through OD, under different viewing conditions, including different illuminations.

Any optical device with its transmission spectrum designed and constructed according to the descriptions in this disclosure which increases $BY_{LI}$ Color Difference Percent and/or decreases WPS of YCV improves the user's YCV. One test for YCV is the Munsell 100 Hue Test.

For any OD, additional surface coatings and processing steps during manufacturing and post manufacturing can impart additional color to the OD or alter the effective transmission spectrum of the OD via additional inhibitions of the visible spectrum and/or lessen the antecedent spectral inhibitions of colorants and/or thin films. For example, in sunglasses the spectral alteration can include the transmission spectrum of a reflective coating, i.e. "mirror" or "flash" coating, often used for cosmetic reflection from the OD or tint on the OD. For example, in ophthalmic lenses, such spectral alternations can be due to anti-reflective (AR) coatings or the native color of the OD's resin. Once an OD's effective target transmission spectrum is determined, the aforementioned spectral alterations are then discounted from the OD's effective target spectrum by dividing such target spectrum by the spectral alterations at each 1 nm wavelength from 380 nm to 780 nm. The resultant transmission spectrum is then constructed by one or more colorants and/or one or more thin films, onto or into one or more substrates for the OD.

Figure 31:
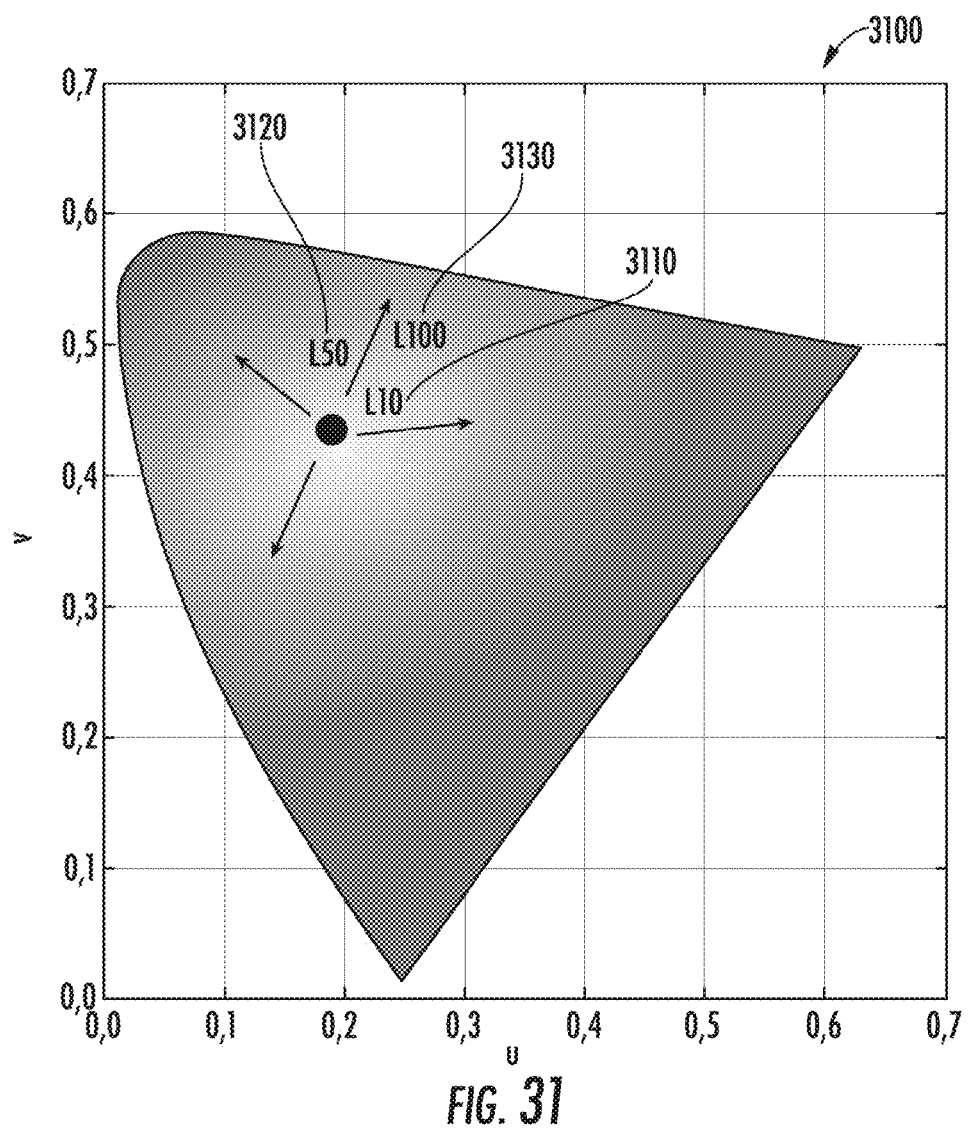
FIG. 31 illustrates the Hunt Effect where increasing the lightness or brightness of colors increases the colors' chroma or colorfulness, and vice versa.

FIG. 31 includes a plot 3100 that illustrates the Hunt Effect where increasing the lightness or brightness of colors increases the colors' chroma or colorfulness 3110, 3120, 3130, and vice versa. The Hunt Effect is a color appearance phenomenon where colorfulness or chromatic contrast of a color increases as its luminance or lightness increases or color contrast decreases as its luminance or lightness decreases. In many optical applications, such as electronic displays, the lightness or brightness of the display is high or increased from a lower level, which increases the chroma (saturation) of colors. Such chroma increases aid in the discernment of colors. However, increasing the lightness or brightness of the color stimulus source can create discomfort to the eye, eye fatigue and potentially other medical and/or vision issues.

To overcome issues of lightness or brightness, optical devices increase $RG_{LI}$ Color Difference Percent, $RG_{LI}$ Color Difference, $BY_{LI}$ Color Difference Percent, and/or $BY_{LI}$ Color Difference of red, green, blue, yellow and derivative color sets without the need to increase the lightness or brightness of the color stimulus source. Moreover, when using such optical devices, the lightness or brightness of the color stimulus source can remain the same or be decreased to a level such that any accompanying decrease in color chroma due to Hunt's Effect is neutralized or reduced by said optical devices. Specifically, an optical device with the capability to increase $RG_{LI}$ Color Difference Percent and/or $BY_{LI}$ Color Difference Percent by 1% can neutralize a decrease in the chroma of those colors from a 1% decrease in the lightness of those color stimuli.

To the viewer, a decrease in the lightness of the color stimulus is equivalent to the same amount of decrease in the lightness of the optical device, which is measured from a baseline with an illuminant viewed with the naked eye. Unassisted or naked eye vision is colorimetrically and photometrically equivalent to viewing through an optical device with 100% transmittance between 380 nm and 780 nm.

For example, the Second Rose-Tinted OD has a $RG_{LI}$ Color Difference Percent of 77.4%. This OD has capability to neutralize the decrease in the chroma of red and green colors (and derivative colors) from an up to 77.4% decrease in the lightness of those colors. Such a decrease in the lightness of those colors can be due to (1) up to a 77.4% decrease in the lightness of the color stimuli source, (2) up to a 77.4% decrease in the lightness of the Second Rose-Tinted OD, or (3) a combination of these two cases. Under CIE D65 illumination, whose source lightness is 96, an up to 77.4% decrease in the lightness of the optical device makes the optical device's lightness be 22 or more under D65, in order to neutralize the Hunt's Effect. Similarly, under CIE F2 illumination, whose self-source lightness is 81, an up to 77.4% decrease in the lightness of the optical device makes the optical device's lightness be 18 or more under F2, in order to neutralize the Hunt's Effect. Similarly, under CIE F11 illumination, whose self-source lightness is 57, an up to 77.4% decrease in the lightness of the optical device makes the optical device's lightness be 13 or more under F11, in order to neutralize the Hunt's Effect.

In another example, the brightness or lightness of the color stimuli are increased, which initiates the Hunt Effect. However, the increase is not as large due to the use of optical devices in this disclosure, where the optical devices increase color chroma and discernment without increasing the stimuli's lightness or brightness.

An optical device may include lenses, sunglass and ophthalmic, glass, contact lens, optical filters, electronic displays, windshields, intraocular lens (IOLs), human crystalline lens (HCL), windows, and plastics. The optical device may have any optical power, curvature and/or other suitable characteristics, comprised of geometric shapes, refractive indices and thicknesses.

Figure 32A:
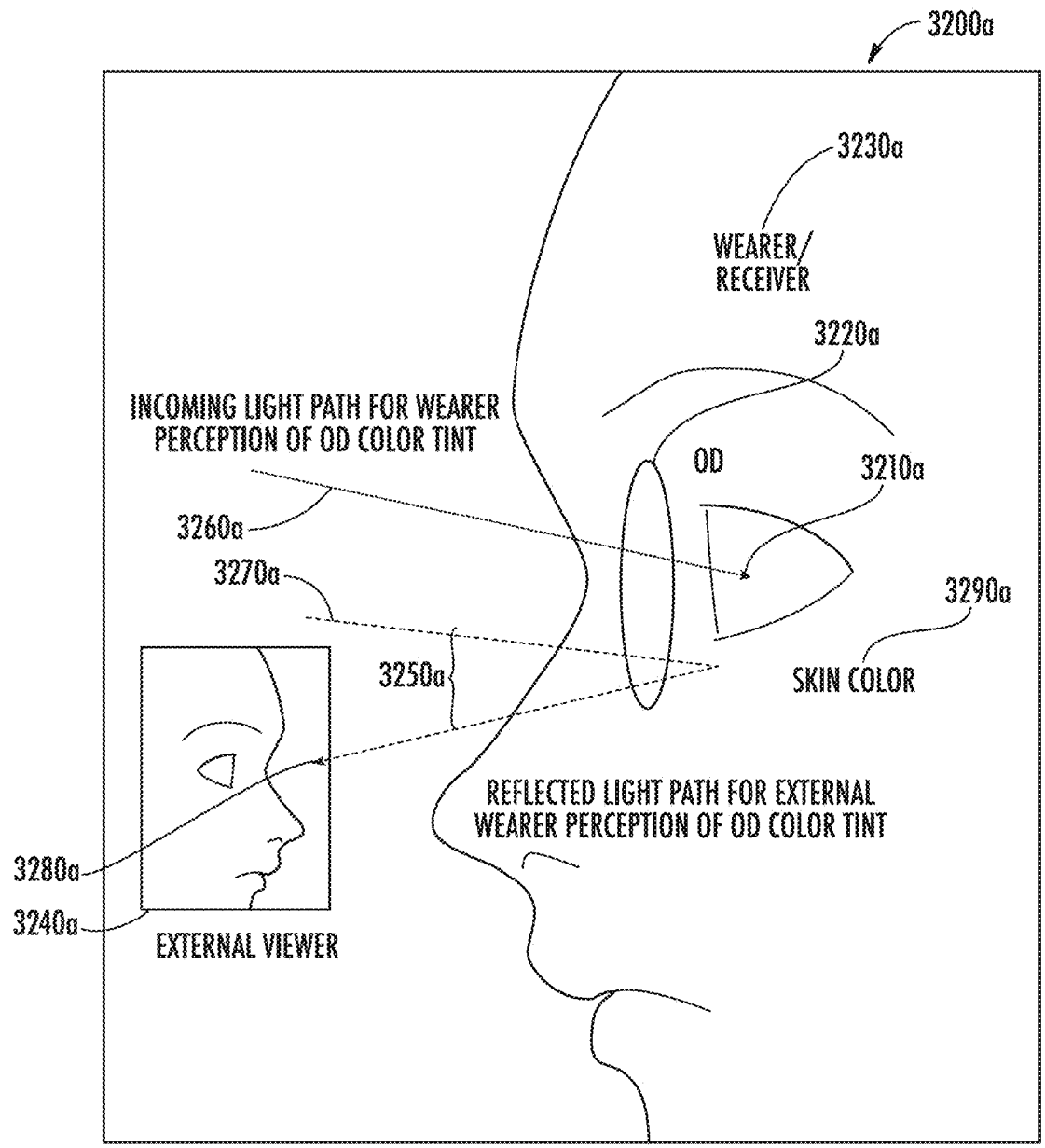
FIG. 32A is an illustration of the interactions between incoming and reflected light rays in an optical device as viewed from the device wearer and the external viewer.
Figure 32B:
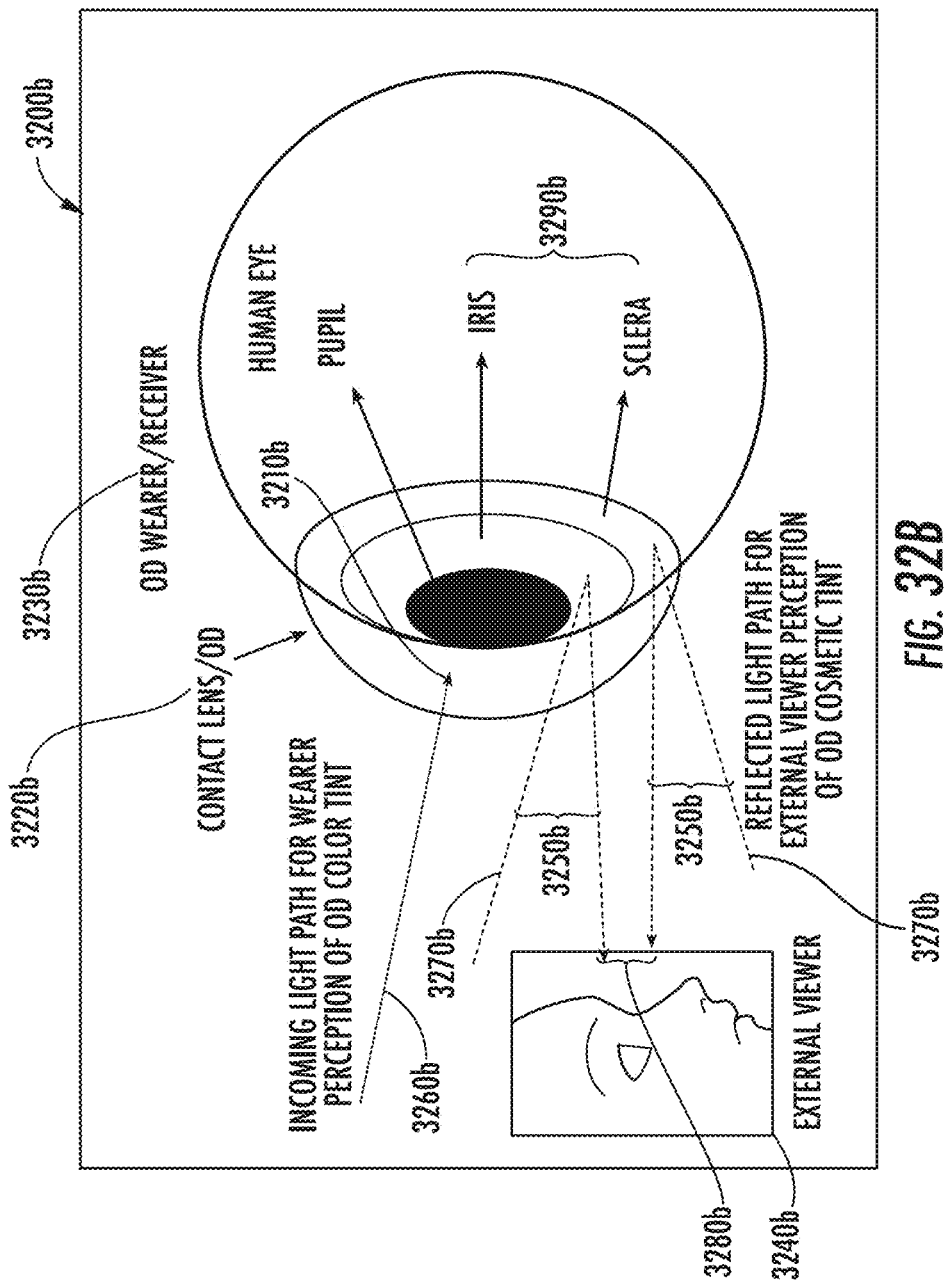
FIG. 32B is an illustration of the interactions between incoming and reflected light rays with a contact lens as an optical device as viewed from by human eye and an external viewer.

The cosmetic color tint of the color enhancing or color correcting optical device perceived by the wearer or receiver can be different than that perceived by an external viewer. FIG. 32A illustrates a depiction 3200a and FIG. 32B illustrates a depiction 3200b showing the cosmetic tint of the OD as perceived by the OD wearer or receiver is due to incoming or external light source 3260a, 3260b being filtered once 3210a, 3210b by the OD. The OD 3220a, 3220b is acting as a single-pass filter 3210a, 3210b to the wearer 3230a, 3230b of the OD. The incoming light may also be minimally or partially reflected by the OD before reaching the wearer or receiver.

The cosmetic tint of the OD as perceived by an external viewer 3240a, 3240b is due to a reflective light path which is filtered twice 3250a, 3250b by the OD 3220a, 3220b. More generally, reflective light path describes the process of external light being filtered once 3270a, 3270b by the OD as it travels through the OD, contacts a backstop surface 3290a, 3290b, e.g., wearer's skin in the case of an externally-worn OD 3220a, iris or sclera of the wearer's eyes in the case of a contact lens 3220b, is reflected or partially reflected back through the OD and being filtered a second time 3280a, 3280b by the OD, until the light rays reach the external viewer 3240a, 3240b. The OD is acting as a double-pass filter (3250a, 3250b) to an external viewer.

In controlling the tint viewed by the external viewer, additional complexities are involved. These include: (1) light that contacts the OD can be minimally, partially or completely reflected by the OD, causing a "mirror" or glare effect, as viewed by the external viewer, (2) light absorptive properties of the backstop surface can contribute to the perceived cosmetic tint of the OD by the external viewer, (3) other external light may pass through the OD and reach the external viewer, such as light from behind the OD wearer, and (4) the backstop surface can selectively absorb certain wavelengths of the visible light spectrum and partially reflects other wavelengths. Furthermore, this reflected light is once more filtered by the OD, which may be a color enhancer, before reaching the external viewer. This double filtering process by the OD, along with the described complexities, may be included in designing the overall double-pass cosmetic tint of the OD as perceived by an external viewer.

Single-pass and double-pass light filtering impart cosmetic tints on one OD 3220a, 3220b as perceived by OD wearer and external viewer. These two types of tints generally have different colors, and sometimes can be the same color or substantially the same colors. Single-pass and/or double-pass cosmetic tints of the OD include green, amber, neutral gray, blue or any other color. Green tints include G-15 and amber or brown tints include B-15. Cosmetic tints also include handling tints for certain lenses, such as contact lenses.

The 1976 CIE LAB color appearance model (CAM) is used to evaluate the white points (WPs) or cosmetic tints of the OD as perceived by the OD wearer (including receiver or internal viewer) or external viewer. The cosmetic tint of the OD as perceived by the wearer is evaluated using the transmission spectrum (T) of the OD as a single-pass filter (filtering once) of light from illuminant, before reaching the wearer. The cosmetic tint of the OD as perceived by the external viewer is evaluated using the square of the transmission spectrum of the OD as a double-pass filter (filtering twice) of light from illuminant, before reaching the external viewer. Such squaring of the transmission spectrum of the OD is $T^2$ per wavelength for double-pass effects. Equation 20 may be used to evaluate these two cosmetic tints in tristimulus values, which are used in CIE Luv, CIE Lab and/or many other color systems.

$$\text{Tristimulus Values}_{OD,\text{Single-Pass Tint}} = \begin{cases} Y_{SP\,Tint} = \sum_{\lambda=380\,nm}^{\lambda=780\,nm} [\text{Illuminant}(\lambda)T(\lambda)\bar{y}(\lambda)] \\ X_{SP\,Tint} = \sum_{\lambda=380\,nm}^{\lambda=780\,nm} [\text{Illuminant}(\lambda)T(\lambda)\bar{x}(\lambda)] \\ Z_{SP\,Tint} = \sum_{\lambda=380\,nm}^{\lambda=780\,nm} [\text{Illuminant}(\lambda)T(\lambda)\bar{z}(\lambda)] \end{cases}$$

$$\text{Tristimulus Values}_{OD,\text{Double-Pass Tint}} = \begin{cases} Y_{DP\,Tint} = \sum_{\lambda=380\,nm}^{\lambda=780\,nm} [\text{Illuminant}(\lambda)T^2(\lambda)\bar{y}(\lambda)] \\ X_{DP\,Tint} = \sum_{\lambda=380\,nm}^{\lambda=780\,nm} [\text{Illuminant}(\lambda)T^2(\lambda)\bar{x}(\lambda)] \\ Z_{DP\,Tint} = \sum_{\lambda=380\,nm}^{\lambda=780\,nm} [\text{Illuminant}(\lambda)T^2(\lambda)\bar{z}(\lambda)] \end{cases}$$

Equation 20

An illuminant or light source is simulated with CIE daylight D65, broadband fluorescent light F2 or tri-band fluorescent F11. The illuminant may be a single source or a blended source from multiple differing sources, such as in daylight and fluorescent light illuminated office space.

The OD's single-pass and/or double-pass cosmetic tints may be constrained to be within a certain range for WPs for a set of varied illuminants, such as set {D65, F2, F11}, simulating different lighting environments. Such a constraint may be for a single illuminant, multiple illuminants individually, multiple illuminants in a blended manner, and/or multiple illuminants simultaneously as is in the case of color constancy evaluations of an OD's single-pass and/or double-pass cosmetic tints in multiple lighting environments. The set of CIE illuminants, {D65, F2, F11}, is an example of the many illuminants used in this invention, which included daylights, overcast, fluorescent lights, incandescent lights and LED lights.

Figure 33:
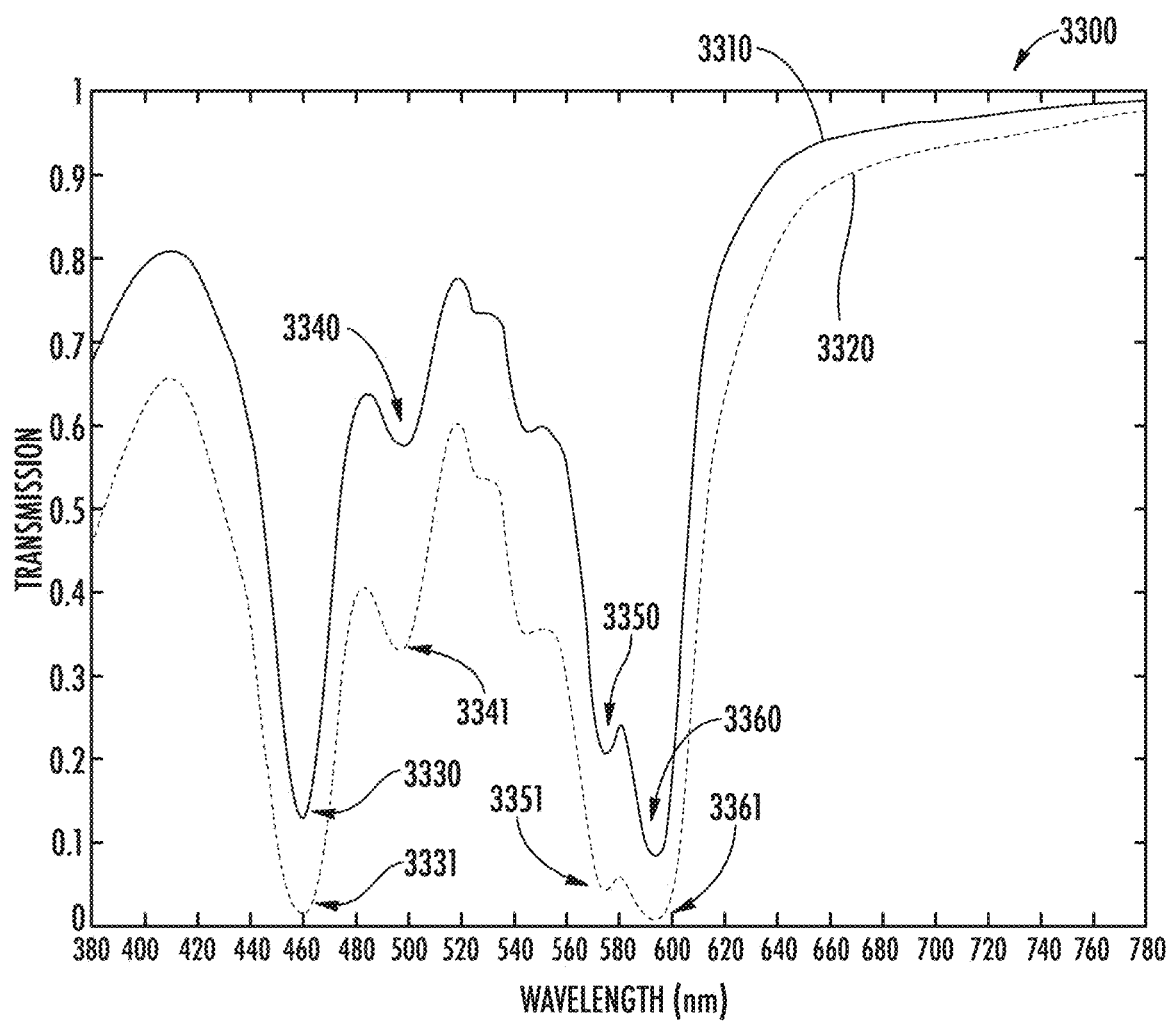
FIG. 33 illustrates the transmission spectrum of an optical device.

FIG. 33 illustrates a plot 3300 that shows the transmission spectrum of an optical device to illustrate the disclosures on single-pass and double-pass cosmetic tints or denoted "cosmetic tints" collectively. The solid line shows the single-pass filter transmission spectrum 3310 (T) of the optical device, and the dashed line shows the double-pass filter transmission spectrum 3320 ($T^2$) of the optical device. This OD may be designed and manufactured to enhance red-green color discernment for those with Color Vision Deficiency (CVD) and those with normal color vision. This OD was constructed using four narrow spectrum absorptive dyes, with peak absorption at about 460 nm 3330, 3331, 500 nm 3340, 3341, 575 nm 3350, 3351 and 595 nm 3360, 3361. For T and/or $T^2$, there are at least two stop-bands 3330, 3331, 3340, 3341 with peak transmittance wavelengths between 420 nm and 530 nm, and at least one stop-band 3350, 3360, 3361 with a peak transmittance wavelength between 550 nm and 610 nm. There is at least a difference of 5 nm between the peak transmittance wavelengths of any two stop-bands. For example for each spectrum, plot 3300 illustrates a stop-band substantially centered at 460 nm 3330, 3331, 500 nm 3340, 3341, 575 nm 3350, 3351 and 595 nm 3360, 3361, with at least an approximately 20 nm difference between any two peak transmittance wavelengths.

The substrate of this optical device is polycarbonate, and may be formed from any plastic, glass or other optically suitable material. The four dyes are compounded, extruded and molded into a lens blank of approximately 75 mm in diameter and 2 mm in thickness. The lens blank may be edged, cut and/or surface coated to produce a lens for eyewear. The concentrations of these dyes may range between 10 micro-mol and 200 micro-mol. The substrate of this optical device may be acrylic or hydrogel or silicone hydrogel for contact lenses or any other optically suitable material. In general, dyes are infused into or onto the contact lens via physical mixing and/or chemical bonding, such as using polymerizable or co-polymerizable dyes. The concentrations of these dyes may range between 10 micro-mol and 1000 micro-mol. The OD may also be an optically and medically suitable material, which forms a temporary or permanent film over the cornea, such as an eye drop. Dyes are infused into or onto the corneal film via physical mixing and/or chemical bonding. The concentrations of these dyes may range between 10 micro-mol and 5000 micro-mol.

The transmission spectrum (T) of the OD may be constructed using interference thin film coatings to filter the desired wavelengths via reflecting select incident light wavelengths. The resultant transmission spectrum may be configured to closely match a target spectrum, such as that in FIG. 33. Such interference thin film coatings may be constructed using a combination of high and low refractive index materials, such as $TiO_2$ and $SiO_2$.

The transmission spectrum (T) of the OD may also be constructed using a combination of absorptive colorants (including dyes) and thin film coatings, as their effects on filtering select transmission wavelengths are additive. The transmission spectrum of the OD is constructed using: (1) at least one colorant, and/or (2) at least one thin film coating.

Figure 34C:
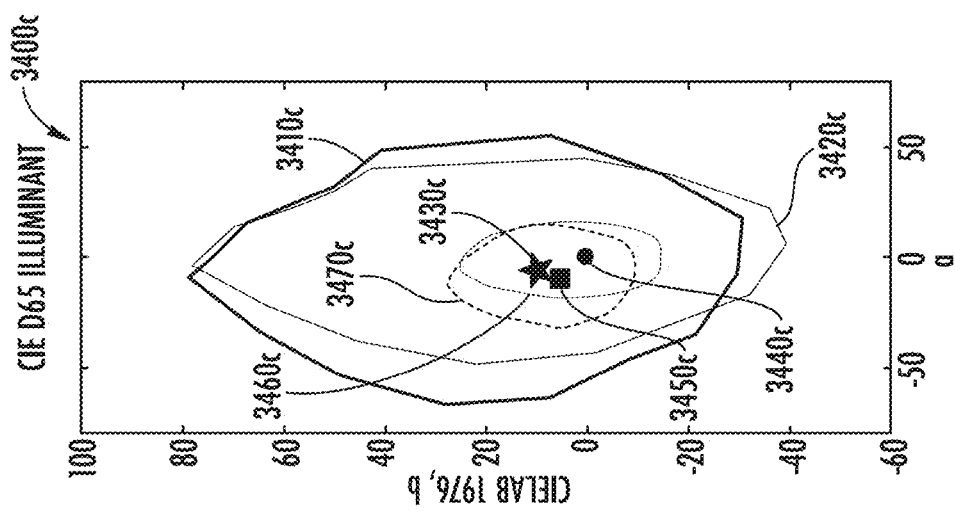
FIG. 34A, FIG. 34B, and FIG. 34C collectively each of the figures illustrates a plot showing the colorimetric effects of the OD with the transmission spectrum of FIG. 33, with D65, F2 and F11 as illuminants, in CIE LAB color space.
Figure 34B:
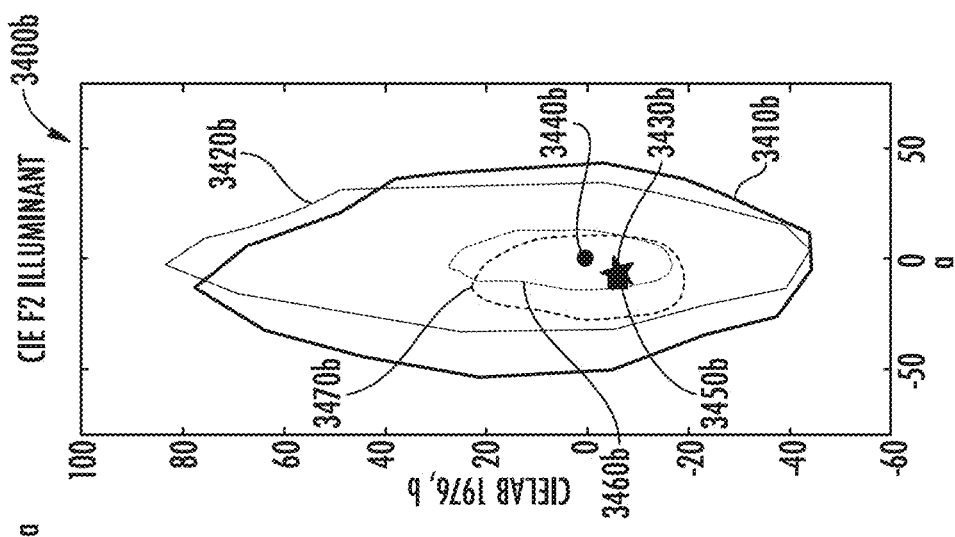
Figure 34A:
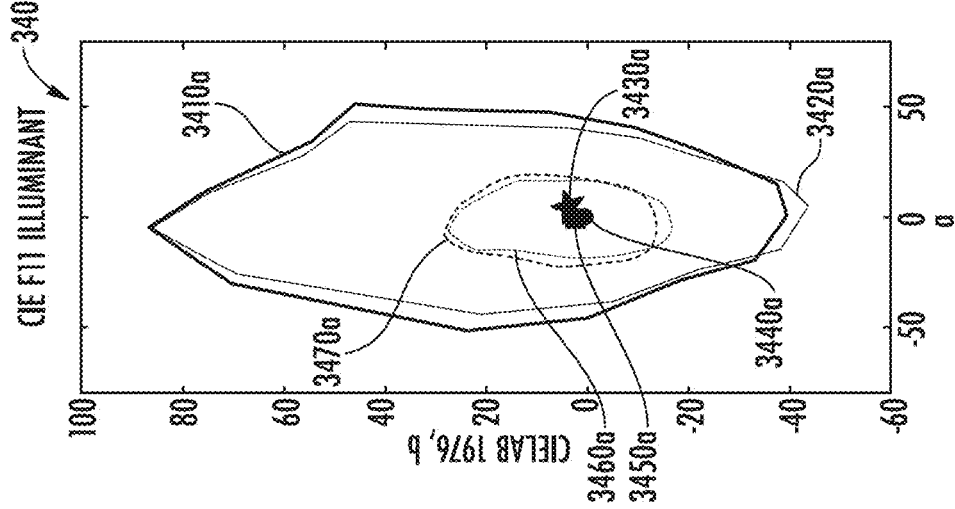

FIG. 34 includes FIG. 34A, FIG. 34B, and FIG. 34C. Collectively each of the figures illustrates a plot 3400a, 3400b, 3400c showing the colorimetric effects of the OD with the transmission spectrum of FIG. 33, with D65, F2 and F11 as illuminants, in CIE LAB color space. The thin solid line, thin dashed line and solid circle represent the saturated Munsell color gamut 3420a, 3420b, 3420c, pastel Munsell color gamut 3460a, 3460b, 3460c, and WP 3440a, 3440b, 3440c for a naked-eye red-green color vision deficient (CVD) observer or normal vision observer. The thick solid line and thick dashed line represent the saturated Munsell color gamut 3410a, 3410b, 3410c and pastel Munsell color gamut 3470a, 3470b, 3470c for a red-green CVD observer or normal vision observer seeing with the OD, respectively. The solid squares represent the WPs 3450a, 3450b, 3450c or cosmetic tints of the OD as a single-pass filter (T), i.e., perceived by the OD wearer or receiver. The solid stars represent the WPs 3430a, 3430b, 3430c or cosmetic tints of the OD as a double-pass filter ($T^2$), i.e., perceived by the external viewer. The OD's cosmetic tints as perceived by the wearer have a CIE LAB value, in <L,a,b> format, of <78±20,−10±20,6±20> under D65 3450c, <73±20,−10±20,−6±20> under F2 3450b, and <79±20,−1±20,2±20> under F11 3450a. The photopic luminous transmittance values are 53%, 46% and 55%, under D65, F2 and F11 illuminants, respectively. The scotopic luminous transmittance values are 57%, 56% and 57%, under D65, F2 and F11 illuminants, respectively. Photopic and scotopic luminous transmittance values are between 5% and 95% under D65, F2 and F11. The lightness-independent WPSes of the cosmetic tints are calculated to be 12±20 with yellow-green hue 3450c, 12±20 with cyan hue 3450b and 3±20 with yellow, near-neutral hue 3450a, under D65, F2 and F11 illuminants.

The OD's double-pass cosmetic tints as perceived by the external viewer has a CIE LAB value, in <L,a,b> format, of <65±20,−6±20,10±20> under D65 3430c, <58±20,−7±20,−6±20> under F2 3430b, and <65±20,5±20,4±20> under F11 3430a. The lightness-independent WPSes of the cosmetic tints are 13±20 with yellow-green hue 3430c, 12±20 with cyan hue 3430b and 6±20 with brown, near neutral hue 3430a, under D65, F2 and F11 illuminants. This OD's cosmetic tints as perceived by the wearer and by the external viewer are of the same or similar hues under illuminants of D65, F2 or F11.

The notation of "±" is used to denote a range and simple average. Specifically, A±B denotes a range from A−B to A+B, with the simple average being A. For example, <78±20,−10±20,6±20> denotes a Lab range from <58,−30,−14> to <98,10,26>, with simple average being <78,−10,6>. It is understood that whenever the range notation of "±" produces an infeasible range with one or more infeasible end-values, then any infeasible end-value is automatically replaced by the closest feasible end-value to result in the largest feasible range. For example, if L=78±30, then lightness is between 48 and 108. As maximum feasible lightness is 100, then L=78±30 denotes a lightness range of 48 to 100. Minimum WPS value is 0.

The lightness-independent color difference is calculated by:

$$\text{Lightness-Independent Color Difference} = \begin{cases} \sqrt{(a_i - a_j)^2 + (b_i - b_j)^2}, \text{ if } Lab \\ \sqrt{(u_i - u_j)^2 + (v_i - v_j)^2}, \text{ if } Luv \end{cases} \quad \text{Equation 21}$$

where i represent one corresponding color and j represents another corresponding color. i can also represent the average of a corresponding color set and j can also represent the average of another corresponding color set.

j represents the naked eye's WP when lightness-independent color difference is applied to WPS, called lightness-independent WPS, where $a_j=b_j=0$, and $\langle u_j, v_j \rangle$ corresponds to uv-coordinate values of naked eye's WP under specified illuminant. For the latter, see the equivalent Equation 13.

Using Equation 21, for some OD embodiments, lightness-independent color differences between WP of the wearer's OD tint perception (single-pass) and that of the external viewer's OD tint perception (double-pass) are within 60 in CIE LAB color space, under one or more of CIE D65, F2 and/or F11 illuminants. The OD's cosmetic tints, perceived by the wearer and/or the external viewer, are not red, orange, pink, purple, brown or substantially those colors under one or more of CIE D65, F2 and/or F11 illuminants. When unassisted by OD, the backstop surface color is white, grey, neutral, yellow, blue, green, brown, non-red, non-pink, non-purple or substantially these colors, such as the iris and/or sclera of a human eye.

The OD's cosmetic tints, perceived by the wearer and/or the external viewer, have lightness-independent color difference for WPS of less than 40 in CIE LAB color space, under any combination of two or three illuminants in the set of {D65, F2 and F11}. These cosmetic tints are white, grey, black, neutral or pastel colors of yellow, yellow-green, green, cyan, blue, purple, red, orange, pink or brown. The OD's cosmetic tints, perceived by the wearer and/or the external viewer, have a-values between −30 and +30, and/or b-values between −30 and +30, in CIE LAB color space, under any combination of two or three illuminants in the set of {D65, F2 and F11}. The "L" or lightness values of the OD under a single-pass filter process or as perceived by the wearer in CIE LAB color space is above 60 under D65 or F11 illuminant, or is above 50 under F2 illuminant. The single-pass photopic luminous transmittance of the OD is above 40% under D65 or F11 illuminant, or is above 30% under F2 illuminant.

The OD's single-pass cosmetic tints perceived by the wearer are greener, i.e. more towards the green hues, as demonstrated by the lower a-values, i.e. less positive a-values by at least 1 unit in the CIE LAB color space, as compared to the hues, i.e. a-values of the double-pass cosmetic tints, perceived by the external viewer. The OD's cosmetic tints, as perceived by the wearer and/or the external viewer, are bluer, i.e. are lower (i.e. less positive) in b-values by at least 1 unit in CIE LAB color space when under F2 illuminant than under D65 and/or F11 illuminants.

The OD's cosmetic tints, perceived by the wearer and/or the external viewer, are redder or are more positive, i.e. higher, in a-values by at least 1 unit in CIE LAB color space when under F11 illuminant than under D65 and/or F2 illuminants.

$$\text{LAB } RG_{LI}\text{Color Difference} = \sqrt{(a_{red} - a_{green})^2 + (b_{red} - b_{green})^2} \quad \text{Equation 22.}$$

Equation 22 provides a Colorimetric Performance Metric (CPM) that measures the lightness-independent red-green color difference in CIE LAB color space. The red and green colors selected for evaluation are red Munsell color set and green Munsell color set. For one or more sets of selected red colors, the average of the red color set(s)' may be used to enumerate $\langle a_{red}, b_{red} \rangle$. For one or more sets of selected green colors, the average of the green color set(s)' may be used to enumerate $\langle a_{green}, b_{green} \rangle$.

The CPM that compares the $RG_{LI}$Color Difference Percent between seeing the contrast of red and green color sets as described, through a designed and constructed optical device versus seeing such color differences with the naked eye is provided in Equation 23.

$$\text{LAB } RG_{LI} \text{Color Difference Percent} = \quad \text{Equation 23}$$

$$100\left(\frac{\text{LAB } RG_{LI}\text{Color Difference With Optical Device}}{\text{LAB } RG_{LI}\text{Color Difference With Naked Eye}} - 1\right) =$$

$$100\left(\frac{\sqrt{(a^*_{red} - a^*_{green})^2 + (b^*_{red} - b^*_{green})^2}}{\sqrt{(a^\eta_{red} - a^\eta_{green})^2 + (b^\eta_{red} - b^\eta_{green})^2}} - 1\right),$$

where $\langle a^*, b^* \rangle$ and $\langle a^\eta, a^\eta \rangle$ denote CIE LAB color space coordinates of colors seen with an optical device and with the naked eye, respectively. Using select red and green Munsell color sets, the OD prescribed by FIGS. 33 and 34 has a LAB $RG_{LI}$ Color Difference Percent increase of 31%, 42% and 18% under D65, F2 and F11 illuminants, respectively. The increases may be between 5% and 110% in LAB color space. The optical device has a LAB $RG_{LI}$ Color Difference Percent increase of larger than 5%, 10% and 5%, under D65, F2 and F11 illuminants, respectively. These enhancement percentages are demonstrated under each illuminant separately or multiple illuminants collectively.

As illustrated in FIG. 34, the OD enhanced at least one Munsell color with a green hue component, i.e. a negative a-value in LAB color space, to be greener with a lower a-value by at least 1 unit, under one or more illuminants in the set of {D65, F2 and F11}. As illustrated in FIG. 34, the OD enhanced at least one Munsell color with a red hue component, i.e. a positive a-value in LAB color space, to be redder with a more positive a-value by at least 1 unit, under one or more illuminants in the set of {D65, F2 and F11}. Munsell colors with a green hue component include yellows, yellow-greens, greens, cyans and/or blues. Munsell colors with a red hue component include yellows, oranges, reds, pinks, purples and/or blues.

In certain configurations, ODs may provide a cosmetic tint perceived by the wearer or receiver that is noticeably different than its cosmetic tint perceived by the external viewer. Such situations arise when a wearer, e.g., golfer, wishes to see through a near-neutrally tinted eyewear, and wish the cosmetic tint of the eyewear appear different to an outsider observer, e.g. red. In other configurations, the OD's cosmetic tint perceived by the wearer is a single-pass filter, with a tint hue that is neutral, grey, brown, yellow, yellow-green, green, cyan, blue, red, orange, purple or substantially these hues. This OD's cosmetic tint as perceived by the external viewer is a double-pass filter, whose tint hue is red, orange, brown, pink, purple or substantially these hues. In some configurations, the OD's cosmetic tint perceived by the external viewer is redder or more towards red hue or a reddish hue, and not necessarily red, than the cosmetic tint perceived by the wearer or receiver.

In certain configurations, in CIELAB color space, an OD's cosmetic tint perceived by an external viewer (i.e. double-pass WP of OD) have an a-value that is at least 1 unit more towards red (i.e. more positive) than the a-value of the OD's cosmetic tint perceived by the wearer (i.e. single-pass WP of OD), under one or more illuminants in the set of {D65, F2 and F11}. Overall, the white point of the OD's cosmetic tint as viewed by the wearer is at least 1 unit away, in a-coordinate and/or b-coordinate of CIE LAB, from the OD's cosmetic tint as viewed by an external viewer, under one or more illuminants in the set of {D65, F2 and F11}.

Figure 35:
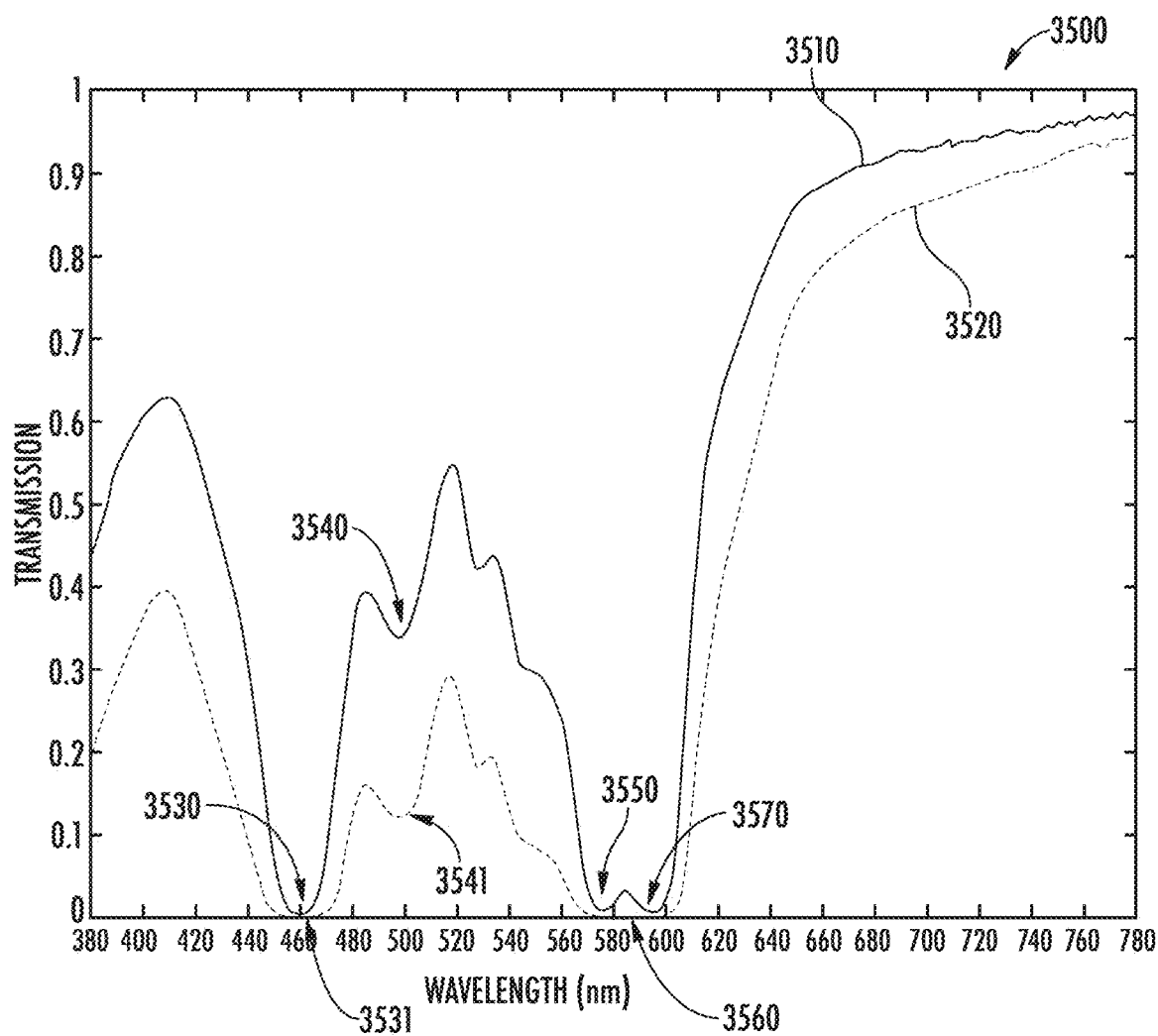
FIG. 35 illustrates the transmission spectrum of an optical device.

FIG. 35 illustrates a plot 3500 the shows the transmission spectrum of an optical device that represents an external viewer's perception of an OD's double-pass cosmetic tints being more towards red hue than the wearer's perception of the OD's single-pass cosmetic tint. The solid line shows the single-pass filter transmission spectrum 3510 of the OD, and the dashed line shows the double-pass filter transmission spectrum 3520 of the optical device. Such an OD may be manufactured to enhance red-green color discernment for individuals with Color Vision Deficiency (CVD) and/or those with normal color vision. The OD may be constructed using four narrow spectrum absorptive dyes, with peak absorption at about 460 nm 3530, 500 nm 3540, 575 nm 3550 and 595 nm 3570. The substrate of this optical device may be formed from polyamide (i.e., nylon), or may be any plastic, glass or other optically suitable material. The four dyes are compounded, extruded and molded into a lens blank of approximately 75 mm in diameter and 2 mm in thickness. The concentrations of these dyes can range between 10 micro-mol and 200 micro-mol.

For T and/or $T^2$, there are at least two stop-bands 3530, 3540 in spectra 3510 and 3531, 3541 in spectra 3520, with peak transmittance wavelengths between 410 nm and 540 nm, and at least one stop-band 3550, 3560, 3570 with a peak transmittance wavelength between 550 nm and 610 nm. There is at least a difference of 10 nm between the peak transmittance wavelengths of any two adjacent stop-bands. For example for the double-pass spectrum, plot 3500 shows a stop-band substantially centered at 460 nm 3531, 500 nm 3541 and 585 nm 3560, with at least an approximately 35 nm difference between any two adjacent peak transmittance wavelengths. The average transmission between 620 nm and 660 nm is higher than the average transmission between 530 nm and 570 nm, for the single-pass and/or double-pass transmission spectrum of an OD.

FIG. 36 includes FIG. 36A illustrating a plot 3600a and FIG. 36B illustrating a plot 3600b that collectively illustrates the colorimetric effects of the OD with the transmission spectrum of FIG. 35 with D65 or F2 as illuminants, in CIE LAB color space. The thin solid line, thin dashed line and solid circle depict the saturated Munsell color gamut 3660a, 3660b, pastel Munsell color gamut 3640a, 3640b, and WP 3630a, 3630b for a naked-eye red-green color vision deficient (CVD) observer (or normal vision observer). The thick solid line and thick dashed line depict the saturated Munsell color gamut 3670a, 3670b and pastel Munsell color gamut 3650a, 3650b for a red-green CVD observer (or normal vision observer) seeing with the OD. The solid squares depict the WP 3620a, 3620b or cosmetic tints of the OD as a single-pass filter, i.e., perceived by the OD wearer or receiver. The solid stars depict the WP 3610a, 3610b or cosmetic tints of the OD as a double-pass filter, i.e., perceived by the external viewer. The OD's single-pass cosmetic tints as perceived by the wearer have a CIE LAB value, in <L,a,b> format, of <61±20,0±20,11±20> under D65 (3620a), and <54±20,−1±20,−6±20> under F2 (3620b). The photopic luminous transmittance values are 29% and 22% under D65 and F2 illuminants, respectively, and where both values are between 5% and 95%. The lightness-independent white point (WP) shifts of the single-pass cosmetic tints are 11±20 with yellow hue, and 6±20 with blue hue (near grey), under D65 and F2 illuminants, respectively.

The OD's double-pass cosmetic tints as perceived by the external viewer have a CIE LAB value, in <L,a,b> format, of <43±20,19±20,14±20> under D65 (3610a), and <36±20, 14±20,−1±20> under F2 (3610b). The lightness-independent WP shifts of the double-pass cosmetic tints are 23±20 with red or red-brown hue, and 14±20 with red hue, under D65 and F2 illuminants, respectively. The OD's cosmetic tints, perceived by the wearer and/or the external viewer, have lightness-independent WP shifts of less than 60 in CIE LAB color space, under one or more illuminants in the set of {D65, F2}. The OD's cosmetic tints, perceived by the wearer and/or the external viewer, have a-values between −40 and +40, and/or b-values between −40 and +40, in CIE LAB color space, under one or more illuminants in the set of {D65, F2}. The lightness-independent color difference between the OD's single-pass WP and double-pass WP is between 1 and 150 units in CIE LAB under one or more illuminants in the set of {D65, F2}. The "L" or lightness values of the OD's single-pass cosmetic tint in CIE LAB color space may be above 15 in D65 illuminant, or is above 10 in F2 illuminant. The scotopic luminous transmittance of the OD under a single-pass filter process or as perceived by the wearer is between 5% and 95% under one or more illuminants in the set of {D65, F2}. Using select Munsell red and green color sets, the OD prescribed by FIGS. 35 and 36 have a LAB $RG_{LI}$ Color Difference Percent increase of 58% and 84% under D65 and F2 illuminants, respectively, or both values are between 5% and 110%.

As illustrated in FIG. 36, the OD enhanced at least one Munsell color with a green hue component, i.e., with a negative a-value in LAB color space, to be greener with a lower a-value by at least 1 unit, under one or more illuminants in the set of {D65, F2}. The OD enhanced at least one Munsell color with a red hue component, i.e., with a positive a-value in LAB color space, to be redder with a more positive a-value by at least 1 unit, under one or more illuminants in the set of {D65, F2}.

In certain configurations, in CIE LAB, the double-pass cosmetic tint of the OD perceived by the external viewer ($T^2$) is more green, more yellow-green, more cyan or more blue (i.e., with a lower or less positive a-value by at least 1 unit, and with a different b-value by at least 1 unit) than the single-pass cosmetic tint of the OD perceived by the wearer or receiver (T), under one or more illuminants in the set of {D65, F2, F11}.

Referring back to FIG. 32A and FIG. 32B, the wearer's skin or sclera as a backstop surface reflects incident, once-filtered single-pass light, back through the OD, in order to reach the external viewer. In this double-pass filter process, the reflectance spectra of the wearers skin (colloquially: skin color) and sclera selectively reflect, to varying percentages, different visible wavelengths of incident light. Human skin is normally various colors of yellow-white, yellow, brown, and dark brown, and/or human sclera is normally various colors of white and pastel yellow (laced with red blood vessels), which may contain red or reddish hues. Therefore, a color enhancing optical device may further enhance the skin's and sclera's red and yellow colors to result in a redder appearance of the skin or sclera as viewed by the external viewer. A red-green color enhancing or color correcting OD can increase the a-values of the original skin or sclera colors to more positive a-values by at least 1 unit in CIE LAB color space, under one or more illuminants in the set of {D65, F2, F11}. To account for this type of OD-induced reddening and/or yellowing of skin or sclera color appearance, the double-pass cosmetic tint of the OD as perceived by the external viewer may be green, blue, cyan green-yellow. Specifically, the a-value of the double-pass WP and/or single-pass WP of the OD is less than or equal to −1, under one or more illuminants in the set of {D65, F2, F11}.

Furthermore, double-pass WP of the OD can be greener (including more green, more yellow-green, more cyan), i.e., lower a-value by at least 1 unit in CIE LAB color space compared to a-value of the single-pass cosmetic tint of the OD as perceived by the wearer, under one or more illuminants in the set of {D65, F2, F11}.

Alternatively, double-pass WP of the OD can have a higher a-value by at most 60 units in CIE LAB color space compared to a-value of the single-pass cosmetic tint of the OD, under one or more illuminants in the set of {D65, F2, F11}.

In certain configurations, the OD's single-pass and/or double-pass cosmetic tint has a hue that is substantially neutral, grey, brown, yellow, yellow-green, green, cyan, blue or light red, i.e., a-value less than 60 in CIE LAB. In certain configurations, the OD's single-pass and/or double-pass cosmetic tint has a hue that is substantially neutral, grey, brown, yellow, yellow-green, green, cyan, blue or purple, i.e. b-value less than 60 in CIE LAB. Double-pass WP of the OD can be bluer, i.e. lower in b-value by at least 1 unit in CIE LAB color space compared to b-value of the single-pass WP of the OD, under one or more illuminants in the set of {D65, F2, F11}.

Alternatively, double-pass WP of the OD can have a higher b-value by at most 60 units in CIE LAB color space compared to b-value of the single-pass cosmetic tint of the OD, under one or more illuminants in the set of {D65, F2, F11}. Double-pass WP and single-pass WP of the OD can also have exactly or nearly exactly the lightness-independent <a,b>-values in CIE LAB, i.e., their a-values differ by no more than 1 unit and their b-values differ by no more than 1 unit.

Figure 37:
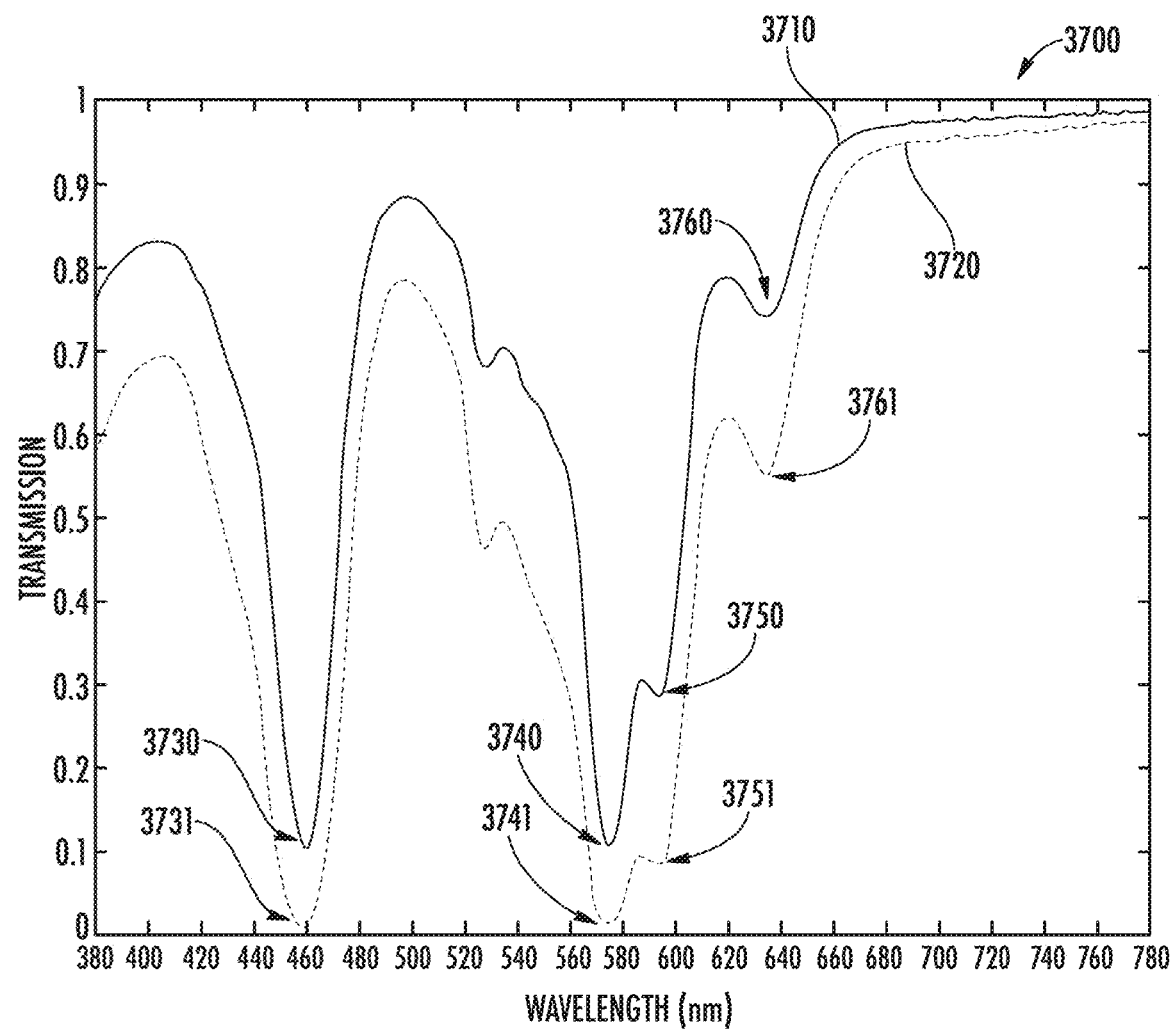
FIG. 37 illustrates the transmission spectrum of an optical device.

FIG. 37 illustrates a plot 3700 that illustrates a transmission spectrum of an optical device that provides an external viewers perception of an OD's cosmetic tints that is more towards green, yellow-green, cyan or blue hues than the wearer's perception of the OD's cosmetic tint. The double-pass cosmetic tint (WP) of the OD has a lower a-value by at least 1 unit than that of the single-pass cosmetic tint of the OD, under one or more illuminants in the set of {D65, F2, F11}. The solid line illustrates the single-pass filter transmission spectrum 3710 of the OD, and the dashed line illustrates the double-pass filter transmission spectrum 3720 of the OD. The OD may be manufactured to enhance red-green color discernment for individuals with Color Vision Deficiency (CVD) and with normal color vision. This OD may be constructed using four narrow spectrum absorptive dyes, with peak absorption at about 460 nm (3730, 3731), 575 nm (3740, 3741), 595 nm (3750, 3751) and 635 nm (3760, 3761). The substrate of this OD is CR39. The four dyes are dip coated onto a lens blank of approximately 72 mm in diameter and 2.5 mm in thickness. The concentrations of these dyes may range between 1 micro-mol and 2500 micro-mol.

For T (3710) and/or $T^2$ (3720), there is at least one stop-band 3730, 3731 with a peak transmittance wavelength between 420 nm and 520 nm, and at least two stop-bands, stop-bands 3740, 3760 in spectrum 3710, and stop-band 3741, 3761 in spectrum 3720, each with a peak transmittance wavelength between 550 nm and 700 nm, where there is at least a difference of 8 nm between the peak transmittance wavelengths of any two adjacent stop-bands.

The substrate of this OD may be silicone hydrogel for contact lenses or any other optically suitable material. The dyes are infused into or onto the contact lens via physical mixing and/or chemical bonding. The concentrations of these dyes can range between 1 micro-mol and 5000 micro-mol.

FIG. 38 illustrates three plots, plot 3800a in FIG. 38A, plot 3800b in FIG. 38B, and plot 3800c in FIG. 38C, that illustrate the colorimetric effects of the OD with the transmission spectrum of FIG. 37, with D65, F2 and F11 as illuminants, in CIE LAB color space. The thin solid line, thin dashed line and solid circle depict the saturated Munsell color gamut 3820a, 3820b, 3820c, pastel Munsell color gamut 3860a, 3860b, 3860c, and WP 3840a, 3840b, 3840c for a naked-eye red-green color vision deficient (CVD) observer or normal vision observer, respectively. The thick solid line and thick dashed line depict the saturated Munsell color gamut 3810a, 3810b, 3810c and pastel Munsell color gamut 3870a, 3870b, 3870c for a red-green CVD observer or normal vision observer viewing with the OD. The solid squares depict the white points 3850a, 3850b, 3850c or cosmetic tints of the OD as a single-pass filter, i.e., perceived by the OD wearer or receiver. The solid stars depict the white points 3830a, 3830b, 3830c or cosmetic tints of the OD as a double-pass filter, i.e. perceived by the external viewer. The OD's single-pass cosmetic tints as perceived by the wearer may have a CIE LAB value, in <L,a,b> format, of <80±20,−13±20,8±20> under D65 3850c, <75±20,−7±20,−4±20> under F2 3850b, and <81±19,1±20,8±20> under F11 3850a. The photopic luminous transmittance values are 56%, 48% and 59% under D65, F2 and F11 illuminants, respectively, or values are between 5% and 95%. The lightness-independent white point shifts (WPSes) of the cosmetic tints are 15±15 with yellow, yellow-green or green hue under D65 illuminant; 8±8 with green, cyan or blue hue under F2 illuminant; and 8±8 with yellow, yellow-green or yellow-red hue under F11 illuminant.

The OD's double-pass cosmetic tints as perceived by the external viewer have a CIE LAB value, in <L,a,b> format, of <68±20,−17±20,10±20> under D65 3830c, <61±20,−10±20,−5±20> under F2 3830b, and <69±20,−2±20,7±20> under F11 3830a. The lightness-independent WPSes of the cosmetic tints are 19±19 with green, yellow-green or yellow hue under D65 illuminant, 11±11 with green, cyan or blue hue under F2 illuminant, and 7±7 with yellow, yellow-green or yellow-red hue under F11 illuminant.

The OD's single-pass and double-pass cosmetic tints each has a lightness-independent WPS of less than 60 in CIE LAB color space, under one or more illuminants in the set of {D65, F2, F11}. The OD's single-pass and double-pass cosmetic tints have a-values between −60 and +605, and/or b-values between −60 and +60, in CIE LAB color space, under one or more illuminants in the set of {D65, F2, F11}. The lightness values of the OD under a single-pass filter process or as perceived by the wearer in CIE LAB color space is above 55 under D65 and/or F11 illuminant, and/or is above 50 under F2 illuminant. The photopic luminous transmittance of the OD under a single-pass filter process or as perceived by the wearer is below 95% under one or more illuminants in the set of {D65, F2, F11}. Using select Munsell red and green color sets, the OD prescribed by FIGS. 37 and 38 have a LAB $RG_{LI}$ Color Difference Percent increase of 30%, 42% and 15%, under D65, F2 and F11 illuminants, respectively or an increase between 5% and 110% under all listed illuminants.

As illustrated in FIG. 38, the OD enhanced at least one Munsell color with a green hue component, i.e., a color with a negative a-value in LAB color space, to be greener with a lower a-value, under one or more illuminants in the set of {D65, F2, F11}. As illustrated in FIG. 38, the OD enhanced at least one Munsell color with a red hue component, i.e., a color with a positive a-value in LAB color space, to be redder with a higher a-value, under one or more illuminants in the set of {D65, F2, F11}.

A red-green color enhancing or color correcting OD increases the a-values of the wearers original facial skin or sclera colors by at least 1 unit, as viewed by an external viewer. The OD increases the appearance of red, pink, orange, brown, purple or substantially these colors for the areas of the skin and/or eye covered by the OD, as viewed by an external viewer.

$$\text{LAB } BY_{LI}\text{Color Difference} = \sqrt{(a_{blue} - a_{yellow})^2 + (b_{blue} - b_{yellow})^2} \quad \text{Equation 24.}$$

Equation 24 represents a Colorimetric Performance Metric (CPM) that measures the lightness-independent blue-yellow color difference in CIE LAB color space. The Munsell blue and yellow color sets are selected inputs. For the selected set of blue colors, the average statistic of the blue color set is used to enumerate $\langle a_{blue}, b_{blue} \rangle$. For the selected set of yellow colors, the average statistic of the yellow color set is used to enumerate $\langle a_{yellow}, b_{yellow} \rangle$.

Equation 25 provides the CPM that compares the $BY_{LI}$ Color Difference Percent between seeing the contrast of blue and yellow color sets, through a well designed and constructed optical device versus seeing such color differences with the naked eye.

$$\text{LAB } BY_{LI}\text{Color Difference Percent} = 100 \quad \text{Equation 25}$$

$$\left( \frac{\text{LAB } BY_{LI}\text{Color Difference With Optical Device}}{\text{LAB } BY_{LI}\text{Color Difference With Naked Eye}} - 1 \right) = $$

$$100 \left( \frac{\sqrt{(a^*_{blue} - a^*_{yellow})^2 + (b^*_{blue} - b^*_{yellow})^2}}{\sqrt{(a^{\eta}_{blue} - a^{\eta}_{yellow})^2 + (b^{\eta}_{blue} - b^{\eta}_{yellow})^2}} - 1 \right),$$

where $\langle a^*, b^* \rangle$ and $\langle a^\eta, a^\eta \rangle$ denote CIE LAB color space coordinates of colors viewed with an optical device and with the naked eye, respectively.

For any color or color set, including Munsell colors, Ishihara colors, natural colors, and artificial colors, the CIE LAB "$a_{green}$" value of the average green color is derived by taking the average of these colors' individual a-values. The CIE LAB "$b_{green}$" value of the average green color is derived by taking the average of these colors' individual b-values. The CIE LAB "$L_{green}$" value of the average green color is derived by taking the average of these colors' individual "L" values. The CIE LAB "$a_{red}$" value of the average red color is derived by taking the average of these colors' individual a-values. The CIE LAB "$b_{red}$" value of the average red color is derived by taking the average of these colors' individual b-values. The CIE LAB "$L_{red}$" value of the average red color is derived by taking the average of these colors' individual "L" values. The CIE LAB "$a_{blue}$" value of the average blue color is derived by taking the average of these colors' individual a-values. The CIE LAB "$b_{blue}$" value of the average blue color is derived by taking the average of these colors' individual b-values. The CIE LAB "$L_{blue}$" value of the average blue color is derived by taking the average of these colors' individual "L" values. The CIE LAB "$a_{yellow}$" value of the average yellow color is derived by taking the average of these colors' individual a-values. The CIE LAB "$b_{yellow}$" value of the average yellow color is derived by taking the average of these colors' individual b-values. The CIE LAB "$L_{yellow}$" value of the average yellow color is derived by taking the average of these colors' individual "L" values.

The average red, green, blue and yellow colors'<L,a,b> values are inputs into all CPMs, including all color difference, lightness difference, and corresponding percent calculations, unless specified otherwise. These inputs are used in human color vision with and without a color enhancing optical device, and used in evaluating the single-pass and/or double-pass tints of the OD.

In some configurations, Lab color space is replaced by Luv, where L is lightness and uv is the well-known chromaticity coordinate system, described by Equations 11 and 12. Therefore, L for each target, include a viewing color or tint of OD, is the same value between Lab and Luv color systems; $\langle L_{green}, a_{green}, b_{green} \rangle$ coordinates are replaced by $\langle L_{green}, u_{green}, v_{green} \rangle$ coordinates; $\langle L_{red}, a_{red}, b_{red} \rangle$ coordinates are replaced by $\langle L_{red}, u_{red}, v_{red} \rangle$ coordinates; $\langle L_{blue}, a_{blue}, b_{blue} \rangle$ coordinates are replaced by $\langle L_{blue}, u_{blue}, v_{blue} \rangle$ coordinates; $\langle L_{yellow}, a_{yellow}, b_{yellow} \rangle$ coordinates are replaced by $\langle L_{yellow}, u_{yellow}, v_{yellow} \rangle$ coordinates.

In CPM computations, including using Munsell or Ishihara colors and using averaged values, would be performed using Luv values instead of Lab values when Luv color system is used; Luv is the default.

In some configurations, the color matching functions in 1976 CIE LAB color appearance model is of the CIE 1931 2-Degree Standard Observer. In certain configurations, the 2005 Sharpe-Stockman luminosity function is used to evaluate the photopic luminous transmittance of an optical device. The 1951 standard CIE scotopic luminosity function is used in this invention.

In certain configurations, spectral, optical and colorimetric values for the cosmetic tint and color enhancing or altering performance of the OD as perceived by the wearer are evaluated using the transmission spectrum (T) of the OD as a single-pass filter (filtering once) of light from illuminant, before reaching the wearer.

In certain configurations, spectral, optical and colorimetric values for the cosmetic tint of the OD as perceived by the external viewer are evaluated using the transmission spectrum of the OD as a double-pass filter (filtering twice) of light from illuminant, before reaching the external viewer. Here, the effective transmission spectrum of the OD is $T^2$ per wavelength. Spectral, optical and colorimetric values include spectra of OD, luminous transmittance, color difference, color space representations (e.g. coordinates), color gamut, white point, and other relevant parameters discussed herein and/or that are generally accepted in the optical and color industries.

Figure 39:
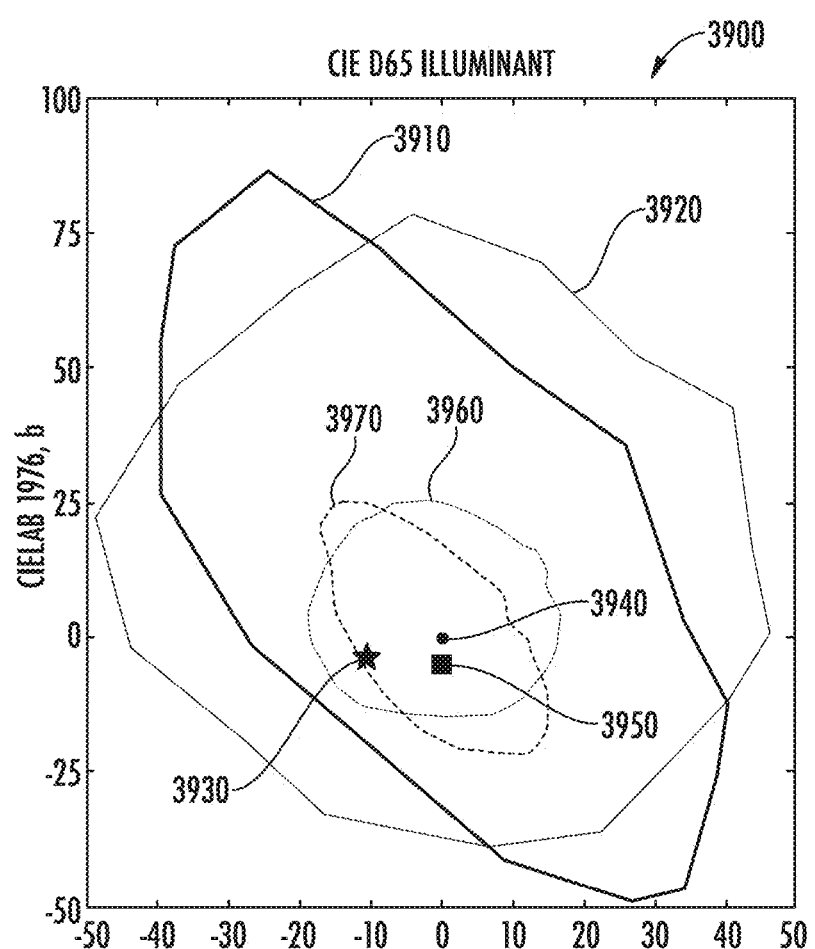
FIG. 39 illustrates colorimetric effects of the optical device with a transmission spectrum of FIG. 40 (HG 5), with D65 as illuminant, in CIE LAB color space.
Figure 40:
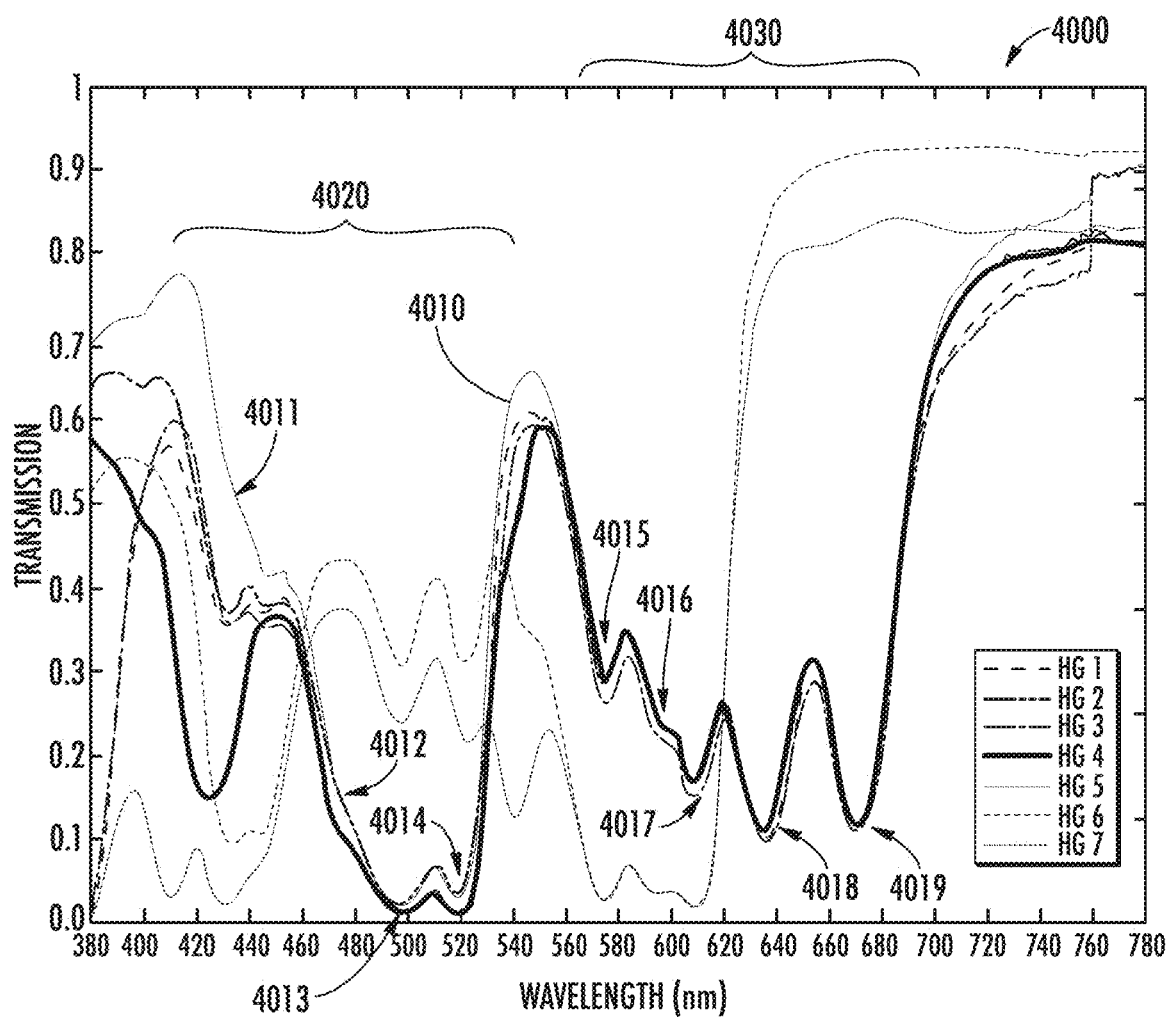
FIG. 40 illustrates the transmission spectra of a myriad of optical devices.
Figure 41:
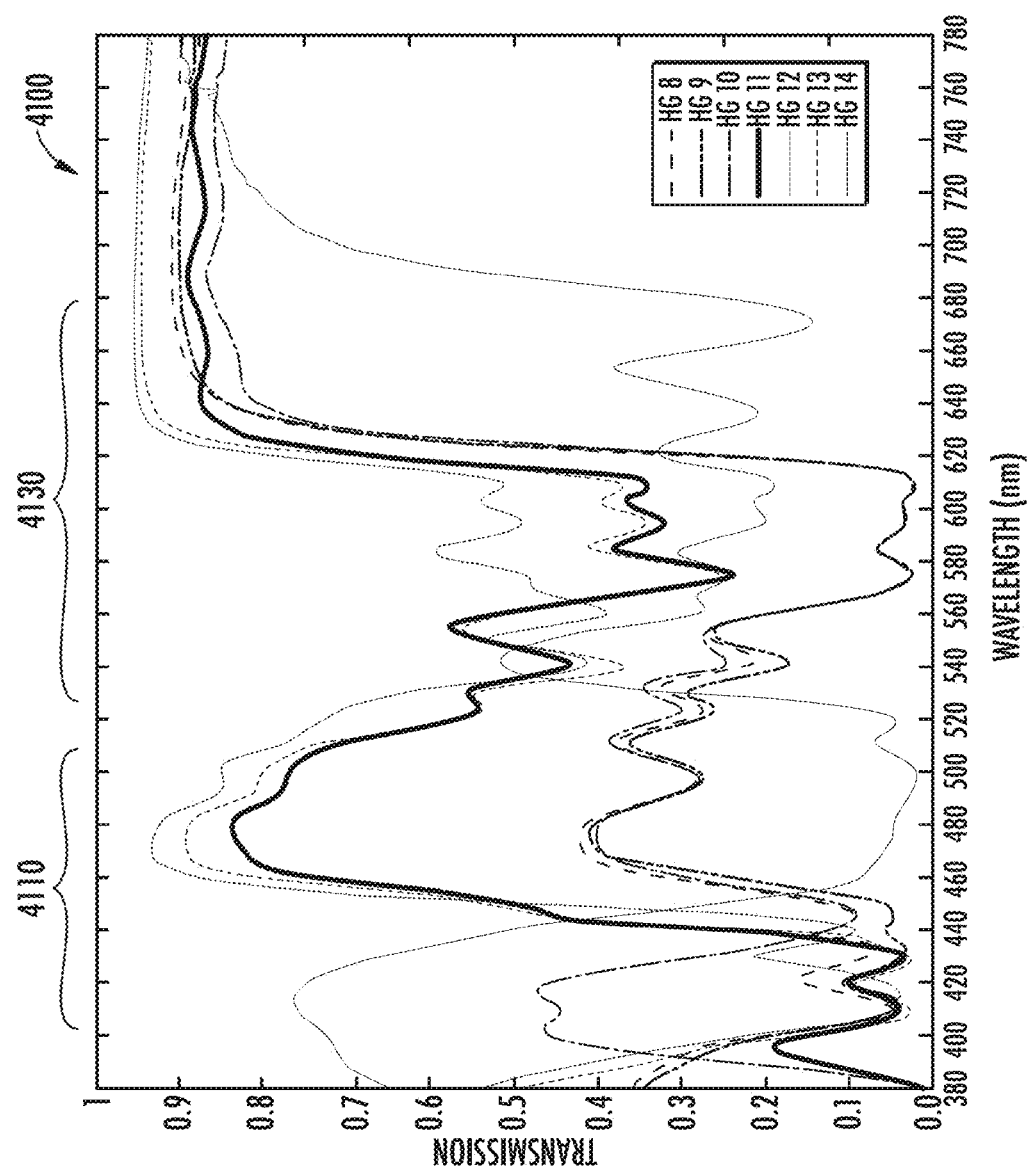
FIG. 41 illustrates the transmission spectra of a myriad of optical devices.
Figure 42:
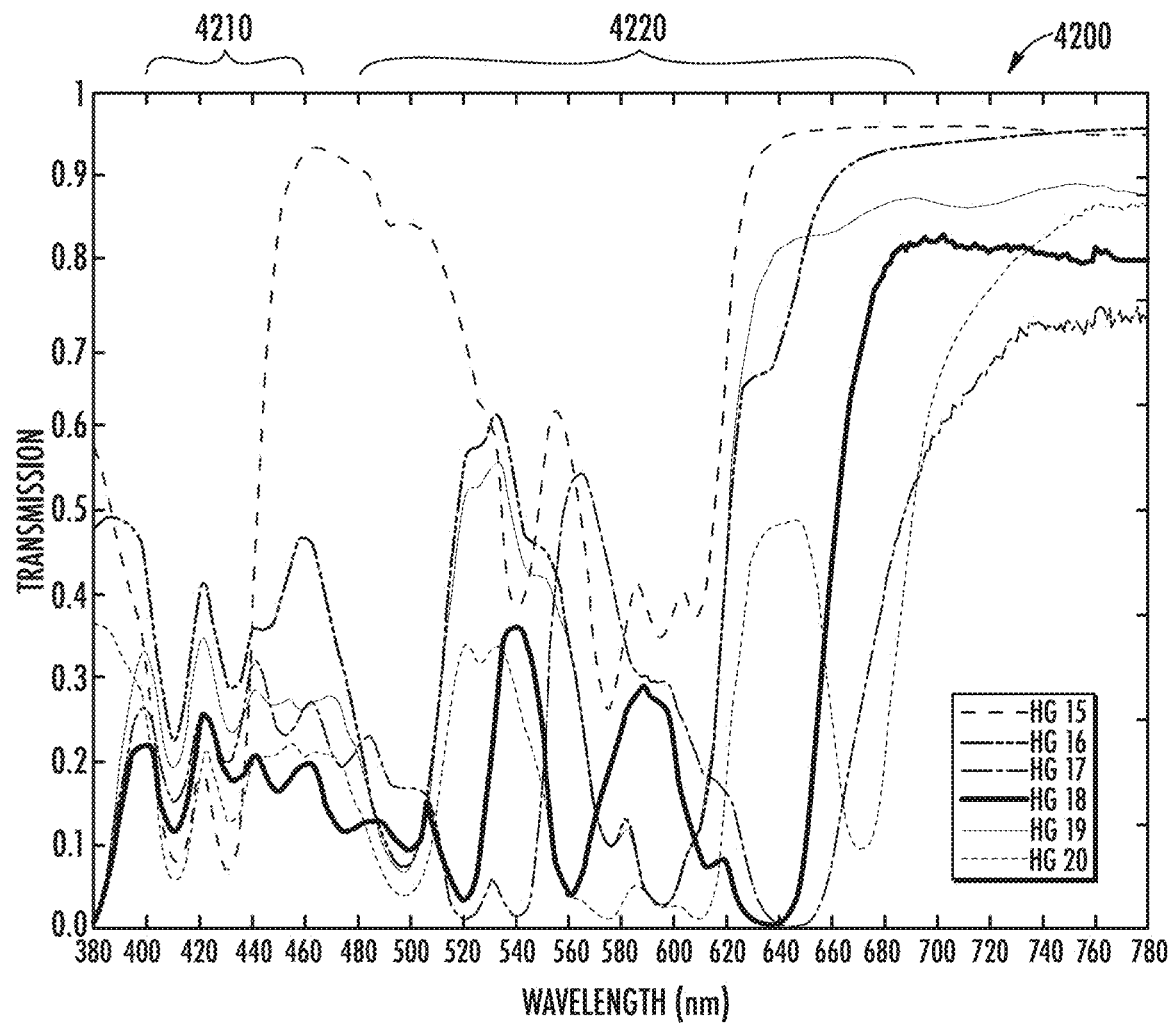
FIG. 42 illustrates the transmission spectra of a myriad of optical devices.
Figure 43:
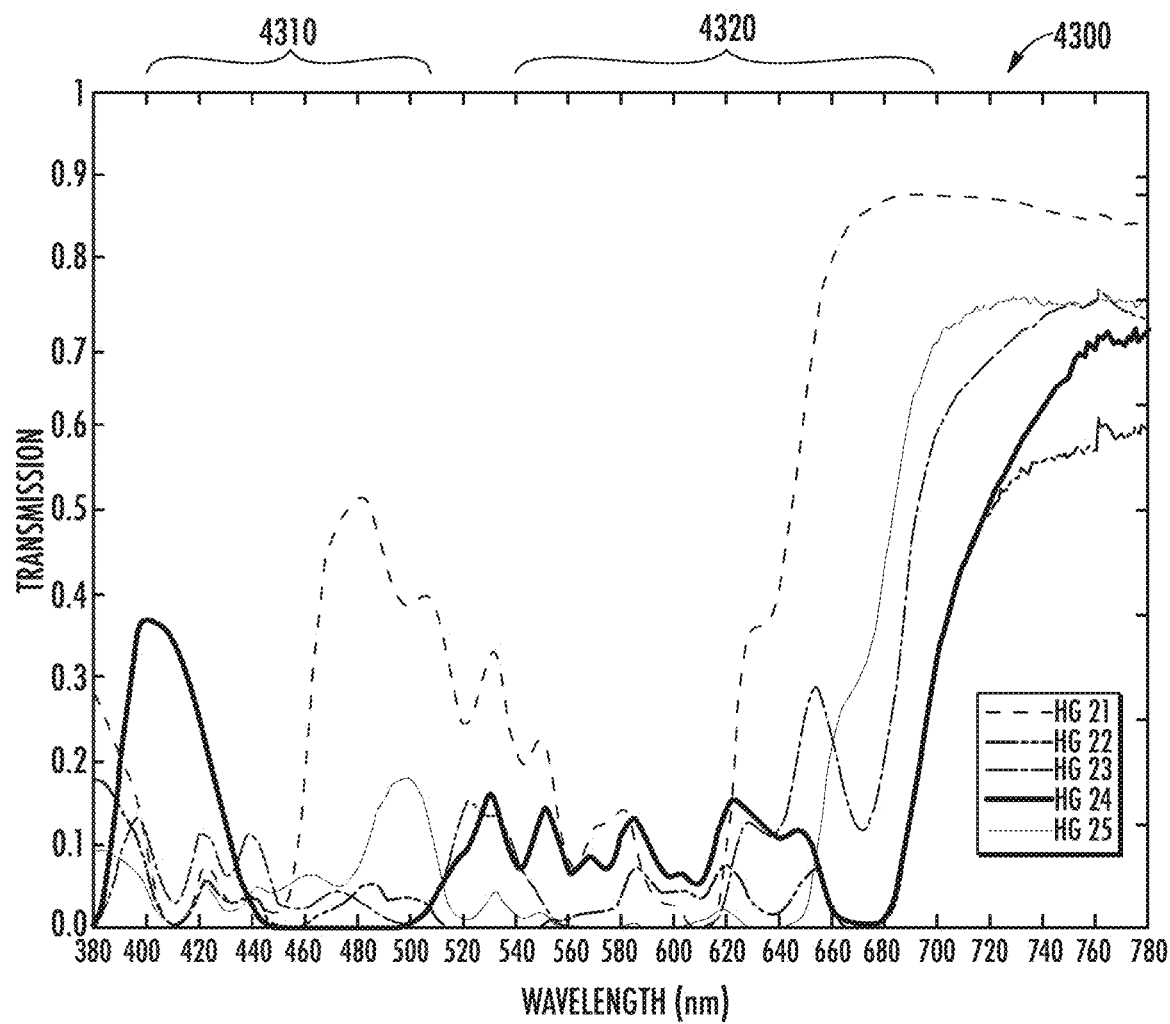
FIG. 43 illustrates the transmission spectra of a myriad of optical devices.

FIG. 39 illustrates a plot 3900 showing colorimetric effects of the OD with a transmission spectrum of FIG. 40 (HG 5, 4010), with D65 as illuminant, in CIE LAB color space. The thin solid line, thin dashed line and solid circle depict the saturated Munsell color gamut 3920, pastel Munsell color gamut 3960, and WP 3940 for a naked-eye blue-yellow color vision deficient (CVD) observer or normal vision observer, respectively. The thick solid line and thick dashed line depict the saturated Munsell color gamut 3910 and pastel Munsell color gamut 3970 for a blue-yellow CVD observer or normal vision observer seeing with the OD, respectively. The solid square depict the white point 3950 or cosmetic tint of the OD as a single-pass filter, i.e., perceived by the OD wearer or receiver. The solid star depict the white point 3930 or cosmetic tint of the OD as a double-pass filter, i.e., perceived by the external viewer.

This OD's single-pass filter transmission spectrum 4010 may be constructed using nine absorptive dyes, with peak absorptions at about 430 nm (4011), 470 nm (4012), 500 nm (4013), 520 nm (4014), 575 nm (4015), 595 nm (4016), 610 nm (4017), 640 nm (4018) and 670 nm (4019). The substrate of this OD may be polycarbonate, or may be any plastic, glass or other optically suitable material. The dyes are compounded, extruded and molded into a lens blank of approximately 68 mm in diameter and 2.5 mm in thickness. The concentrations of these dyes can range between 5 micro-mol and 200 micro-mol. The OD's single-pass cosmetic tint 3950 as perceived by the wearer is substantially pastel blue. The OD's double-pass cosmetic tint 3930 as perceived by the external viewer is green, green-cyan, cyan or substantially these colors. Using pastel Munsell color sets of blues and yellows, the optical device prescribed by FIG. 39 and FIG. 40 (HG 5) has a LAB $BY_{LI}$ Color Difference Percent increase of 20%, or between 5% and 95%, under D65 illuminant.

Table 2 illustrates the colorimetric and optical performance indicators for 25 optical devices whose transmission spectra are shown in FIGS. 40-43 in spectra 4000, 4100, 4200, 4300. An optical device can have any single-pass cosmetic tint (WP) comprised of red, green, blue, yellow, neutral, purple, orange, cyan, yellow-green or substantially similar hues. The OD can separately have any double-pass cosmetic tint (WP) of red, green, blue, yellow, neutral, purple, orange, cyan, yellow-green or substantially similar hues. Green hues are comprised of green-yellow, green and cyan hues. Red hues are comprised of yellow-red (i.e., orange), brown, pink, red and purple hues. Blue hues are comprised of cyan, blue and purple hues. Yellow hues are comprised of yellow-green, yellow, orange and brown hues. All hues include hues that are substantially similar. Table 2 illustrates that an OD may have any value of photopic luminous transmittance from 0% to 100%, a single-pass filter (wearer's perception) lightness from 0 to 100, and/or a double-pass filter (external viewer's perception) lightness from 0 to 100. Table 2 illustrates that an OD's cosmetic tints, perceived by the wearer and/or the external viewer, have lightness-independent WPSes of less than 20 units in CIE LAB color space when either cosmetic tint hue is considered neutral or substantially neutral. Table 2 illustrates that an OD's cosmetic tints, perceived by the wearer and/or the external viewer, have lightness-independent WP shifts of more than 3 units in CIE LAB color space when either cosmetic tint hue is considered a colored hue of red, green, blue, yellow or substantially these colors. Table 2 illustrates an OD's cosmetic tints, perceived by the wearer and/or the external viewer, have a-values between −100 and +100, and/or b-values between −100 and +100, in CIE LAB color space. Table 2 illustrates an OD's lightness-independent red-green color difference increase % ranges from −60% to 100%, in LAB. Table 2 illustrates an OD's lightness-independent blue-yellow color difference increase % ranges from −50% to 50%, in LAB.

TABLE 2

THE COLORIMETRIC AND OPTICAL PERFORMANCE INDICATORS FOR 25 OPTICAL DEVICES WHOSE TRANSMISSION SPECTRA ARE SHOWN IN FIGS 40-43

CIE LAB, D65 ILLUMINANT

| | WEARER PERCEPTION (SINGLE-PASS FILTER) | | | | | | EXTERNAL VIEWER (DOUBLE-PASS FILTER) | | |
|---|---|---|---|---|---|---|---|---|---|
| 00 EXAMPLE | RGLI COLOR DIFFERENCE INCREASE % | BYLI COLOR DIFFERENCE INCREASE % | PHOTOPIC LUMINOUS TRANSMITTANCE | COSMETIC TINT HUE | COSMETIC TINT'S CIE <l, o, b> COORDINATE | WPS, LIGHTNESS INDEPENDENT (LI) | COSMETIC TINT HUE | COSMETIC TINT'S CIE <l, o, b> COORDINATE | WPS LI |
| HG 1 | −14 | 14 | 30 | GREEN | <62, −4, 9> | 4 | GREEN | <43, −17, 6> | 18 |
| HG 2 | −21 | 20 | 26 | RED | <59, 4, −1> | 5 | GREEN | <38, −8, 3> | 8 |
| HG 3 | −18 | 17 | 28 | NEUTRAL | <61, 0, 0> | 0 | GREEN | <41, −14, 5> | 14 |
| HG 4 | −24 | 11 | 26 | YELLOW | <58, 0, 8> | 8 | GREEN | <38, −14, 15> | 20 |
| HG 5 | 14 | 20 | 30 | BLUE | <62, 0, −5> | 5 | GREEN | <43, −13, −4> | 11 |
| HG 6 | 47 | −10 | 25 | GREEN | <57, −6, 0> | 6 | RED | <37, 16, 6> | 18 |
| HG 7 | 44 | −5 | 19 | RED | <50, 8, 0> | 6 | RED | <30, 33, 4> | 34 |
| HG 8 | 46 | −7 | 21 | NEUTRAL | <53, 8, 0> | 0 | RED | <32, 26, 6> | 27 |
| HG 9 | 47 | −8 | 20 | YELLOW | <52, 0, 6> | 6 | RED | <31, 28, 9> | 30 |
| HG 10 | 48 | −6 | 23 | BLUE | <35, 0, −7> | 7 | RED | <35, 24, −1> | 24 |
| HG 11 | 15 | −6 | 52 | GREEN | <77, −8, 0> | 8 | BLUE | <61, −3, −8> | 8 |
| HG 12 | 0 | 18 | 24 | RED | <56, 9, −3> | 10 | BLUE | <34, 7, −13> | 15 |
| H3 13 | 15 | −4 | 48 | NEUTRAL | <75, −3, −2> | 3 | BLUE | <58, 5, −11> | 12 |
| HG 14 | 11 | −5 | 55 | BLUE | <79, 3, 5> | 6 | BLUE | <64, 3, −4> | 5 |
| HG 15 | 15 | −2 | 52 | BLUE | <77, −2, −18> | 10 | BLUE | <61, 5, −21> | 22 |
| HG 16 | 37 | −3 | 31 | GREEN | <63, −6, −1> | 6 | YELLOW | <44, −1, 7> | 8 |
| HG 17 | −50 | 19 | 22 | RED | <54, 11, −2> | 12 | YELLOW | <34, 2, 9> | 9 |

TABLE 2-continued

THE COLORIMETRIC AND OPTICAL PERFORMANCE INDICATORS FOR 25
OPTICAL DEVICES WHOSE TRANSMISSION SPECTRA ARE SHOWN IN FIGS 40-43

CIE LAB, D65 ILLUMINANT

| | WEARER PERCEPTION (SINGLE-PASS FILTER) | | | | | | EXTERNAL VIEWER (DOUBLE-PASS FILTER) | | |
|---|---|---|---|---|---|---|---|---|---|
| 00 EXAMPLE | RGLI COLOR DIFFERENCE INCREASE % | BYLI COLOR DIFFERENCE INCREASE % | PHOTOPIC LUMINOUS TRANSMITTANCE | COSMETIC TINT HUE | COSMETIC TINT'S CIE <l, o, b> COORDINATE | WPS, LIGHTNESS INDEPENDENT (LI) | COSMETIC TINT HUE | COSMETIC TINT'S CIE <l, o, b> COORDINATE | WPS LI |
| HG 18 | -3 | 4 | 17 | NEUTRAL | <48, 0, 0> | 0 | YELLOW | <24, 2, 7> | 8 |
| HG 19 | 40 | -9 | 31 | RED | <63, -5, 9> | 10 | YELLOW | <44, 5, 22> | 23 |
| HG 20 | 59 | -5 | 14 | BLUE | <44, -5, -6> | 7 | YELLOW | <22, 2, 4> | 4 |
| HG 21 | 33 | -12 | 19 | GREEN | <51, -20, 3> | 20 | NEUTRAL | <28, -2, -3> | 4 |
| HG 22 | -26 | 13 | 2 | RED | <17, 20, -1> | 20 | NEUTRAL | <1, 3, 0> | 3 |
| HG 23 | 83 | -9 | 5 | BLUE | <27, -3, -3> | 4 | NEUTRAL | <6, 3, 3> | 4 |
| HG 24 | 8 | -15 | 9 | YELLOW | <36, 2, 20> | 20 | NEUTRAL | <9, 3, 3> | 4 |
| HG 25 | 52 | -8 | 3 | BLUE | <19, -7, -16> | 17 | NEUTRAL | <3, 2, -1> | 3 |

In CIE D65 illuminant, an OD described herein may have (1) the a-value of its single-pass WP and that of its double-pass WP are at least 5 distance units apart, and/or (2) the b-value of its single-pass WP and that of its double-pass WP are at least 5 distance units apart, provided at least one dye is used to modify the visible transmission spectrum 4000, 4100, 4200, 4300, and one or more of the following conditions applies to its transmission spectrum between 380 nm and 780 nm: at least one stop band exists illustrated as stop-bands 4020, 4030, 4110, 4120, 4210, 4220, 4310, 4320; ratio of max transmittance to min transmittance is at least 1.25 to 1; photopic luminous transmittance is below 95%; lightness-independent RG color difference increase is between −80% and 120%; lightness-independent BY color difference increase is between −50% and 110%; and a- and b-values of the OD's single-pass WP are both between −15 and 15.

An OD with any of the illustrated transmissions spectra 4000, 4100, 4200, 4300 may be constructed using dyes or colorants to absorb the specified wavelengths. The dyes may be infused into or coated onto an optically-suitable substrate. This physical OD may then be placed externally in front of the eye, such as in the form of an external eyewear, and/or placed externally on top of the cornea, such as in the form of a contact lens or eye drop liquid, and/or placed internally in the eye, such as in the form of an intraocular lens.

An OD may be designed to have one or more functions embodied in one integrated physical device. In an embodiment where the OD is designed to have one function, the OD has a singular functional transmission spectrum. In an embodiment where the OD is designed with multiple functions, the OD has an overall transmission spectrum that is effectively a product of a multitude of functional transmission spectra. For example, for a color enhancing OD that also blocks UV light and high-energy blue light (HEBL from 380 nm to 460 nm), the overall transmission spectrum of this integrated, and multi-function, OD is a product of the color enhancing spectrum, the UV blocking spectrum and the HEBL blocking spectrum. That is, $T_{integrated} = T_{color\ enhancing} * T_{UV\ blocking} * T_{HEBL\ blocking}$.

In another example, a color balancing OD that removes, reduces or alters the cosmetic tint (color) of another OD that blocks HEBL, may have a color balancing transmission spectrum physically, chemically or electronically integrated into the HEBL-blocking OD. This design enables the new color-balanced HEBL-blocking OD to have a lesser or altered cosmetic tint as compared to the original HEBL-blocking OD. The overall transmission spectrum of this integrated OD is a product of the color balancing spectrum and the HEBL blocking spectrum. That is, $T_{integrated} = T_{color\ balancing} * T_{HEBL\ blocking}$. Any singular function OD may be coupled with another singular function OD to produce an integrated OD with multiple functions.

The WP of a color enhancing OD's single-pass cosmetic tint is at least 1 unit away, in a-value and/or b-value in Lab space, from the OD's double-pass cosmetic tint.

The WP of the optical device's single-pass cosmetic tint as viewed by the wearer can be less than 25 units (measured by lightness-independent color difference, Equation 21), away from the OD's double-pass cosmetic tint as viewed by an external viewer, under one or more illuminants in the set of {D65, F2, F11}.

The lightness value of an optical device under a single-pass filter process is above 15 under D65 or F11 illuminant, or is above 10 under F2 illuminant.

An example application of these inventions is a lens. Lenses made according to this disclosure enhance the human color vision for those with normal vision or with color vision deficiencies, including hereditary and acquired. These lenses can be framed and worn outside of the eyes or worn on the surface of the eyes, e.g. contacts, or be inserted into the eyes, e.g., IOLs or mounted on devices for distance viewing or magnification purposes, e.g., optical scopes, telescopes, microscopes.

Another example application of this disclosure is optical media affixed or attached to building and other structures and frames not for the human face or eye. For example, partially or fully transparent windows, tables, doors, floors, walls, mirrors, panels, covers, shields and containers. Panels, shields, covers and containers can include optical media intended to transmit, reflect or absorb all or portions of UV, VIS and infrared wavelengths, while partially or fully blocking other objects or energy waves. Examples of panels, shields, covers and containers include the surface cover for solar panels, sneeze or spit guards, aquarium panels and glass cups.

Additional example applications of this disclosure are automotive optical media, such as windows, windshields, moon-roofs, sunroofs and mirrors.

More example applications of this disclosure are electronic display screens, such as those on or in TVs, monitors, phone displays, and electronic viewing goggles. These devices emit UV, VIS and/or infrared, whose wavelengths can be modified via the display screen(s) located between the radiation emitter and the receiver, e.g. human eyes or cameras.

Other example applications include optical media in or on lighting devices, such as light bulbs, tubes, light-emitting diodes (LEDs), fluorescent lights, incandescent lights, and metal halide lights. Optical media can be covers, panels, shields, containers, casings and any other device or parts of a device or system of devices where UV, VIS or infrared radiation is transmitted, absorbed or reflected by or through the media, according to this disclosure, before reaching the receiver, e.g. human eyes or camera. Embodiments of such optical media include bulbs, tubes, twisted or straight, and other encasement or casings.

One or more light polarizing layers, such as polarizing films or sheets, may be incorporated into or onto the optical device. Methods of incorporation of the light polarizing layers include coating, lamination, encasement and material infusion. The polarizing layers may be outer surfaces of the optical device or "sandwiched" between other layers within the optical device. The polarizing layers may be the outermost layers or may have additional layers added on top, such as thin film layers or dye layers. Thin film layers may include anti-reflective coating, hard coating, hydrophobic coating, and any combination thereof. Dye layers may include solid tints, gradient tints, colored tints, neutral tints and any combination thereof.

Figure 44:
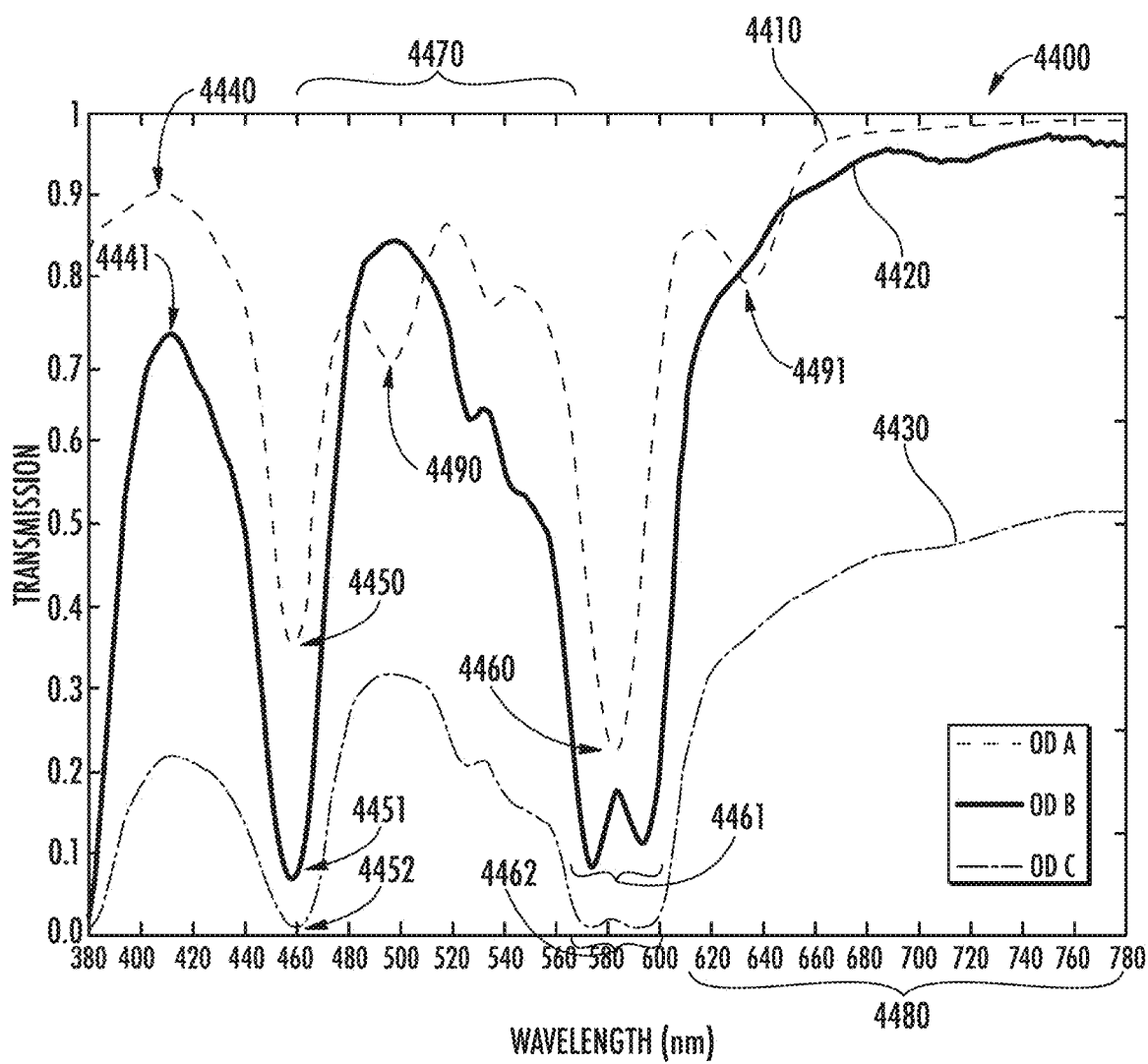
FIG. 44 illustrates the transmission spectra of three optical devices, OD A, OD B and OD C.

FIG. 44 illustrates a plot 4400 that illustrates the transmission spectra 4410, 4420, 4430 of the three optical devices, modified with dyes. OD A shown in spectra 4410 provides an approximately 90% (0.9) transmission at 410 nm 4440, blocks at 460 nm with 35% (0.35) transmission 4450, transmits 40% to 100% in the rest of visible wavelengths 4470, 4480 with a block at approximately 580 nm with 25% (0.25) transmission 4460. OD B shown in spectra 4420 blocks at 460 nm 4451 and blocks from 570 nm to 600 nm 4461, while passes below 460 nm 4441, passes between 460 nm and 570 nm 4470, and passes above 610 nm 4480. OD B blocks on average more than OD A. OD C shown in spectra 4430 blocks at 460 nm 4452 and blocks from 570 nm to 600 nm 4462 (transmission almost zero), while passing similar wavelengths 4470, 4480 compared to OD A and OD B, although OD C's maximum transmission between 460 nm and 570 nm 4470 is approximately 35% (0.35).

OD A is constructed by laminating a dye-infused polycarbonate (PC) layer of 0.5 mm thickness with a base substrate of 1.5 mm thickness having a diameter of 72 mm. With dyed PC layer lamination, the OD may be plano in optical power or have any non-plano optical power without substantially changing the transmission spectrum of the OD from view periphery to view center. Four "notch" absorbing dyes compatible with PC are used at 460 nm 4450, 495 nm 4490, 585 nm 4460 and 635 nm 4491, to produce the transmission spectrum 4410. Dye concentrations range from 0.01 mg to 200 mg per pound of PC. Dyes include cyanine, rhodamine, coumarin, squarylium or BODIPY structures. Numerous other dyes may be used to provide the resultant transmission spectrum of the OD similar to that of OD A.

OD B is constructed by infusing three dyes into the matrix of polyamide (PA, nylon) during compounding and molding process. Three notch absorbing dyes compatible with PA are used at 460 nm 4451, 575 nm and 595 nm 4461 to produce the desired transmission spectrum 4420. The unevenness of the spectrum at wavelengths longer than 620 nm is largely due to hard coating and anti-reflection coating. Dye concentrations range from 0.01 mg to 200 mg per pound of PA.

OD C is constructed similarly to OD B. OD C utilizes a largely neutral-density or broad visible-spectrum absorbing dye, such as "Carbon Black," added to significantly lower the transmission spectrum of OD C from 380 nm to 780 nm. OD C utilizes dye concentrations that range from 0.1 mg to 1000 mg per pound of PA or PC.

Optical devices may be made to pass all, the majority, or some of the standards, set by the various standard-making groups, such as the International Organization for Standards (ISO), American National Standards Institute (ANSI), and Standards Australia (AS/NZS). In particular, an OD's visible transmission spectrum adheres to some or all of these standards.

Table 3 illustrates pertinent standards relevant of an optical device's transmission spectrum in the visible wavelengths of 380 nm to 780 nm as set by 2013 ISO 12312-1, 2018 ANSI Z80.3 and 2016 AS/NZS 1067.1. Table 3 illustrates the tested values and results of three color enhancing optical devices, namely OD A, OD B and OD C, whose transmission spectra 4410, 4420, 4430 are provided in FIG. 44. OD A passed all listed standards. OD B and OD C passed almost all listed standards, except for spectral transmittance standards.

TABLE 3

NUMEROUS METRICS OF OD A, OD B AND OD C ACCORDING TO STANDARDS SET IN ISO 12312-1 2015, ANSI Z80.3 2018, AND AS/NZS 1067.1: 2016

INTERNATIONAL STANDARD, ISO 12312-1, 2015

| | RELATIVE VISUAL ATTENUATION QUOTIENT (Q) | | | | | | | | | SPECTRAL TRANSMITTANCE | | PHOTOPIC LUMINOUS TRANSMITTANCE % | FILTER CATEGORY |
|---|---|---|---|---|---|---|---|---|---|---|---|---|---|
| | INCANDESCENT | | | | LED | | | | | | | | |
| OLD NAME | RED (>0.8) | YELLOW (>0.6) | GREEN (>0.6) | BLUE (>0.6) | RED (>0.6) | YELLOW (>0.6) | GREEN (>0.6) | BLUE (>0.6) | | VALUE % | REQUIRE-MENT % | | |
| OD A | 1.35 | 0.96 | 1.03 | 1.08 | 1.19 | 0.60 | 1.12 | 0.86 | | 2.24 | 13.7 | 69 | 1 |
| OD B | 1.28 | 0.89 | 1.06 | 1.31 | 1.64 | 0.33 | 1.56 | 0.83 | | 8.3 | 10.0 | 50 | 1 |
| OD C | 1.52 | 0.90 | 1.04 | 1.44 | 2.03 | 0.15 | 1.67 | 0.85 | | 0.9 | 3.3 | 16 | 3 |

AMERICAN NATIONAL STANDARD, ANSI Z80.3, 2018

| | TRAFFIC SIGNAL TRANSMITTANCE | | | | SPECTRAL TRANSMITTANCE | | COLOR LIMITS (193) CIE XxY CHROMATICITY (COORDINATES) | | | | | PHOTOPIC LUMINOUS TRANSMITTANCE | |
|---|---|---|---|---|---|---|---|---|---|---|---|---|---|
| | | | | | | | YELLOW TRAFFIC SIGNAL | | GREEN TRAFFIC SIGNAL | | AVERAGE DAYLIGHT (CIE 065) | | |
| OLD NAME | RED (>0.8) | YELLOW (>0.6) | GREEN (>0.6) | BLUE (>0.6) | VALUE (% OF IV) | REQUIREMENT (% OF IV) | <X, Y> | PASS/FAIL | <X, Y> | PASS/FAIL | <X, Y> | PASS/FAIL | |
| OD A | 86.2 | 63.9 | 72.7 | 1.12 | 0.33 | >0.20 | <0.593, 0.405> | PASS | <0.195, 0.437> | PASS | <0.310, 0.329> | PASS | 68 |
| OD B | 82.9 | 41.6 | 56.3 | 1.35 | 0.17 | >0.20 | <0.619, 0.388> | PASS | <0.168, 0.467> | PASS | <0.304, 0.358> | PASS | 49 |
| OD C | 36.5 | 13.6 | 10.4 | 1.49 | 0.06 | >0.20 | <0.646, 0.253> | PASS | <0.152, 0.477> | PASS | <0.316, 0.368> | PASS | 16 |

AUSTRAILIAN/NEW ZEALAND STANDARD AS/NZS 1067.1: 2016

| | RECOGNITION OF TRAFFIC SIGNAL LIGHTS (Q) | | | | SPECTRAL TRANSMITTANCE | | PHOTOPIC LUMINOUS TRANSMITTANCES | SCOTOPIC LUMINOUS TRANSMITTANCES | LAB RG-LI COLOR DIFFERENCES | SHADE CATEGORY | LIGHTNESS <SINGLE PASS, DOUBLE PASS> |
|---|---|---|---|---|---|---|---|---|---|---|---|
| OLD NAME | RED (>0.8) | YELLOW (>0.8) | GREEN (>0.8) | BLUE (>0.8) | VALUE (% OF IV) | REQUIREMENT (% OF IV) | UNDER CIE 065 ILLUMINANT | | | OLD NAME | |
| OD A | 1.15 | 0.97 | 1.02 | 1.12 | 0.33 | >0.20 | 89 | 72 | 18.3 | OD A | <86.4, 76.6> COMESTIC LENS OR SHIELDS, LIGHT |
| OD B | 1.28 | 0.90 | 1.05 | 1.35 | 0.17 | >0.20 | 50 | 60 | 38.0 | OD B | <76.8, 62.3> COMESTIC LENS OR SHIELDS, LIGHT |
| OD C | 1.57 | 0.91 | 1.03 | 1.49 | 0.16 | >0.20 | 16 | 20 | 55.1 | OD C | <47.3, 23.5> GENERAL PURPOSE LENS OR SHIELD MEDIUM TO DARK |

Color enhancing optical devices may be made to pass additional standards not provided in Table 3, and/or set by other rule-making groups.

Color enhancing optical devices, included the optical devices in Table 3, enhance the relative visual attenuation quotient (Q) of traffic signal lights, such as red, green and blue lights. These optical devices maybe utilized by individuals, such as drivers, riders and cyclists, to accentuate the colors or visibility of traffic lights.

In some embodiments, an OD's relative visual attenuation quotient (Q) is larger than the minimum ISO requirement by at least 0.02 for at least one incandescent signal light of red, yellow, green or blue designation. In some embodiments, an OD's relative visual attenuation quotient (Q) is larger than the minimum ISO requirement by at least 0.02 for at least one LED signal light of red, yellow, green or blue designation. In some embodiments, an OD's ISO relative visual attenuation quotient (Q) is at least 1.0 for at least one incandescent signal light of red, yellow, green or blue designation. In some embodiments, an OD's ISO relative visual attenuation quotient (Q) is at least 1.0 for at least one LED signal light of red, yellow, green or blue designation.

Figure 45:
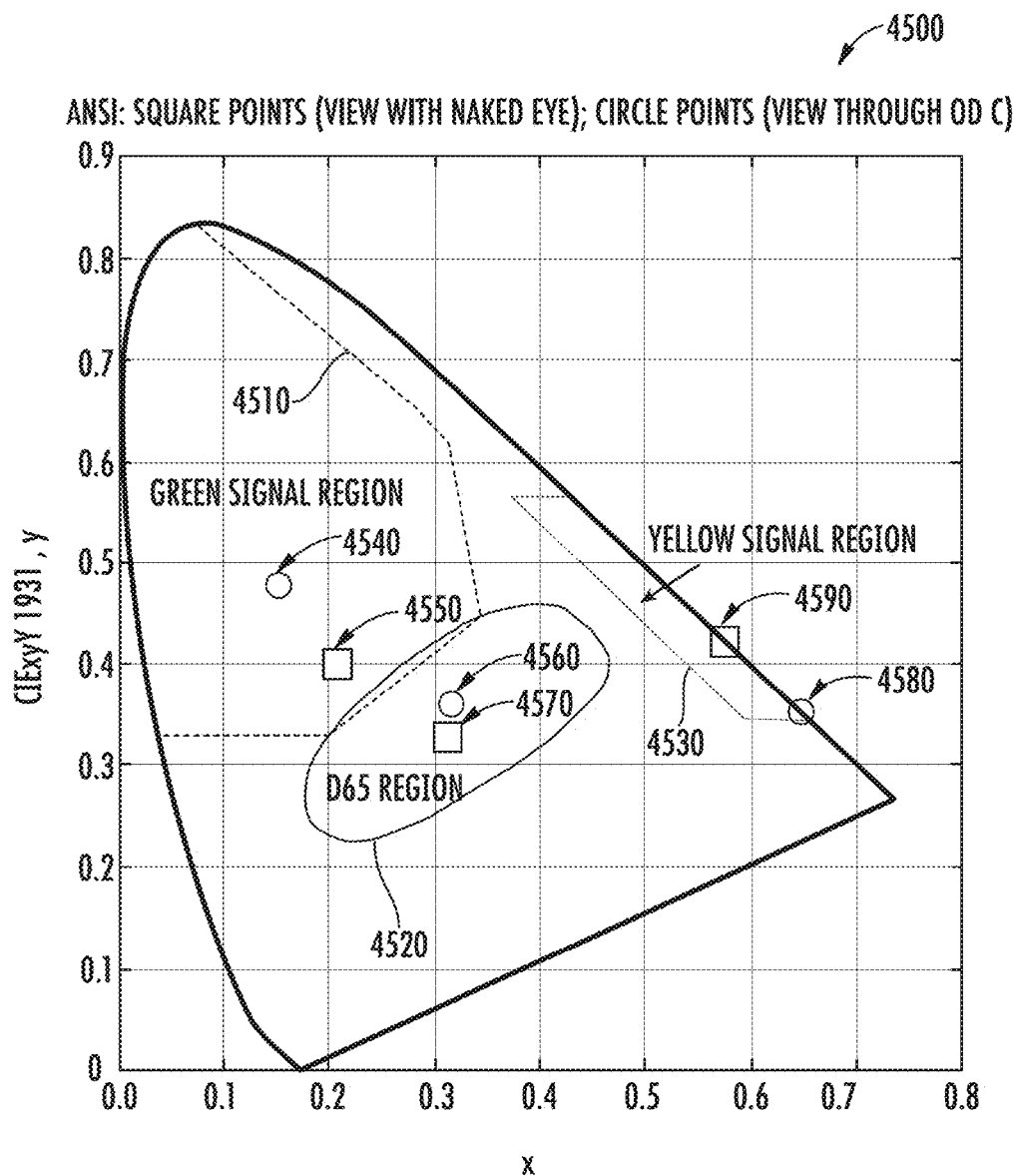
FIG. 45 illustrates the chromaticity coordinates of green traffic light, yellow traffic light, and D65 daylight as viewed with OD C and with naked eyes in 1931 CIE xyY chromaticity diagram with optical device standards defined by ANSI Z80.3-2018.

FIG. 45 illustrates a plot 4500 that illustrates the CIE xyY chromacity coordinates of green traffic lights 4510, yellow traffic lights 4530, and D65 daylight 4520 viewed with OD C and a naked eye, according to ANSI.

As shown in plot 4500, a color enhancing optical device, such as OD C, may modify the color appearance of a yellow traffic signal light towards the orange or red 4580, compared to viewing with the naked eye 4590, while remaining within the acceptable Yellow Signal Region 4530. Such optical device may maintain an acceptable single-pass WP 4560 when viewing at or through it, as depicted by circle marked point, and remain within the marked CIE D65 region 4520. Acceptable colored tint of an optical device may include substantially neutral or pastel colored tint as shown by the proximity of the white point of the optical device 4560 (circle marked point) and white point of color vision viewed with the naked eye without the optical device 4570 (square marked point).

A color enhancing optical device may modify the color appearance of originally yellow or orange colored traffic lines, markings, signs, cones or other devices toward the orange or red, compared to unassisted perception with the naked eye. Such color enhancing optical device can modify the color appearance of a green traffic signal light to be greener or higher chroma green 4540, compared to viewing with the naked eye 4550, while remain within the acceptable Green Signal Region (4510).

For people with protanomaly or protanopia, and for some people with normal color vision, the transmission spectrum 3710 of a color enhancing, color correcting or color compensating OD has: (1) at least one stop-band 3740, 3750 with a peak absorbance wavelength between 560 nm and 595 nm, inclusively, (2) such stop-band has a peak absorbance of at least 30%, and (3) such stop-band has a FWHM of at least 10 nm as illustrated in plot 3700 of FIG. 37.

For people with deuteranomaly or deuteranopia, and for some people with normal color vision, the transmission spectrum 3310 of a color enhancing, color correcting or color compensating OD has: (1) at least one stop-band 3350, 3360 with a peak absorbance wavelength between 575 nm and 610 nm, inclusively, (2) such stop-band has a peak absorbance of at least 30%, and (3) such stop-band has a FWHM of at least 10 nm as illustrated in plot 3300 of FIG. 33.

For people with CVD, and for some people with normal color vision, the transmission spectrum of a color enhancing, color correcting or color compensating OD has: (1) at least one stop-band with a peak absorbance wavelength between 560 nm and 610 nm, inclusively, (2) such stop-band has a peak absorbance of at least 30%, and (3) such stop-band has a FWHM of at least 10 nm.

For people with CVD, and for some people with normal color vision, the transmission spectrum of a color enhancing, color correcting or color compensating OD has: (1) at least one stop-band with a peak absorbance wavelength between 575 nm and 595 nm, inclusively, (2) such stop-band has a peak absorbance of at least 30%, and (3) such stop-band has a FWHM of at least 15 nm.

Peak absorbance of $\geq X\%$ equals valley(lowest local) transmission of $\leq (100-X)\%$.

One or more view regions (i.e., surfaces) with the photometric and/or colorimetric attributes described herein may partially or completely cover the entire surface of the OD.

Figure 46:
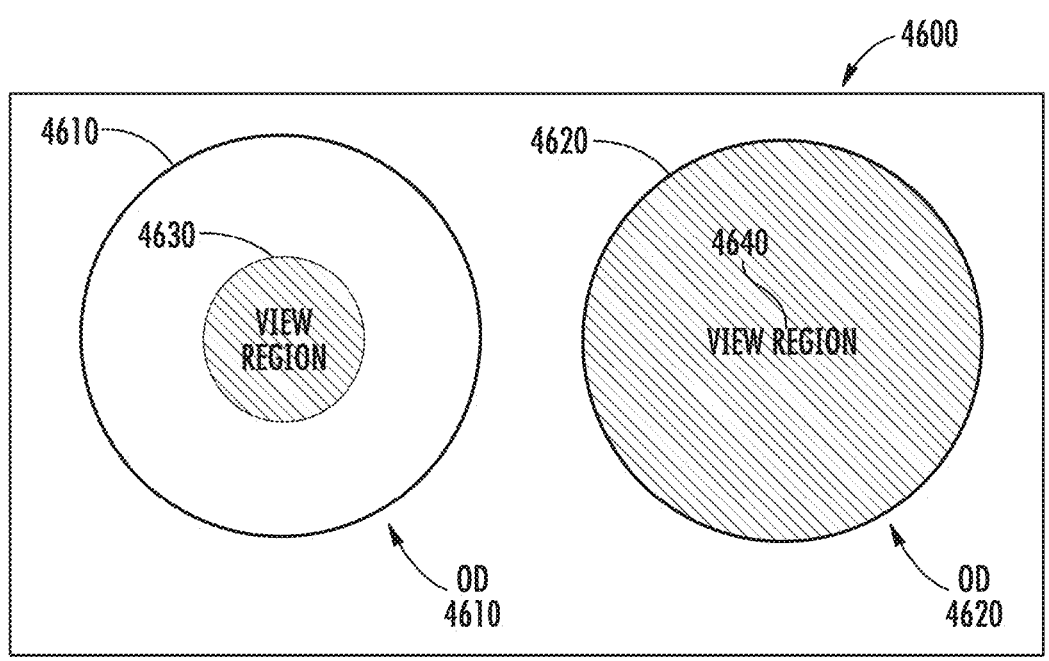
FIG. 46 illustrates a contact lens.

FIG. 46 illustrates a contact lens 4600. In one embodiment, a contact lens 4610 may only dye its central view region covering only or substantially the pupil and/or sclera 4630, where the area of this view region 4630 is smaller than the area of the entire lens 4610. As another embodiment, a contact lens 4620 may dye its entire lens, where the area of the view region 4640 is the same or substantially the same as the area of the entire lens 4620.

In the above examples, the output of the OD is the transmission spectrum. As would be understood by those possessing an ordinary skill, such spectrum may be created by any optical device.

A red, green, blue and/or yellow color-enhancing optical device has at least four pass-bands in its transmission spectrum from 380 nm to 780 nm. At least one pass-band has a peak transmittance wavelength shorter than 440 nm; at least two pass-bands have peak transmittance wavelengths between 440 nm and 610 nm, with one pass-band's peak transmittance wavelength shorter than that of another pass-band by at least 10 nm; and at least one pass-band has a peak transmission wavelength longer than 610 nm. Such optical device is comprised of at least one absorptive dye and/or at least one reflective thin film.

A red, green, blue and/or yellow color-enhancing optical device has at least three pass-bands in its transmission spectrum from 380 nm to 780 nm. At least one pass-band centered between 571 nm and 780 nm has a peak transmission higher by at least 1% than the peak transmission of at least one pass-band centered between 380 nm and 570 nm. Any pass-band's peak transmittance wavelength is different than that of any other pass-band by at least 10 nm. Such optical device is comprised of at least one absorptive dye and/or at least one reflective thin film.

A red, green, blue and/or yellow color-enhancing optical device has at least four pass-bands in its transmission spectrum from 380 nm to 780 nm. There is at least one pass-band with a peak transmittance wavelength shorter than 460 nm; at least one pass-band with a peak transmittance wavelength between 461 and 540; at least two pass-bands with peak transmittance wavelengths longer than 541 nm. For all pairs of immediately adjacent pass-bands, there is a separation of at least 5 nm between their peak transmission wavelengths. Such optical device is comprised of at least one absorptive dye and/or at least one reflective thin film.

A red, green, blue and/or yellow color-enhancing optical device has at least four pass-bands in its transmission spectrum from 380 nm to 780 nm. There is at least one stop-band centered at shorter than 450 nm has at least a 30% peak inhibition; at least one stop-band centered between 550 nm and 610 nm has at least a 30% peak inhibition; at least one stop band centered between 440 nm and 510 nm has less than 80% peak inhibition. There is at least one pass-band centered between 480 nm and 570 nm with a peak transmission larger than 20%. There is at least one stop-band centered at a wavelength longer than 580 nm. Such optical device is comprised of at least one absorptive dye and/or at least one reflective thin film.

An optical device has at least two pass-bands in its transmission spectrum from 380 nm to 780 nm. Such optical device is comprised of at least one absorptive dye and/or at least one reflective thin film. Under CIE D65 illuminant and in CIE LAB color space, the optical device has: (1) the a-values of its single-pass white point and that of its double-pass white point be between 5 and 150 distance units (inclusively) apart from each other, and/or (2) the b-values of its single-pass white point and that of its double-pass white point be between 5 and 150 distance units (inclusively) apart from each other, and (3) one or more of the following conditions applies to the device:

Has a ratio of max transmittance to min transmittance of at least 1.25 to 1 in the device's transmission spectrum from 380 nm to 780 nm with 1-nm resolution;

Has a photopic luminous transmittance of below 95%;

Produces a lightness-independent red-green color difference increase between −80% and 120%, excluding from −2% to 2%, for red and green Munsell colors seen through the device;

Produces a lightness-independent blue-yellow color difference increase between −50% and 50%, excluding from −2% to 2%, for blue and yellow Munsell colors seen through the device;

Has an a- and/or b-value of the device's single-pass white point of between −15 and 15;

An optical device has at least three pass-bands in its transmission spectrum from 380 nm to 780 nm. Such optical device is comprised of at least one absorptive dye and/or at least one reflective thin film. The red-green lightness-difference for red and green Munsell and/or Ishihara colors seen through the device is between −5.0 and 5.0 (inclusive), excluding from −0.1 to 0.1, under one or more of CIE D65, F2 and/or F11 illuminants.

The optical device, where its transmission spectrum has at least one stop-band whose peak inhibition wavelength is between 440 nm and 600 nm, and the stop-band has a full-width-at-half-maximum of at least 5 nm.

In the transmission spectrum of an optical device, the peak inhibition is less than 85% for any stop-band whose peak inhibition wavelength is between 440 nm and 510 nm.

In the transmission spectrum of an optical device, the peak transmission wavelength of one or more pass-bands centered between 480 nm and 570 nm is at least 40 nm shorter than peak transmission wavelength of one or more pass-bands centered between 571 nm and 660 nm.

The optical device is photochromic under UV illumination.

In the transmission spectrum of an optical device, at least one stop-band is centered at a wavelength longer than 590 nm.

In the transmission spectrum of an optical device, the lowest transmission between 530 nm and 780 nm is higher by at least 1% than the lowest transmission between 380 nm and 529 nm.

In the transmission spectrum of an optical device, the pass-band with longest peak transmittance wavelength has the wavelength longer by at least 10 nm than that of the pass-band with the second longest peak transmittance wavelength.

In the transmission spectrum of an optical device, the average transmission between 460 nm and 540 nm is higher by at least 1% than the average transmission between 550 nm and 600 nm.

For the transmission spectrum of an optical device, the average transmission between 500 nm and 550 nm is higher by at least 1% than the average transmission between 570 nm and 590 nm.

For the transmission spectrum of an optical device, the square of such spectrum at every wavelength from 380 nm to 780 nm has all of the same spectral characteristics compared to such spectrum itself.

For the optical device, its single-pass and double-pass cosmetic tints both have a-values between −60 and +60, and/or b-values between −60 and +60, in CIE LAB color space, under one or more illuminants of CIE D65, F2 and/or F11.

For the optical device, the photopic luminous transmittance of the device through single-pass is below 95% (inclusive) under one or more illuminants of CIE D65, F2 and F11.

For the optical device, it produces a LAB $RG_{LI}$ Color Difference Percent increase of between 5% and 110%, for red and green Munsell colors seen through the device, under one or more of CIE D65, F2 and/or F11 illuminants.

For the optical device, it produces a LAB $BY_{LI}$ Color Difference Percent increase of between 10% and 110%, for blue and yellow Munsell colors seen through the device, under one or more of CIE D65, F2 and/or F11 illuminants.

For the optical device, the lightness-independent color difference between the white point of the optical device's single-pass cosmetic tint and that of its double-pass cosmetic tint are within 60 distance units of each other in CIE LAB color space, under one or more of CIE D65, F2 and/or F11 illuminants.

For the optical device, the lightness-independent white point shift of the optical device's single-pass cosmetic tint and that of its double-pass cosmetic tint are both less than 60 distance units away from neutral, in CIE LAB color space, under one or more of CIE D65, F2 and/or F11 illuminants.

For the optical device, its single-pass cosmetic tint has an a-value that is at least 1 distance unit different than the a-value of its double-pass cosmetic tint in the CIE LAB color space, under at least one or more of CIE D65, F2 and/or F11 illuminants.

For the optical device, its single-pass cosmetic tint has a b-value that is at least 1 distance unit different than the b-value of its double-pass cosmetic tint in the CIE LAB color space, under at least one or more of CIE D65, F2 and/or F11 illuminants.

For the optical device, its single-pass and/or double-pass cosmetic tint in CIE F2 illuminant has a b-value that is at least 1 distance unit less than the b-value of its corresponding single-pass and/or double-pass cosmetic tint in CIE D65 and/or F11 illuminant in CIE LAB color space.

For the optical device and for a person with yellow-color vision, in CIE D65 lighting and CIE LUV space, the difference between the white point shift from neutral of the color vision of such person seeing with the naked eye and that of the same person seeing through the device is between 0.002 and 0.2 distance units.

For the optical device, viewing through the device, the variation in the red-green lightness difference is within 5.0 between any two illuminants in the set of CIE D65, F2 and/or F11 illuminants.

For the optical device, the device's computed relative visual attenuation quotient (Q) is larger than the minimum ISO requirement by at least 0.02 for at least one incandescent signal light of red, yellow, green or blue designation.

For the optical device, all colorimetric performance metrics use the 1931 CIE 2-Degree Standard Observer.

For the optical device, one or more view regions may partially or completely cover the entire surface of the OD.

For the optical device, the device is comprised of lenses, sunglass and ophthalmic, glass, contact lens, optical filters, displays, windshields, intraocular lens, human crystalline lens, windows, and plastics. The optical device can have any optical power, curvature or other suitable characteristics, comprised of geometric shapes, refractive indices and thicknesses.

Although features and elements are described above in particular combinations, one of ordinary skill in the art will appreciate that each feature or element can be used alone or in any combination with or without the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A color vision enhancing optical device, the optical device comprising:
one or more optical elements to create at least two pass-bands in a transmission spectrum of the optical device from 380 nm to 780 nm, the one or more optical elements further create photopic and scotopic luminous transmittances of below 95%, under one or more of CIE D65, F2 and F11 illuminants, the one or more optical elements further create a red-green lightness-difference for red and green Munsell colors seen through the optical device between −5.0 and 5.0, excluding from −0.1 to 0.1, under one or more of CIE D65, F2 and F11 illuminants in CIE LAB color space, the one or more optical elements further create a ratio of maximum transmittance to minimum transmittance of at least 1.15 to 1 in the transmission spectrum of the optical device from 380 nm to 780 nm with 1-nm resolution, wherein the one or more optical elements further create a computed relative visual attenuation quotient (Q) that is larger than the minimum ISO requirement by at least 0.02 for at least one incandescent signal light of red, yellow, green or blue designation.

2. The optical device of claim 1 wherein the one or more optical elements comprise at least one absorptive dye.

3. The optical device of claim 1, wherein the one or more optical elements further create a lightness-independent red-green color difference increase between −80% and 120%, excluding from −2% to 2%, for red and green Munsell colors seen through the optical device, under one or more of CIE D65, F2 and/or F11 illuminants in CIE LAB color space.

4. The optical device of claim 1, wherein the one or more optical elements further create at least a third pass-band in transmission spectrum of the optical device from 380 nm to 780 nm.

5. The optical device of claim 4, wherein the one or more optical elements further create at least one pass-band with a peak transmittance wavelength shorter than 460 nm, at least one pass-band with a peak transmittance wavelength between 461 nm and 540 nm, and at least two pass-bands with peak transmittance wavelengths longer than 541 nm.

6. The optical device of claim 1, wherein the one or more optical elements further create at least one pass-band centered between 480 nm and 570 nm with a peak transmission larger than 20%.

7. The optical device of claim 1, wherein the one or more optical elements further create at least one stop-band centered at a wavelength longer than 580 nm.

8. The optical device of claim 1, wherein the one or more optical elements further create single-pass and double-pass cosmetic tints having a-values between −60 and +60, in CIE LAB color space, under one or more illuminants of CIE D65, F2 and/or F11, wherein the one or more optical elements further create single-pass and double-pass cosmetic tints having b-values between −60 and +60, in CIE LAB color space, under one or more illuminants of CIE D65, F2 and/or F11.

9. The optical device of claim 1, wherein the one or more optical elements further create an average transmission between 500 nm and 550 nm that is higher by at least 1% than the average transmission between 570 nm and 590 nm.

10. The optical device of claim 1, wherein the one or more optical elements further cause a single-pass and double-pass cosmetic tint in CIE F2 illuminant to have a b-value that is at least 1 distance unit less than the b-value of its corresponding single-pass and double-pass cosmetic tint in CIE D65 and/or F11 illuminant in CIE LAB color space.

11. The optical device of claim 1, wherein the optical device takes the form of at least one of a lens, sunglasses, ophthalmic, glass, contact lens, optical filters, displays, windshields, intraocular lens, human crystalline lens, windows, and plastics.

12. The optical device of claim 4, wherein the one or more optical elements further create at least one stop-band centered at a wavelength shorter than 450 nm with at least a 30% peak inhibition, at least one stop-band centered between 550 nm and 610 nm having at least a 30% peak inhibition, and at least one stop band centered between 440 nm and 510 nm having less than 85% peak inhibition.

13. The optical device of claim 1, wherein the one or more optical elements further create a blue stop-band centered approximately between 465 nm and 475 nm and a red stop-band centered approximately between 660 nm and 675 nm with the red stop-band having a transmission that is at least approximately 25% higher than the blue stop-band.

14. The optical device of claim 1 creating a transmission spectrum having at least one stop-band with a peak absorbance wavelength centered between 560 nm and 610 nm with a peak absorbance of at least 30%, and a full width at half maximum (FWHM) of at least 10 nm.

15. A color vision enhancing optical device, the optical device comprising:
one or more optical elements to create at least two pass-bands in a transmission spectrum of the optical device from 380 nm to 780 nm, the one or more optical elements further create photopic and scotopic luminous transmittances of below 95%, under one or more of CIE D65, F2 and F11 illuminants, the one or more optical elements further create a red-green lightness-difference for red and green Munsell colors seen through the optical device between −5.0 and 5.0, excluding from −0.1 to 0.1, under one or more of CIE D65, F2 and F11 illuminants in CIE LAB color space, the one or more optical elements further create a ratio of maximum transmittance to minimum transmittance of at least 1.15 to 1 in the transmission spectrum of the optical device from 380 nm to 780 nm with 1-nm resolution, wherein the one or more optical elements further cause a single-pass and double-pass cosmetic tint in CIE F2 illuminant to have a b-value that is at least 1 distance unit less than the b-value of its corresponding single-pass and double-pass cosmetic tint in at least one of CIE D65 and F11 illuminant in CIE LAB color space, and wherein the optical device takes the form of at least one of a lens, sunglasses, ophthalmic, glass, contact lens, optical filters, displays, windshields, intraocular lens, human crystalline lens, windows, and plastics.

16. The optical device of claim 15, wherein the one or more optical elements further create, under one or more CIE D65, F2 and/or F11 illuminant and in CIE LAB color space, a-value of its single-pass white point and that of its double-pass white point be between 5 and 150 distance units apart.

17. The optical device of claim 15 wherein the one or more optical elements comprise at least one absorptive dye.

18. The optical device of claim 15, wherein the one or more optical elements further create a lightness-independent red-green color difference increase between −80% and 120%, excluding from −2% to 2%, for red and green Munsell colors seen through the optical device, under one or more of CIE D65, F2 and/or F11 illuminants in CIE LAB color space.

19. The optical device of claim 15, wherein the one or more optical elements further create single-pass and double-pass cosmetic tints having a-values between −60 and +60, in CIE LAB color space, under one or more illuminants of CIE D65, F2 and/or F11.

20. The optical device of claim 15, wherein the one or more optical elements further create an average transmission between 500 nm and 550 nm that is higher by at least 1% than the average transmission between 570 nm and 590 nm.

21. The optical device of claim 15, wherein the one or more optical elements further create at least one pass-band with a peak transmittance wavelength shorter than 460 nm, at least one pass-band with a peak transmittance wavelength between 461 nm and 540 nm, and at least two pass-bands with peak transmittance wavelengths longer than 541 nm.

22. The optical device of claim 15, wherein the one or more optical elements further create at least one pass-band centered between 480 nm and 570 nm with a peak transmission larger than 20%, and the one or more optical elements further create at least one stop-band centered at a wavelength longer than 580 nm.

23. The optical device of claim 15, wherein the one or more optical elements further create at least one stop-band centered shorter than 450 nm with at least a 30% peak inhibition, at least one stop-band centered between 550 nm and 610 nm having at least a 30% peak inhibition, and at least one stop band centered between 440 nm and 510 nm having less than 85% peak inhibition.

24. The optical device of claim 15, wherein the one or more optical elements further create a blue stop-band centered approximately between 465 nm and 475 nm and a red stop-band centered approximately between 660 nm and 675 nm with the red stop-band having a transmission that is at least approximately 25% higher than the blue stop-band.

25. The optical device of claim 15 having a transmission spectrum with at least one stop-band with a peak absorbance wavelength centered between 560 nm and 610 nm, with the at least one stop-band having a peak absorbance of at least 30% and the at least one stop-band having a full width at half maximum (FWHM) of at least 10 nm.

\* \* \* \* \*